United States Patent [19]

Dadpey et al.

[11] Patent Number: 4,777,420

[45] Date of Patent: Oct. 11, 1988

[54] INDUCTION MOTOR CONTROL APPARATUS AND METHOD

[75] Inventors: Habib Dadpey, Atlanta, Ga.; David J. Shero, South Park Township, Alleghany County; Paul J. Merlino, West Newton, both of Pa.

[73] Assignee: Westinghouse Electric Corp., Pittsburgh, Pa.

[21] Appl. No.: 936,928

[22] Filed: Nov. 28, 1986

Related U.S. Application Data

[63] Continuation of Ser. No. 696,833, Jan. 31, 1985.

[51] Int. Cl.⁴ ............................................. H02P 3/18
[52] U.S. Cl. .................................. 318/758; 318/759; 318/762
[58] Field of Search ........ 318/803, 802, 811, 759–762, 318/758

[56] References Cited

U.S. PATENT DOCUMENTS

| | | | |
|---|---|---|---|
| 3,699,416 | 10/1972 | Sloan et al. | 318/761 |
| 3,899,725 | 8/1975 | Plunkett | 318/802 |
| 3,916,275 | 10/1975 | Plunkett et al. | 318/802 |
| 4,023,083 | 5/1977 | Plunkett | 318/802 |
| 4,263,541 | 4/1981 | Okado | 318/802 |
| 4,281,276 | 7/1981 | Cutler et al. | 318/803 |
| 4,483,419 | 11/1984 | Salihi et al. | 318/759 |
| 4,543,520 | 9/1985 | Danz et al. | 318/807 |

Primary Examiner—David Smith, Jr.
Attorney, Agent, or Firm—J. L. Brzuszek

[57] ABSTRACT

An AC induction motor is energized by a voltage fed inverter coupled with a DC power source and is controlled in response to a torque request signal that is provided to accelerate or decelerate the motor as desired to maintain a desired torque output. The motor is operated to have each of a power and brake operation below the base speed of the motor and to have each of a power and brake operation above the base speed of the motor.

15 Claims, 42 Drawing Sheets

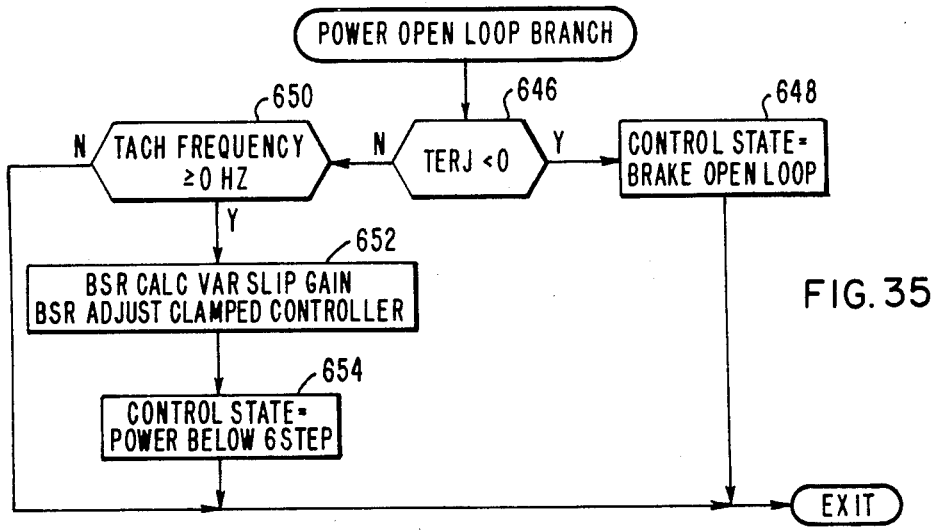
FIG. 35
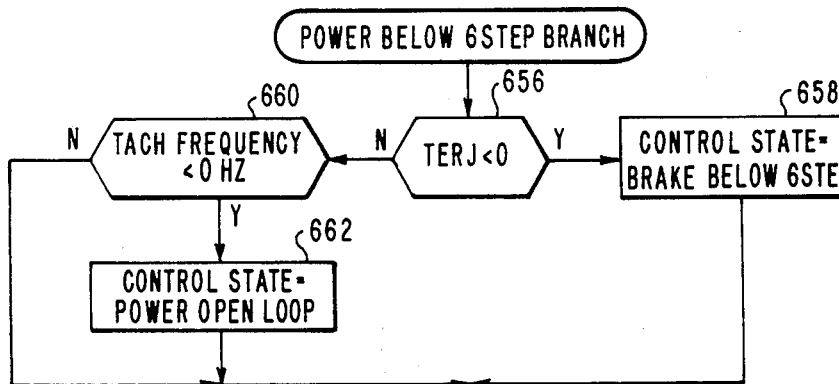
FIG. 36
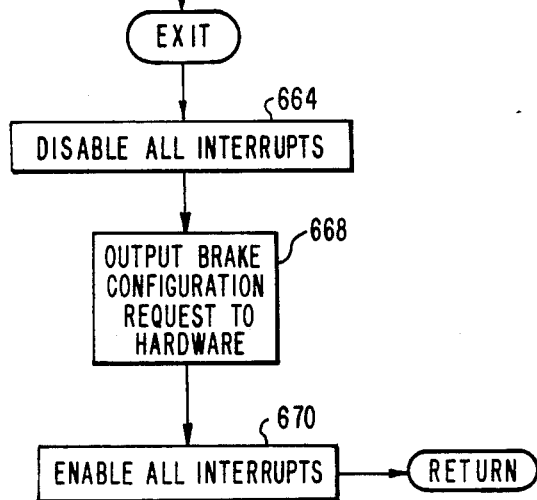

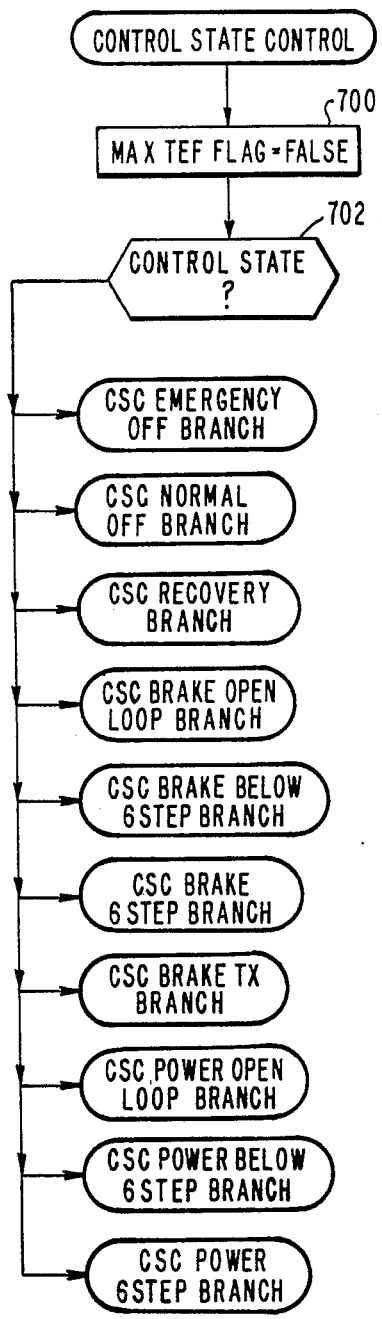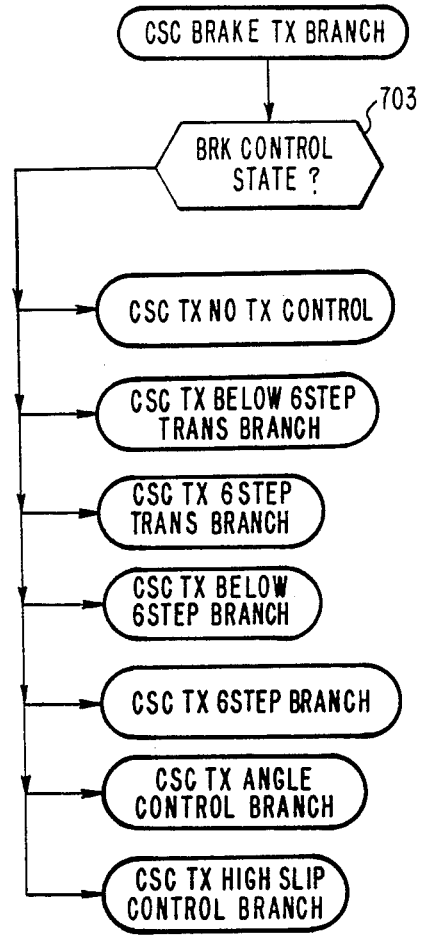
FIG. 38
FIG. 39

INDUCTION MOTOR CONTROL APPARATUS AND METHOD

This application is a continuation of application Ser. No. 697,833 filed Jan. 31, 1985.

CROSS REFERENCE TO RELATED APPLICATIONS

The present application is related to the following concurrently filed patent applications Ser. No. 686,814, by D. J. Shero et al. and entitled "Induction Motor Synthesis Control Apparatus And Method", Ser. No. 696,832, by H. Dadpey et al. and entitled "Torque Determination For Control of An Induction Motor Apparatus" and Ser. No. 696,931, by H. Dadpey et al. and entitled "Induction Motor Regenerative Brake Control Apparatus And Method", which are assigned to the same assignee and the disclosures of which are incorporated herein by reference.

BACKGROUND OF THE INVENTION

1. Field of the Invention

This invention relates in general to the control of an induction motor apparatus driven from a DC power source through an inverter.

2. Description of the Prior Art

It is known to provide a closed loop control of an AC motor drive apparatus, including a three phase AC motor which is powered using a GTO based voltage fed inverter that is powered directly from a DC power source. The GTO switches in the inverter are to have a predetermined connection time between each phase of the motor and either one of the two power rails, i.e. high and low voltage. The relationship of each phase with respect to the other phases generates the needed AC waveforms in order to properly excite the motor.

For a transit vehicle, it is known that the torque output from the one or more propulsion motor is to be maintained at a particular level to accelerate or decelerate the vehicle at a predetermined rate. Due to various disturbances and unknown variables, it is known to provide a closed loop control apparatus that determines the torque output of the motor and controls the AC waveforms to that motor so as to maintain the desired torque output from that motor.

The torque output from an AC motor can be controlled by varying the slip frequency and/or the motor voltage. In a motor drive system where the input voltage source is DC, a variable voltage and variable frequency voltage source inverter can be used to vary these motor parameters.

It is known in the prior art to provide an AC motor drive controller including a microprocessor control three-phase inverter coupled with a three-phase induction motor, as described in an article entitled "Microprocessor Based Control of an AC Motor Drive" that appeared at pages 452–456 in the conference record of the IEEE Industry Application Society Meeting for October 1982.

It is known in the prior art to provide pulse width modulated inverter pulse switching control signals with a microprocessor-based modulator in response to input voltage and frequency commands to determine the conduction time periods for an inverter driving a three-phase induction motor, as described in an article entitled "A High Performance Pulse Width modulator for an Inverter Fed Drive System Using a Microprocessor" that appeared at pages 847–853 of the above-reference conference record of the IEEE Industry Application Society Meeting for October 1982.

It is known in the prior art to provide an induction motor control system including a regenerative braking mode operative with an inverter supplying the motor voltage for determining the provided brake torque.

SUMMARY OF THE INVENTION

A variable voltage and variable frequency inverter energized induction motor control apparatus and method are provided for an Ac induction motor drive system using a programmed microprocessor for operation with gate turn-off thyristors in the inverter apparatus to determine the required switching of the motor currents on and off.

BRIEF DESCRIPTION OF THE DRAWINGS

FIG. 35 shows a flow chart for the power open loop routine called by FIG. 21;

FIG. 36 shows a flow chart for the power below six-step routine called by FIG. 21;

FIG. 38 shows a flow chart for the control state control routine called by FIG. 20;

FIG. 39 shows a flow chart for the CSC brake TX routine called by FIG. 38;

DESCRIPTION OF THE PREFERRED EMBODIMENT

Figure 1:
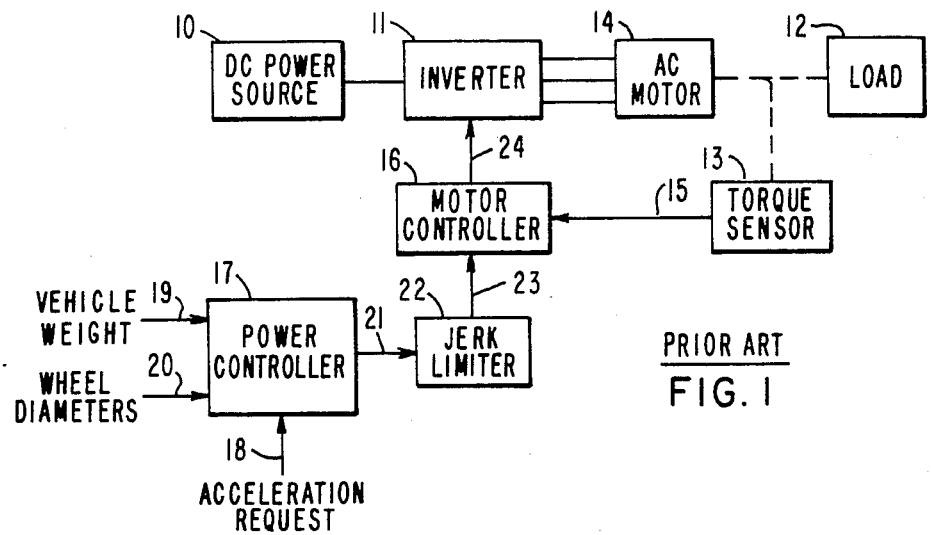
FIG. 1 shows a prior art AC induction motor control apparatus.

In FIG. 1 there is shown a prior art AC induction motor control apparatus including a DC power source 10 coupled with an inverter 11 for determining the operation of a three-phase AC induction motor 14 connected with a load 12 which represents a transit vehicle. A torque sensor 13 is coupled with the motor 14 to provide a torque feedback 15 to a motor controller 16. A power controller 17 receives as inputs an acceleration request 18 from the transit vehicle operator, the transit vehicle weight 19, and the transit vehicle wheel diameters 20. The power controller 17 produces a torque effort request 21, which represents the torque to be achieved by the AC motor 14 in order to accelerate the trasit vehicle, load 12, at the rate defined by acceleration request 18. A jerk limiter 22 takes the torque effort request 21 and jerk limits it to provide a jerk limited torque effort request 23 to the motor controller 16. The motor controller 16 produces GTO firing pulses 24 for the inverter 11, in order to match the torque feedback 15 to the torque effort request 23.

Figure 2:
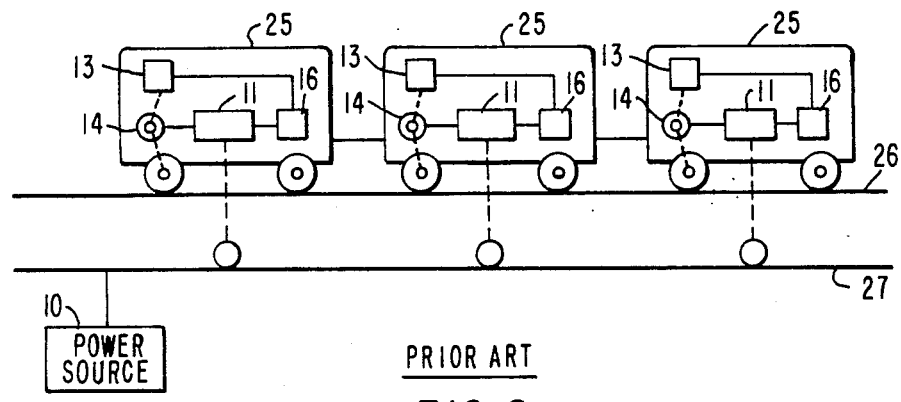
FIG. 2 shows a typical prior art transit vehicle operative with a roadway track and an AC propulsion motor apparatus.

In FIG. 2 there is shown a transit vehicle 25 operative with a roadway track 26 and including the inverter 11, the induction motor 14, the motor controller 16 and the torque sensor 13 coupled with the motor 14. The power source 10 energizes the inverter 11 through a power line 27.

Figure 3:
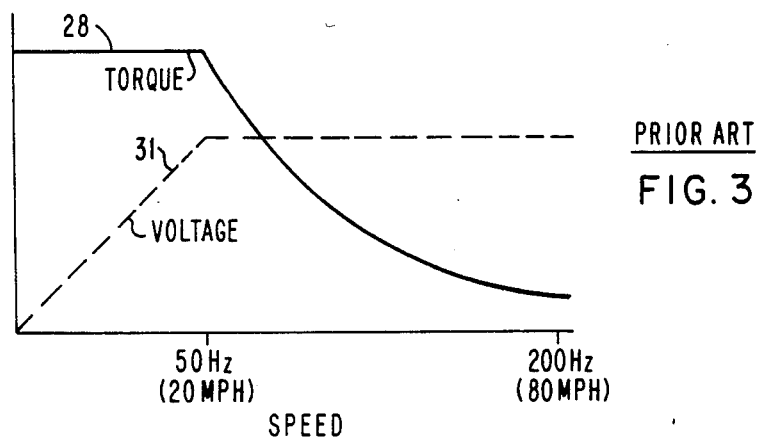
FIG. 3 shows the well known torque and voltage versus speed relationship curves for a transmit vehicle AC induction propulsion motor.

In FIG. 3 there are shown the well-known torque and voltage versus speed curves for an induction motor 14. The power torque of the motor as shown by curve 28 is constant from zero speed up to base speed and then falls off for speeds above base speed which is shown to be 50 Hz and approximately 20 mph of vehicle operation. The motor voltage increases linearly as shown by curve 31 up to base speed and then stays constant for motor speeds above that base speed of the motor.

Figure 4:
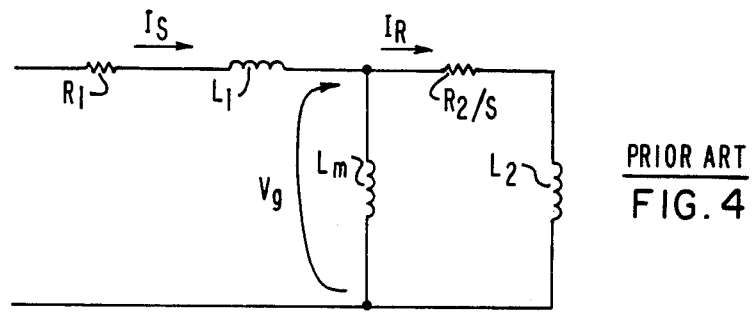
FIG. 4 shows a well known equivalent circuit model of one line-to-neutral phase of a three phase AC induction motor.
Figure 5:
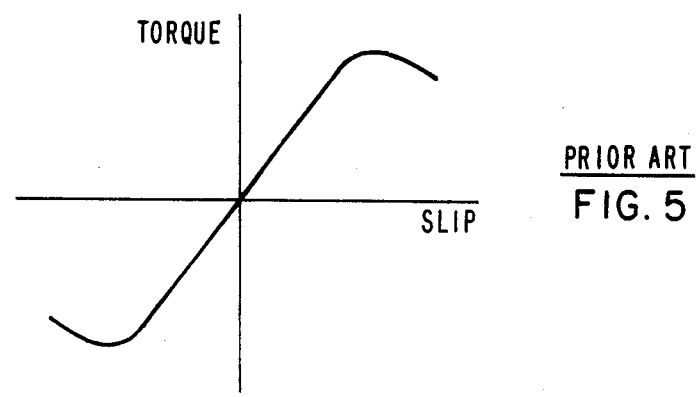
FIG. 5 shows the well known torque change of an AC induction motor when the air gap flux is kept constant while varying the slip frequency.

FIG. 4 shows the well known equivalent circuit model of one line-to-neutral phase of a three phase AC motor. R2 and L2 are the resistance and inductance of the rotor, with the indicated resistor value being R2 divided by S where S is the slip. Slip is defined as the ratio of the inverter frequency minus the rotation of the rotor frequency and divided by the inverter frequency. The voltage indicated by Vg is the air gap voltage and results in a corresponding air gap flux. If the air gap flux is kept constant while varying the slip frequency, the torque of the motor will change as shown in FIG. 5. Varying the slip of the motor while holding the air gap flux constant results in a change in rotor current. Since torque is proportional to air gap flux multiplied by rotor current Ir, this change in rotor current will result in a change in motor torque.

As can be seen in FIG. 4, the air gap voltage Vg sees an inductive impedance, so that as the inverter frequency ns changes, the air gap voltage Vg must change also in order to maintain the same current through Lm which will in turn keep the air gap flux constant. To vary Vg, the control must vary the inverter voltage. The other components in the equivalent circuit model of FIG. 4 also affect Vg under different operating conditions. The slip of the motor is determined by the relationship $$s = \frac{ns - n}{ns} \quad (1)$$

where s is the slip, ns is the inverter frequency and n is the rotor frequency, and where motor frequency is determined by the relationship $$n = \frac{\text{mechanical frequency} \times 120}{\text{number of motor poles}} \quad (2)$$

where rotor frequency is in hertz and the mechanical frequency is in RPM. As the help of the motor increases to increase the motor torque, the motor current Ir and stator current Is will increase. Since the stator and rotor have resistance associated with them, the voltage Vg and the air gap flux will drop unless something is done to increase the inverter output voltage. The compensation done to avoid this drop in air gap flux is shown as IR drop compensation since it compensates for the resistive loss in the motor. Assuming that the inverter voltage is maintained to compensate for IR drop and the inverter frequency changes, the air gap flux of the motor can be maintained at a constant value over all operating conditions. This type of control is known as constant V/F or volts per hertz control.

Constant V/F control is maintained up until the inverter frequency is increased to the point where the inverter voltage can no longer be increased to maintain constant air gap flux. This limitation is set by the DC line voltage input to the inverter. At this point where the inverter voltage can no longer be increased to keep the air gap voltage constant, begins the reduced flux mode of motor operation, and from this point on the air gap flux will decrease as the motor speed is increased such that the amount of torque produced by the motor will decrease if the same slip frequency is maintained. As can be seen from FIG. 4, as the air gap flux decreases, the rotor current will also decrease; therefore, since torque is proportional to air gap flux multiplied by the rotor current, the torque will drop off rapidly. Knowing this, the motor torque can be shown to be proportional to the square of the inverter voltage if slip frequency and inverter frequency are held constant.

By varying either the slip frequency or the air gap flux, the torque of an AC induction motor can be controlled. Slip frequency is controlled by changing the fundamental output frequency of the inverter. Air gap flux is controlled by making changes to the fundamental output voltage of the inverter in addition to the changes needed to maintain constant V/F operation.

Figure 6:
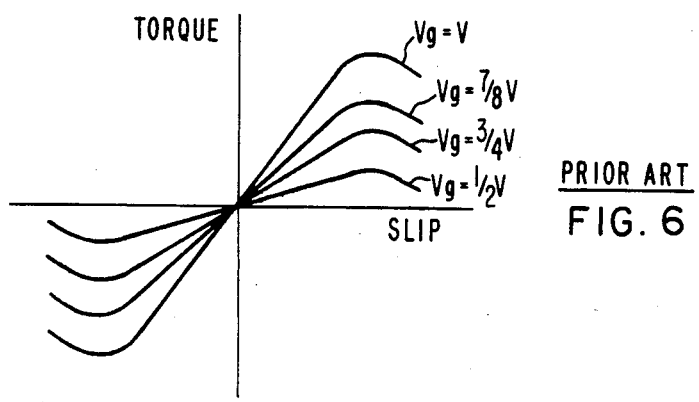
FIG. 6 shows a prior art family of torque versus slip frequency curves, with each curve being at a different air gap flux value.

FIG. 6 shows a family of torque versus slip frequency curves, with each curve being at a different air gap flux value to show the relationship between torque and the two control parameters, slip frequency and air gap flux.

Figure 7:
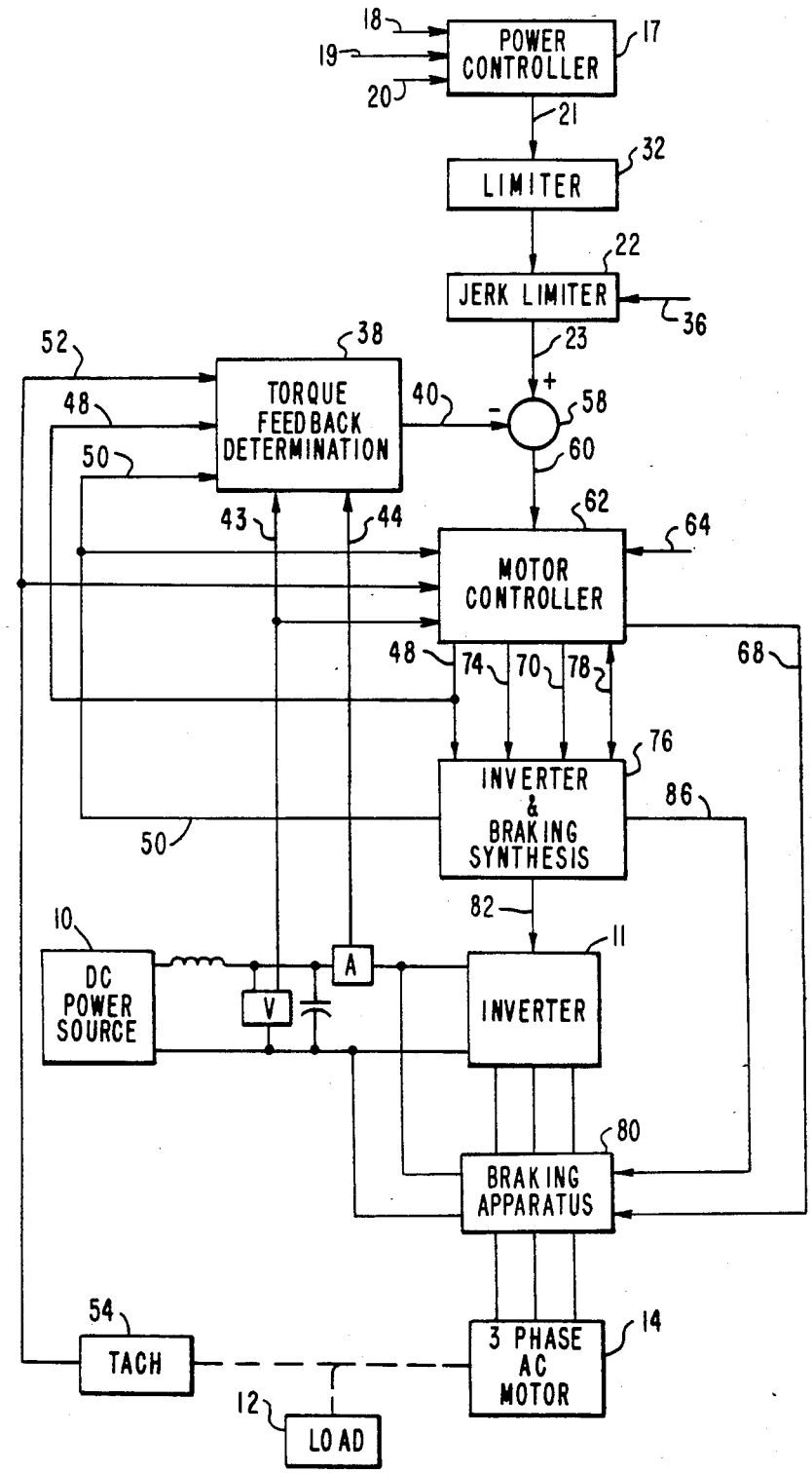
FIG. 7 shows a block diagram of the present AC induction motor control apparatus.

In FIG. 7 there is shown a suitable motor control apparatus for operation in accordance with the present invention to control a three phase AC motor, such as the propulsion motor of a mass transit passenger vehicle. The vehicle operator can provide a power controller 17 with a vehicle acceleration request which by taking into account the vehicle weight and vehicle wheel diameters, the power controller 17 translates into a torque effort request signal 21 which is input to a signal limiter 32 for preventing unreasonable torque effort requests. A jerk limiter 22 is provided in relation to a desired jerk rate 36 for establishing a jerk limited torque request 23 for the comfort of the vehicle passengers. A torque feedback determination apparatus 38 determines the torque feedback 40 by measuring the system input power in relation to the DC voltage 43 and DC current 44 provided by a power supply 10 and in relation to the inverter frequency 48 and the synthesis mode 50 and the tachometer speed 52 provided by a tachometer 54 coupled with the propulsion motor 14 to estimate the output torque of the motor 14. The torque feedback signal 40 is supplied to the negative input of a summing junction 58 for comparison with the jerk limited torque request signal 23 supplied to the positive input of the summing junction 58. The resulting torque error signal 60 is supplied to a motor controller 62. A car control enable signal 64 from the operator permits the propulsion motor 14 to run or not. Other needed inputs by the motor controller 62 consist of the DC line voltage 43 and the synthesis mode of the inverter 50. The motor controller 62 outputs the braking thyristors enable 68, the requested braking angle 70, the requested inverter frequency 48, and the requested inverter voltage percent 74 to the inverter and braking synthesis apparatus 76, which in addition has as an input and output the control state signal 78 and provides the synthesis mode signal 50 to the motor controller 62 and to the torque feedback determination apparatus 38. When the motor 14 is in brake operation, with additional voltage supplied by the transformer braking circuit 80, the control state signal 78 operates to keep the synthesis mode in six-step and prevents a change to the quasi six-step or PWM modes. The inverter and braking synthesis apparatus 76 outputs the inverter GTO firing pulses 82 to the inverter 11 and the brake GTO firing pulses 86 to the braking circuit 80. The inverter 11 drives the motor 14 in power and in brake operation and the braking circuit 80 operates with the motor 14 when additional braking torque is desired above base speed operation.

Figure 8:
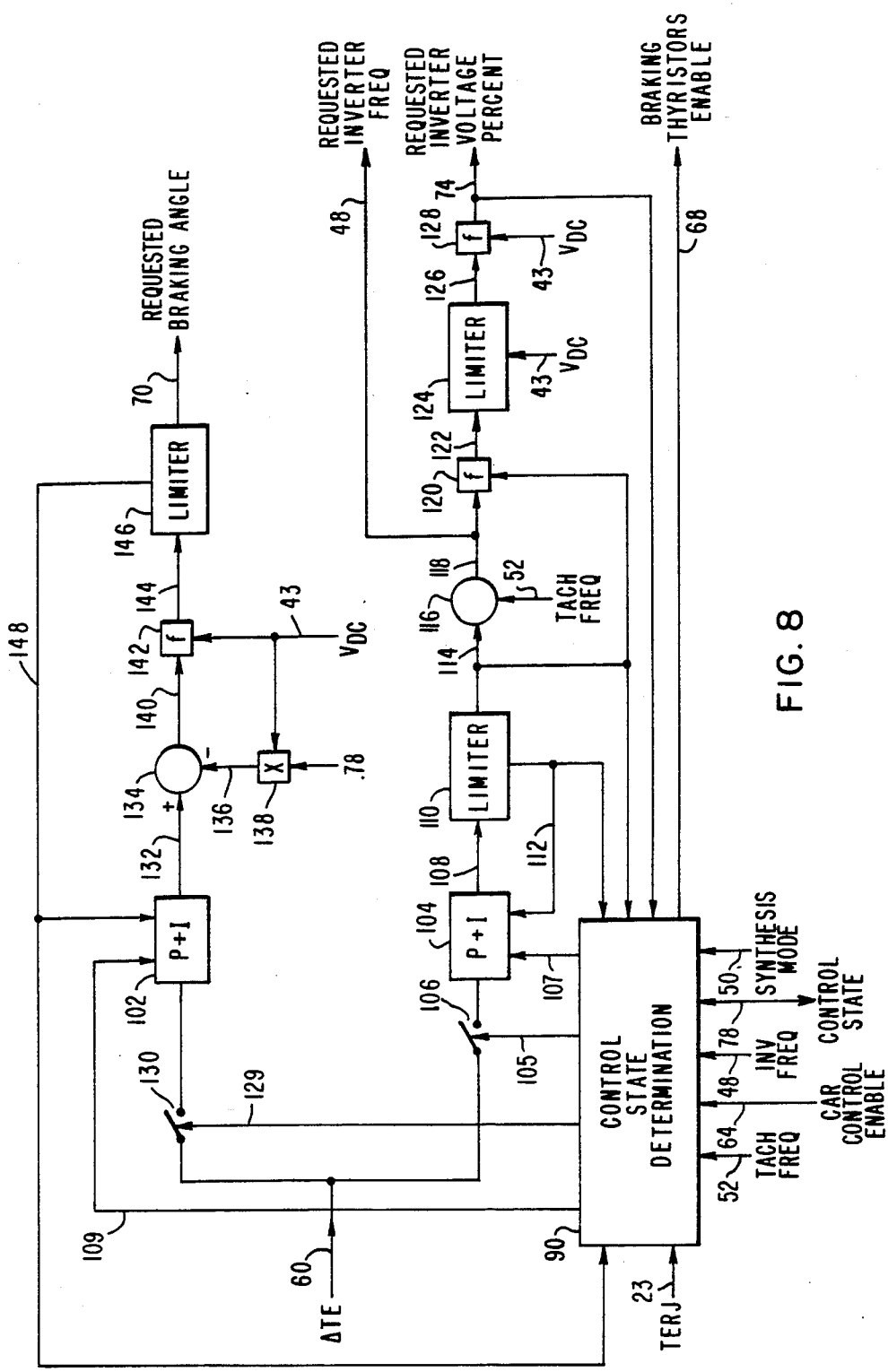
FIG. 8 shows functionally the motor controller of the present AC induction motor control apparatus.

In FIG. 8 there is functionally shown the motor controller 62, including the control state determination apparatus 90, which has an an input and output the present control state 78 for determining the next control state. The inputs are the inverter frequency 48, the car control enable 64 to indicate if the inverter is enabled to run, the tach frequency 52, and the jerk limited torque request 23 (TERJ) which determines whether in power or brake. If the TERJ is positive, then the control operation is going to be a power state, if the TERJ is negative, the control is going to be in brake. The synthesis mode 50 prevents a change to transformer brake apparatus operation if the control operation is not in six-step. The apparatus includes a brake PI controller 102 and the slip controller 104. The control state determination apparatus 90 control provides a slip enable 105 to the switch 106 which routes the torque error signal 60 into the slip controller 104. If the operation excludes the transformer braking apparatus 80, for example, where it is desired to vary the motor slip in order to control the motor torque, the switch 106 will be closed permitting the torque error signal 60 to go into the slip P+I controller 104 and output a desired slip frequency 108 into the limiter 110 which prevents too much slip and avoids going over the knee of the torque versus slip curve. The limiter 110 provides a slip limit feedback 112 into the slip P+I controller 104 to limit the slip to a desired maximum level and to preset the slip P+I controller 104 to clamp the controller 104 so the integral portion does not continue rising. The output 114 of the limiter 110 is the slip frequency 114 which is also fed back into the control state determination apparatus 90 to control a couple of different state determinations. The slip frequency 114 is added to the tach frequency 52 in an adder 116 and the output is the inverter frequency 48. The function generator 120 uses the inverter frequency 48 and another input, the slip frequency 114 to generate a desired inverter voltage 122 that will result in the AC motor 14 being operated below base speed at constant rated air gap flux. This desired inverter voltage 122 is not obtainable above base speed from the inverter due to limits imposed by the DC line voltage. Therefore, voltage limiter 124 monitors the DC line voltage 43 to determine if its other input, desired inverter voltage 122 can be obtained. If the voltage 122 cannot be obtained, the voltage limiter 124 will clamp to a voltage that can be obtained. If the voltage 122 can be obtained, the voltage limiter 124 will not modify the voltage 122. The output of the limiter 124 is the requested inverter voltage 126 and that goes into another function generator 128 which has an another input the DC voltage 43, and the output is the requested inverter voltage percent 74. The DC line voltage 43 multiplied by 0.78 represents the maximum obtainable inverter output voltage. The inverter voltage 126 is divided by this maximum obtainable inverter output voltage resulting in a requested inverter voltage percent 74. The inverter frequency 48 is an output from the adder 116. The brake voltage P+I controller 102 has an input switch 130. If the control state determination apparatus 90 wants to activate the brake controller 102, the braking enable 129 closes the switch 130 to enable the error signal 60 to be fed into the brake P+I controller 102 that is functionally an integral controller. The output of the brake P+I controller 102 is the desired motor voltage 132, which goes into adder 134, which has another input called six-step inverter voltage 136. The DC line voltage 43 goes through a multiplier 138 to be multiplied times a constant K of 0.78 and the output of the multiplier 138 is the six-step inverter voltage 136 which is the maximum amount of voltage that the inverter 11 can put out in six-step operation. The adder 134 takes the desired motor voltage 132 and subtracts the six-step inverter voltage 136 and the result is the desired transformer output voltage 140, which is then fed into function generator 142 in relation to the DC line voltage 43 to produce the desired braking angle 144. This is the angle that the GTO switches in the brake circuit 80 must be turned off during every 180° cycle in order to produce the desired transformer output voltage 140. The function generator 142 calculates the desired braking angle 144 using the following equation:

$$\text{ANGLE} = \frac{360}{\pi} \text{ARCSIN}\left(\frac{\pi}{4} \cdot \frac{V_{TX}}{V_{TDC}}\right)$$

where $V_{TX}$ is the desired transformer output voltage 140 and $V_{TDC}$ is the instantaneous voltage appearing across the secondary of the braking transformer, such as 550 V for a turns ratio of 9 and a power supply 10 voltages of 600 V. This braking angle 144 must be between zero and 80° out of that 180° during which the GTO switches in the braking circuit 80 will be turned off and thus be providing the brake circuit voltage across the motor for that angle. The desired braking angle 144 goes into the limiter 146 to limit the desired braking to no less than zero degrees and to no more than 80°. The zero degree limit is provided because a negative amount of time is not available out of the GTO switch, and the 80° limit is provided because at that point the GTO switch is getting close to being off when the current has the wrong polarity such that this would induce a negative voltage to subtract from the provided inverter motor voltage. One output of the limiter 146 is the requested braking angle 70 and another output is the angle limit 148, which is fed back to preset the brake P+I controller 102 to clamp the integral portion of the P+I controller 102. The angle limit 148 also feeds back into the control state determination apparatus 90 to determine if a change to a different control state is needed. For example, once the transformer brake operation runs out of voltage, which happens when the braking angle reaches 80°, the control state determination apparatus 90 may want to go to the high slip next control state which results in holding the maximum braking angle and then increasing the slip to get a little bit of additional braking torque. For another example, once the GTO switch operation reaches a zero degree angle, the control state determination apparatus 90 can get out of transformer braking since there is no longer a need for it. The control state determination apparatus 90 outputs a braking thyristor enable 68 to either turn on the thyristors or turn them off. Within a state of transformer braking, the braking thyristor enable 68 keeps the thrystors off, and when not in a state of transformer braking, the thyristors are kept on.

The slip controller preset 107 operates when needed to provide a desired slip frequency 108 having a predetermined or clamped value. The brake controller preset 109 operates when needed to provide a desired motor voltage 132 having a predetermined or clamped value.

The inverter and braking synthesis apparatus 76 provides a synthesis mode determination 50. The requested inverter frequency 48, the requested inverter voltage percent 74 and the present control state 78 are input to the synthesis apparatus 76, and the synthesis mode output 50 will determine the type of synthesis operation that is wanted, such as one of PWM, quasi six-step or six-step.

Figure 9:
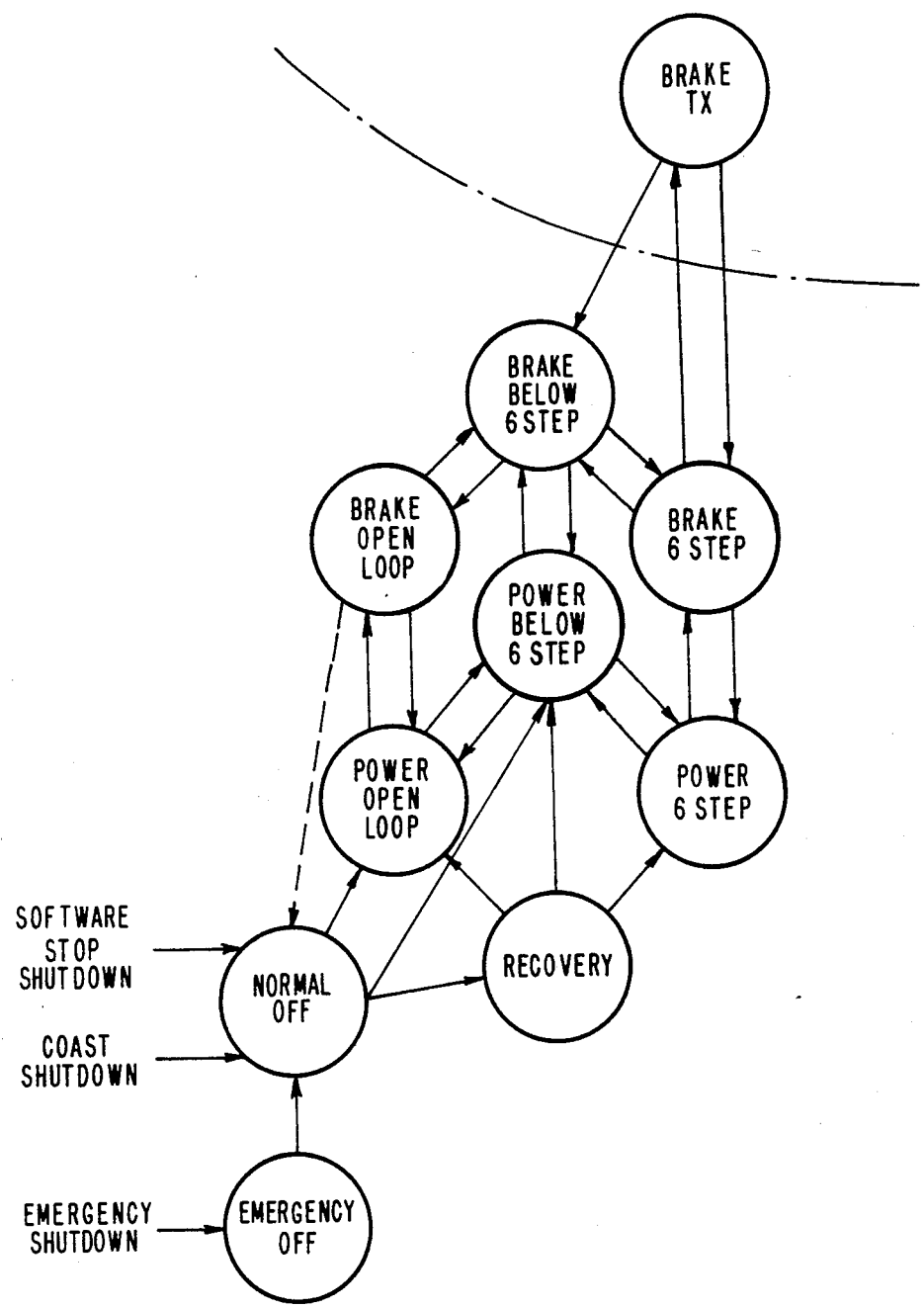
FIG. 9 shows the control states of the present AC motor control apparatus.

In FIG. 9 there is shown the control states of the present AC motor control apparatus.

The operation of the present control apparatus can be divided into the three basic states: off, power, or brake. The off state can be further divided into normal or emergency off states, which both indicate that the system is not operational. A normal off condition results from a command by the vehicle control input, such as from the operator's master controller. An emergency off condition results from a system shutdown as a result of an unacceptable condition such as overcurrent or low line voltage.

The power state is divided into the two regions of below or above base speed. The distinction is made because below base speed the motor is essentially operated under constant volts per hertz condition resulting in maintaining a desired air gap flux density, whereas in the above base speed range the inverter is operated in the six-step mode to give the maximum obtainable output torque from the motor and the air gap flux density is decreased as a result of increased speed. Above base speed operation is similar to the field weakening region in DC propulsion equipment.

The brake state comprises the same two basic divisions as the power state of below and above base speed. The below base speed region is also similar to the power case since the inverter is capable of providing the demanded torque by itself. The brake above base speed is more complicated since the inverter cannot generate the required torque alone and the regeneration braking circuit must be used. The brake above base speed region is further divided into three separate sections:
  (A) brake above base speed and below rated slip;
  (B) brake above base speed at rated slip with regeneration circuit not at max capability;
  (C) brake above base speed with regeneration circuit at max capability and slip at more than rated slip.

The transitions between these control states are made through special transition routines which define the possible control states that can be entered based on the present control state and the existing conditions such that a transition can be made from power above base speed to brake above base speed and below rated slip A, but not to the other two brake above base speed conditions B or C.

The basic control philosophy is one of slip control, that is, the slip of the motor is adjusted by varying the operating frequency of the inverter in order to achieve the desired torque output. During the operation in the below base speed region, the motor is kept in the rated volts per hertz operation, resulting in rated air gap flux density. Whereas above base speed, the inverter is at maximum voltage output. In this mode of operation inverter voltage cannot be manipulated to obtain rated air gap flux density.

If a motor is in a braking state above base speed, it is desirable to obtain more braking torque than can be achieved by adjusting slip at the maximum voltage output. It is not possible to get the required braking rate without somehow increasing the motor voltage. A special transformer circuit is used to provide the extra voltage needed by the motor. When braking the motor above base speed, the slip of the motor is manipulated to arrive at the desired torque. If by the time slip reaches the rated value and the desired torque is not reached, then the slip is held at that value and the transformer voltage controller is released to increase the voltage on the motor for increasing the torque output in brake until the maximum angle is reached at about 80°. Then the transformer controller is locked at this position and the slip controller is released allowing the slip to increase above its rated value up to an absolute maximum slip in order to satisfy the torque request. This strategy is provided to keep the currents in the GTOs under a preset limit of 350 amps RMS in order to avoid shutdowns due to overcurrent conditions while providing the torque needed to satisfy the torque request.

The control operation is initialized at the control state of emergency off, such that the start-up or power-up operation is emergency off. From emergency off, the only other next state is normal off, and the operator car controller allows that transition. Once in normal off and the car controller requests go, a jump can be made to either the recovery state, to the power open loop state, or to the power below six-step state. While in the emergency off state, a check is made to see if the recovery timer is timed out, which is a timer provided to keep the control state in emergency off for a predetermined time period. Then a change of the control state to normal off and then to either power below six-step, power open loop, or recovery is made depending upon operating conditions. Once the inverter is running then the determine mode routine is executed to see if it is desired to change to another state. For example, if the control was in power below six-step and a brake request is received, a change would be made to brake below six-step, and the operation is going to change from power to brake. Most of the paths indicated in FIG. 9 are determined in the determine mode routine with the exception of the changes between six-step and below six-step which are in the synthesis transition. The other paths are done under the determine mode routine. For example, if the present control state is power below six-step, the determine mode routine will check the conditions to go either to power open loop, or to go to brake below six-step and those are the only choices available. The synthesis will check the conditions to go to power six-step.

Figure 10:
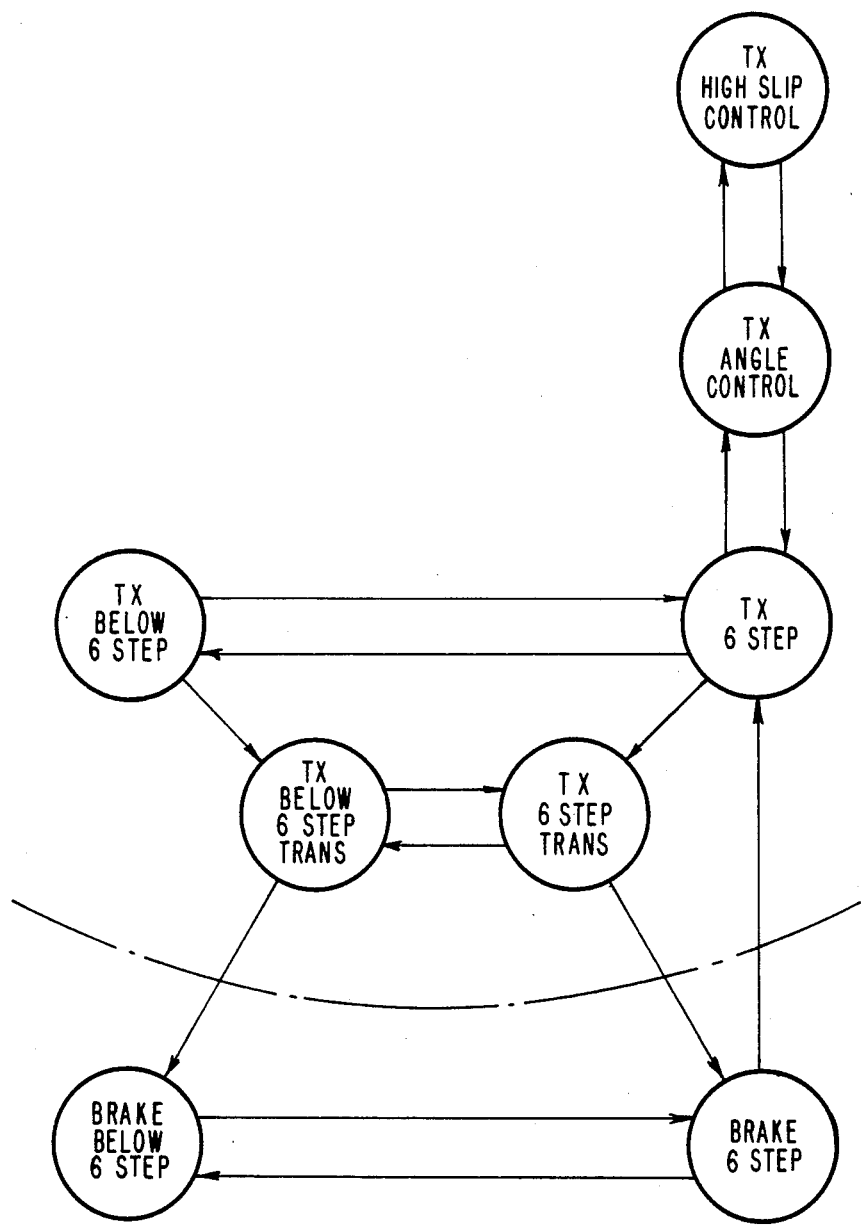
FIG. 10 shows the brake TX control substrates of the present AC motor control apparatus.

In FIG. 10 there are shown the brake TX substates, which are control states within brake TX as shown in FIG. 9. In FIG. 9 there are shown the ten different control states, and the brake TX as shown in FIG. 10 includes six substates. Every time the operation cycles through the determine mode routine a check is made to see if there is a desire to go to a different control state or control substate. The determine mode routine checks predetermined criteria to see if there is a desire to change to another control state.

Figure 11:
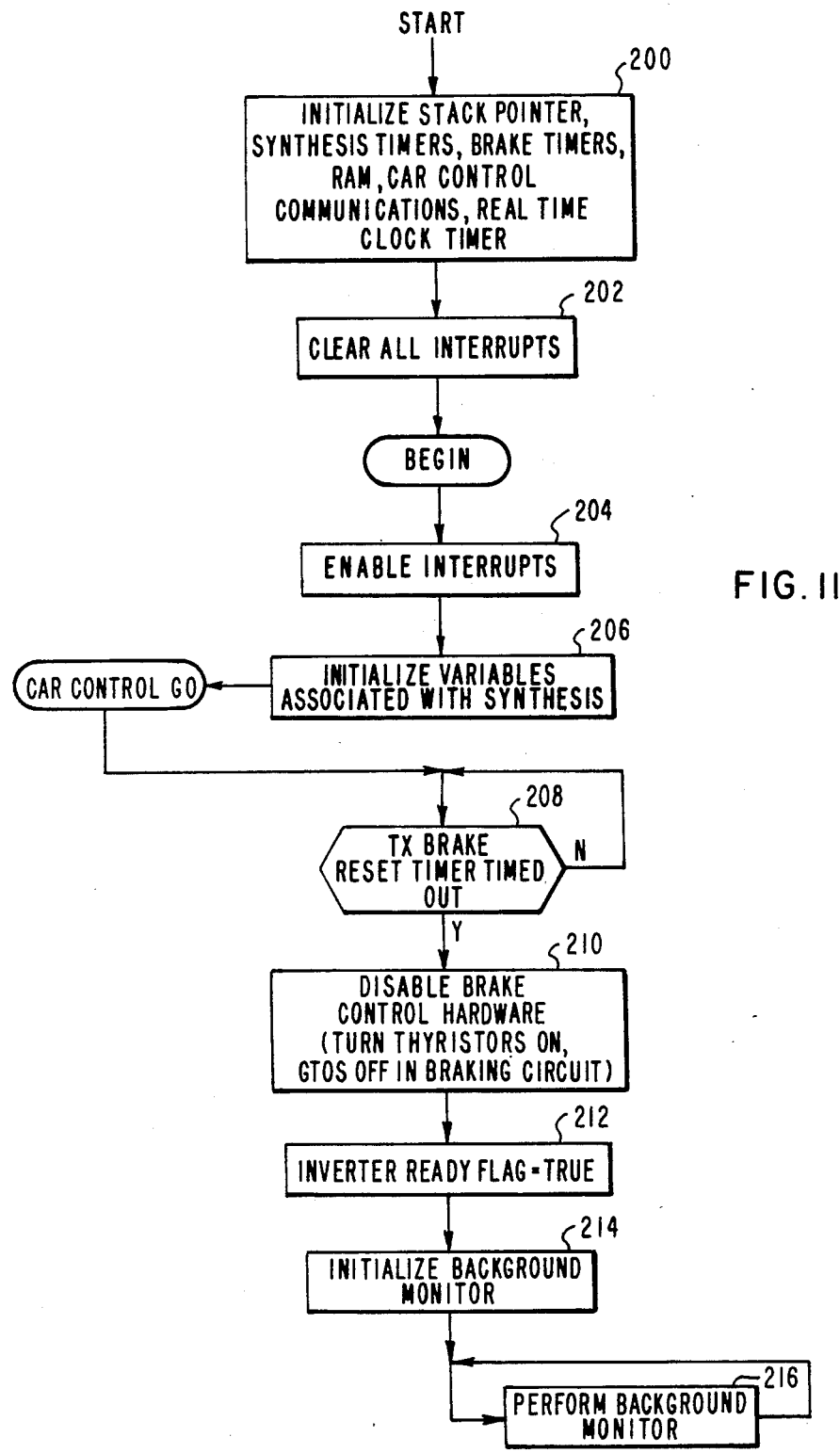
FIG. 11 shows a flow chart of the main start-up loop program and the start-up after a fault condition.

In FIG. 11, there is shown the power-up or start routine. When the processor powers up, a jump is made to this location. In block 200, the stack pointer is initialized for all of the stack functions. The synthesis timers and the brake timers are set in the OFF state. The RAM memory is initialized as well as the car control communications for communication with the car control. A real time clock timer is initialized to the right frequency of 720 Hz. Block 202 clears all of the interrupts. The program then enables all interrupts at block 204. The only interrupts that should be present are from the real time clock since the motor operation is not started yet. Block 206 initializes all variables associated with the synthesis operation. Every time the control pulse synthesis operation starts or restarts, it is necessary to initialize the associated variables.

A check is made at block 208 to see if the transformer brake reset timer is timed out. When the transformer braking operation is shut down for a fault condition, it is shut down to one state and after a certain while it is changed to another state, and there is a timer provided between those two states to control the change to the final state. If this timer is not timed out, the program waits at block 208 for the timer to time out. At block 210, the brake control hardware is disabled as the second state of the brake control shutdown, and this involves turning the thyristors ON and the GTO switches are turned OFF in the braking circuit. At block 212, the inverter ready flag is set equal to true to tell the main control loop that the processor is ready to do the synthesis operation. The real time interrupts are looking at this flag, and until this flag is set equal to true the program does not proceed to operate the motor. The background monitor is initialized at block 214 to operate with a video display to show what is going on. At block 216 the background monitor is operated to provide desired testing for development and related purposes to display diagnostic type information. Real time interrupts occur while in this background monitor loop. The actual motor controller 62 functions shown in FIG. 8 are performed during these real time interrupts. The inverter and braking synthesis 76 is performed by the microprocessor during interrupts from the synthesis timers which can occur whenever the microprocessor is either in the background monitor loop or the real time interrupt calculations. After performing the instructions in an interrupt procedure, the microprocessor returns to the routine it was performing when the interrupt occurred. The flow chart in FIG. 11 shows the main start-up loop program and also the start-up after a fault condition.

Figure 12A:
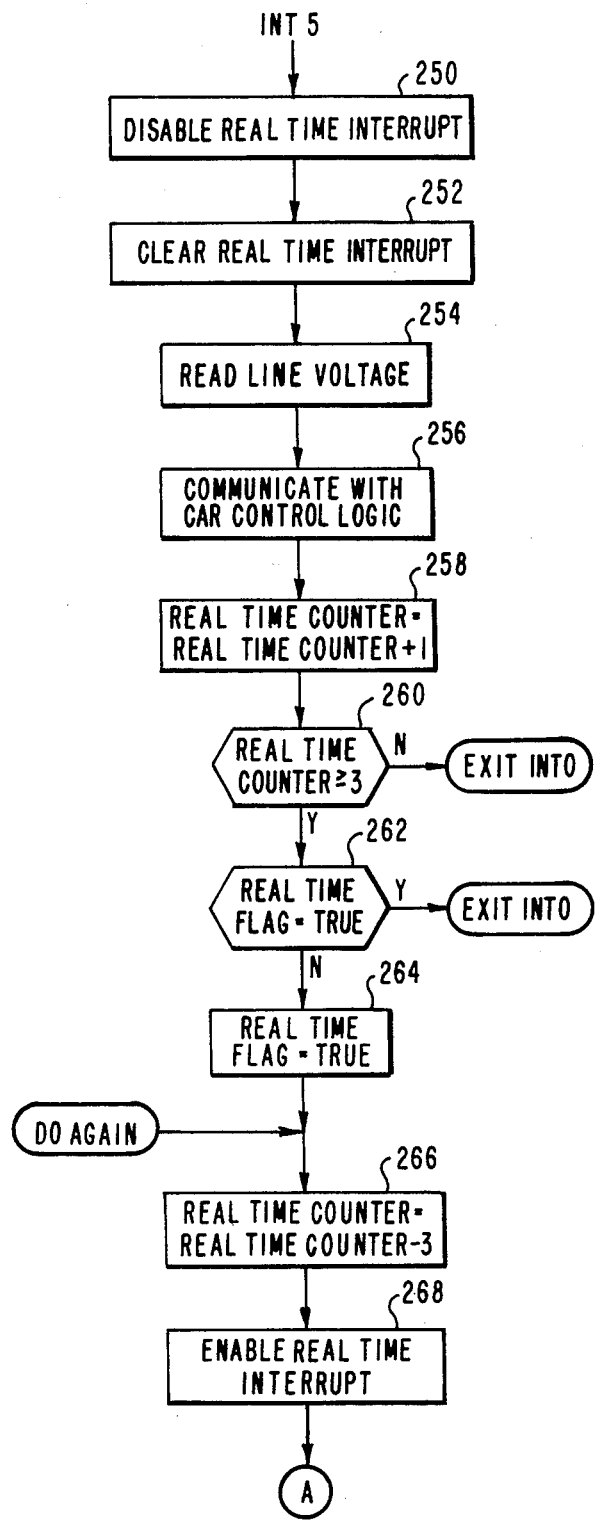
FIGS. 12A and 12B show a flow chart of the main interrupt program.
Figure 12B:
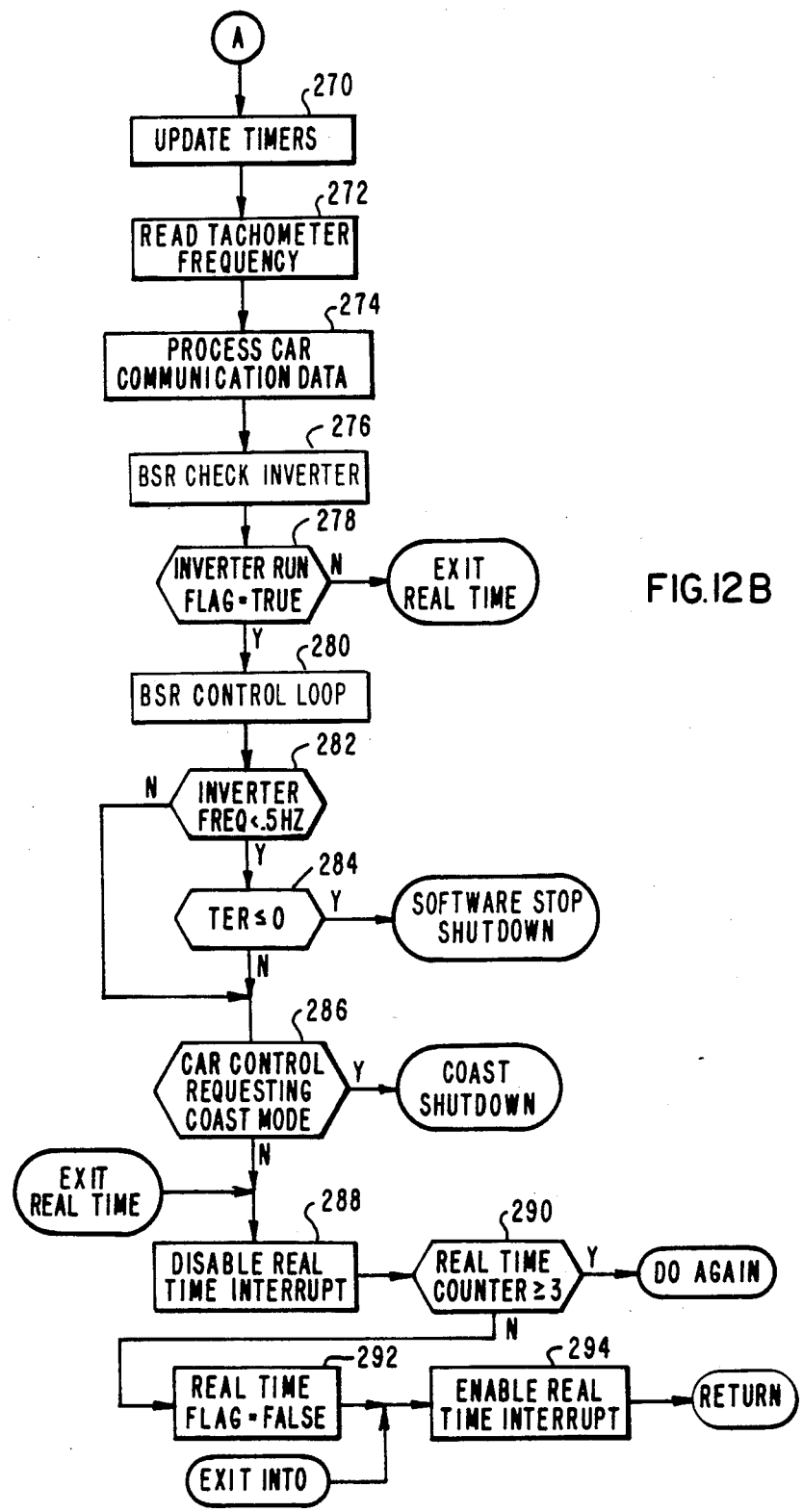

The flow chart in FIGS. 12A and 12B shows the interrupt program to which the operation jumps upon receiving a real time interrupt. Once an interrupt is received, the first time at block 250 is to disable the real time interrupt. Block 252 clears the real time interrupt to acknowledge receipt of the interrupt. At block 254 the line voltage is read. A serial communications link can be provided with the power controller 17 so this serial information is obtained at a 720 Hz rate, and at block 256 new pieces of information are obtained and they are stored until the whole block of information is obtained.

There is an interrupt available for the real time clock set at a 720 Hz rate, but it is not desired to do everything at that high rate. The real time counter is incremented every time at block 258 when an interrupt is received, and once that real time counter is greater than or equal to three at block 260, the slower type of control is performed at a 240 Hz rate.

At block 262 a check is made to see if the real time flag equals true. If this flag equals true, the program was already in the process of performing the 240 Hz calculations when the 720 Hz real time interrupt occurred. It is not desirable for the 240 Hz calculations to be started again until the last set of calculations is complete. This flag is set at the beginning of the 240 Hz calculations and reset at the end in order to prevent a second set of 240 Hz calculations being started prior to the completion of the current 240 Hz calculations. If this real time flag is set to true, no new 240 Hz calculations will be started, and a jump to EXIT INTO at the end of this routine is performed. If this flag is not equal to true, a 240 Hz calculation set can be started. At block 264, the real time flag is set to true to disable the starting of a new 240 Hz calculation set until this set is complete and the real time flag is reset back to false. At block 266 three is subtracted from the real time counter. The blocks 258, 260, 262, 264 and 266 permit operation at a 240 Hz effective interrupt rate. At block 268 the real time interrupt is again enabled such that during the 240 Hz set of calculations additional 720 Hz real time interrupts can be processed. At block 270 there is an update of the timers used in all routines of the program to add 1/240 of a second to each of the timers. For a 1 second timer this routine would run 240 times for that timer to finally expire. At block 272 the tachometer frequency is read. If the communication at block 256 with the car control logic has provided a whole block of information, then at block 274, the commands from the power controller 17 are processed, such as the desired tractive effort wanted from the motors and the desired direction of forward or reverse. At block 276, a branch is made to a subroutine called Check Inverter, which checks to see whether the inverter wants to be run or is running. In block 276 as well as throughout the flowcharts, the abbreviation BSR is used to indicate a branch to subroutine. The name of the subroutine to be branched follows the BSR initials. When a branch to subroutine, also referred to as a subroutine call, is encountered, the program execution jumps to that subroutine and the instructions of that subroutine are executed. At the end of the subroutine is a return statement that causes the program execution to be transferred back to the routine that contains the subroutine call; and execution resumes with the first instruction after that call instruction. At block 278, the inverter run flag is checked to see if it equals true, and if not a real time exit is made to a later part of the program. If this flag is true, at block 280, shown in FIG. 12B, a branch is made to a control loop routine which is the actual control program. At block 282, a check is made to see if the inverter frequency is less than 0.5 Hz and at block 284 a check is made to see if the power controller 17 is requesting a tractive effort less than or equal to zero. If the answer is yes, the motor is almost stopped and there is no request to go into power, so a software stop shutdown is provided by a shutdown routine that actually shuts down the inverter, the braking circuit, and reinitializes all the variables, and then returns back to the power up routine in FIG. 11 at the car control GO label. In block 286, a check is made to see if the car control or power controller 17 is requesting a coast mode. When the car control requests a coast mode, the inverter is shut down and the car coasts and the program goes to a coast shutdown routine. The exit real time label from block 278 is provided here. At block 288, this is close to the end of the real time interrupt, so the real time interrupt is now disabled to permit a check of the real time counter at block 290, without the 720 Hz routine providing an interrupt at the same time. If that real time counter is still greater than or equal to 3, indicating that it got incremented before the program could get through this routine, the program goes back to block 266 to repeat the 240 Hz calculation portion of the routine until the real time counter is less than 3. Eventually, it will get to be less than 3. At block 292, the real time flag is set equal to false so future 240 Hz calculation sets can be performed. Block 294 re-enables the real time interrupts and a return is made to the perform background monitor block 216 of FIG. 11.

Figure 13:
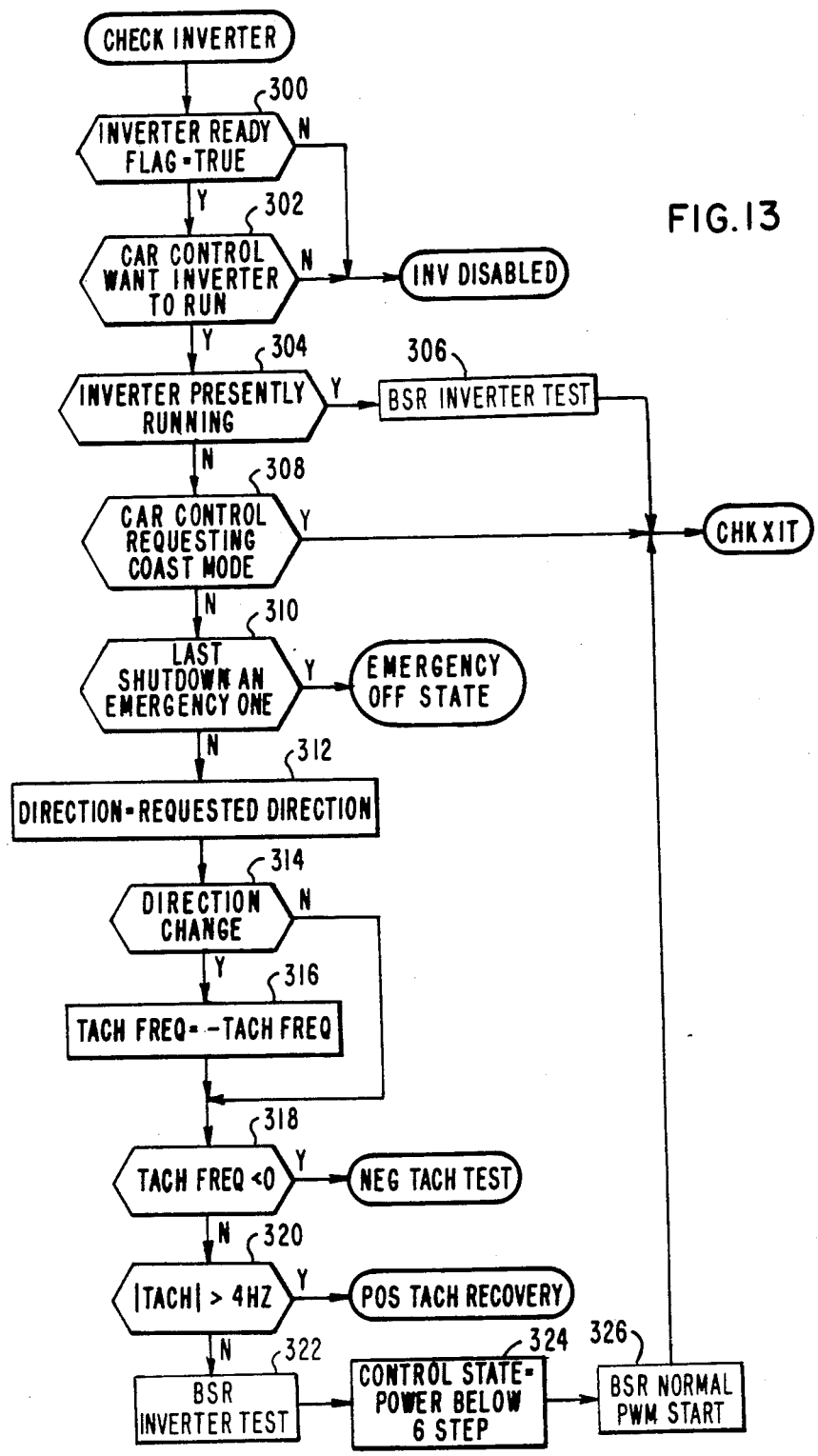
FIG. 13 shows a flow chart of the check inverter routine called by the interrupt program of FIG. 12A.
Figure 16:
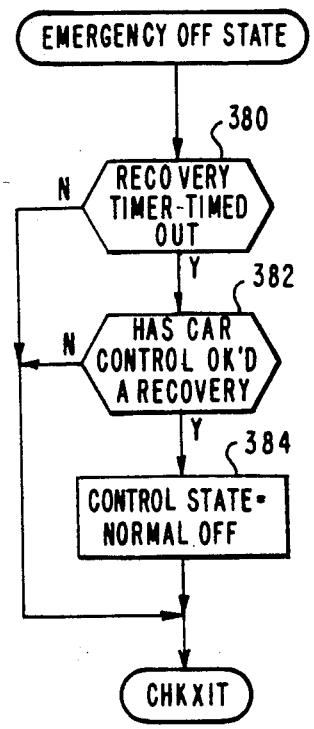
FIG. 16 shows a flow chart of the emergency off state routine called by FIG. 13.

In FIG. 276 a branch is made to a check inverter subroutine shown in FIG. 13. Block 300 makes a check to see if the inverter ready flag is equal to true. During the power up routine, when the processor is ready to go, this flag is set equal to true. If this flag is not equal to true, then a jump is made to a label called INV DIS- ABLED which prevents the inverter start up. If this flag is true, a check is made at block 302 to see if the car control wants the inverter to run, and if not a jump is made to the INV DISABLED label. If it does, at block 304 a check is made to see if the inverter is presently running. If it is presently running, the program goes to block 306 to an inverter test subroutine shown in FIG. 18 to make a desired test, and then it branches to CHKXIT to exit from the routine. If the inverter is not presently running, a check is made at block 308 to see if the car control is requesting COAST MODE. If the car control is requesting COAST MODE, then there is no need to restart the inverter until that COAST MODE request disappears and the routine exits. If it is not requesting COAST MODE, at block 310 a check is made to see if the current control state is EMERGENCY OFF. If so, a fault condition such as a current overload caused the last shutdown and the car control must okay a restart before the inverter can be started again. If the control state is EMERGENCY OFF, a jump to the emergency off state routine of FIG. 16 is performed. If the control state is not set to EMERGENCY OFF, it must be set to NORMAL OFF and block 312 will be executed. At block 312 the direction is set equal to the requested direction which comes from the car control. At block 314 a check is made to see if a direction change has occurred. If a direction change is made from forward to reverse, or from reverse to forward, at block 316 the tach frequency is set equal to the minus tach frequency, since for a change of direction the tach reading is actually the negative tach because it is desired to go in the opposite direction.

At block 318 a check is made to see if the tach frequency is less than zero. If the tach frequency is less than zero, that means the train is rolling backwards, and the program goes to the negative tach test routine. If not, at block 320 a check is made to see if the absolute value of the tach is greater than 4 Hz. If it is greater than 4 Hz, then a recovery procedure is needed to avoid voltage transients. If the tach is less than 4 Hz, at block 322, a branch is made to an inverter test subroutine which basically checks whether the line voltage is within desired limits for the inverter to run. At block 324, the control state is set equal to power below six-step. At block 326, a branch is made to a subroutine shown in FIG. 61 providing a normal PWM start of the synthesis operation and then a jump is made to check exit which is the end of this routine.

In FIG. 4, there is shown the negative tach test subroutine jumped to from block 318 of FIG. 13. At block 350 a check is made to see if the tractive effort request is greater than zero. If the car is rolling back and the tractive effort request is not greater than zero, the program goes to check exit and lets the friction brake stop the vehicle. If the tractive effort request is greater than zero, then at block 352 a check is made to see if the tach is less than minus 10 Hz, and if it is, this is going to result in an error shutdown. This would indicate that the car is rolling back faster than about 4 miles/hour, which is an unlikely condition and is actually probably due to a fault in the tachometer and it is not desirable to start up under such conditions. If the car is not rolling back faster than 10 Hz, at block 354 a check is made to see if the absolute value of the tach, which in this case is negative, is greater than 4 Hz. If the car is not rolling back at more than 4 Hz, at block 356 a branch is made to the inverter test subroutine, where a check is made to see if the line voltage is within desired limits. At block 358 the control state is set equal to power open loop. Since the vehicle is rolling backwards, the car must first be slowed to a stop and then accelerated in the desired direction. The process of slowing the vehicle is actually a braking operation, and the torque feedback calculation is not reliable at extremely low frequencies below 10 Hz; therefore, the vehicle must be slowed down under an open loop control method. With open loop control, an amount of slip frequency proportional to the car control 175 torque request is applied to the motor and the calculated feedback torque is ignored. The applied slip frequency will result in a motor torque which crudely approximates the desired motor torque. At block 360 a branch is made to a subroutine called normal PWM start shown in FIG. 61 which will start the inverter using PWM synthesis. If there was a tach frequency greater than 4 Hz at block 354 a recovery procedure is required and at block 362 a branch is made to the subroutine called inverter test to make sure the line voltage is within desired limits. If it is, then at block 364 the control state is set equal to recovery. At block 366 a subroutine branch is made to the rail gap recovery routine shown in FIG. 19 which will start the inverter using a special recovery procedure that will increase the motor voltage slowly enough so as not to result in large transient currents which would immediately cause the inverter to shut down again.

Figure 15:
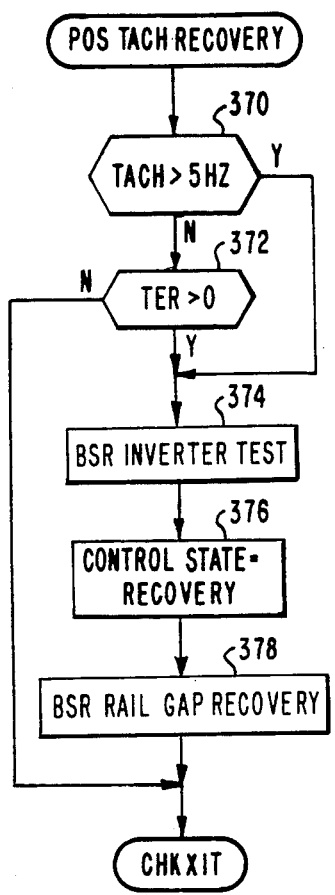
FIG. 15 shows a flow chart of the positive tach recovery routine called by FIG. 13.

In FIG. 15, there is shown the flow chart for the positive tach recovery routine jumped to from block 320 of FIG. 13. This routine is jumped to from block 320 if the tach frequency is positive and greater than 4 Hz. If the inverter is to be started, a recovery procedure will have to be performed. At block 370 a check is made to see if the tach is greater than 5 Hz, and if it is greater than 5 Hz, it doesn't matter what the tractive effort is. If at block 370, the tach is not greater than 5 Hz and at block 372 the tractive effort request is not greater than zero, then a branch is made to check exit, and the inverter is not started. If either one of those conditions is true, then at block 374 a branch is made to inverter test, which checks the line voltage. At block 376 the control state is set equal to recovery and at block 378 a branch is made to the rail gap recovery subroutine to start the inverter.

In FIG. 16, there is shown the flow chart for the emergency off state routine, which was jumped to from 310 of FIG. 13. This path will be executed if the current control state is EMERGENCY OFF. At block 380 a check is made to see if the recovery timer has timed out. After the inverter is shut down, a certain amount of time is required for all the currents and flux to die in the motor before an effort to start is made to avoid getting a transient and another current overload and shut down again. If this timer is not timed out, the program goes to check exit. If it is timed out, a check is made at block 382 to see if the car controller has approved a recovery. If it is okay to recover, then at block 384, the control state is set to NORMAL OFF thus allowing the inverter to start up in the future if so desired. The inverter cannot be started from the EMERGENCY OFF control state. The control state must be NORMAL OFF for the inverter to be started as shown in FIG. 9.

Figure 17:
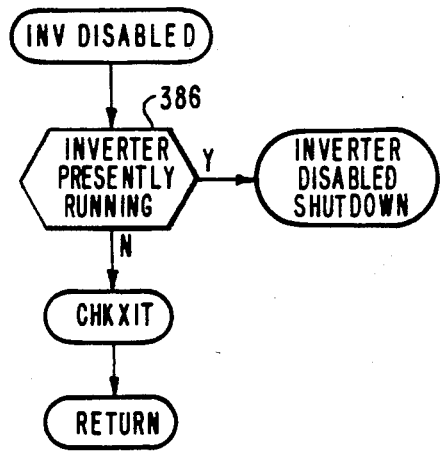
FIG. 17 shows a flow chart of the inverter disabled routine called by FIG. 13.

In FIG. 17 there is shown a flow chart for the inverter disabled routine jumped to from blocks 300 and 302 of FIG. 13. This routine is executed if the inverter is desired to be off. At block 386 a check is performed to see if the inverter is presently running. If yes, a jump is performed to the shutdown procedure shown in FIG.

63 to shut down the inverter. If the inverter is not presently running at block 386, CHKXIT is jumped to and the inverter remains off.

Figure 18:
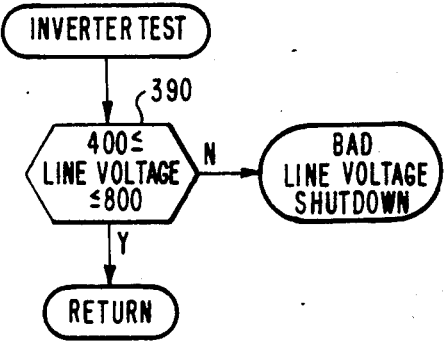
FIG. 18 shows a flow chart of the inverter test routine called by FIG. 13.

In FIG. 18, there is shown the inverter test subroutine. At block 390, a check is made to see if the line voltage is between the desired limits of 400 and 800 volts. If it is, then a return is made. If not within these limits, then a bad line voltage shutdown will be performed by the shutdown procedure shown in FIG. 63 which will shut down the inverter if it is running.

Figure 14:
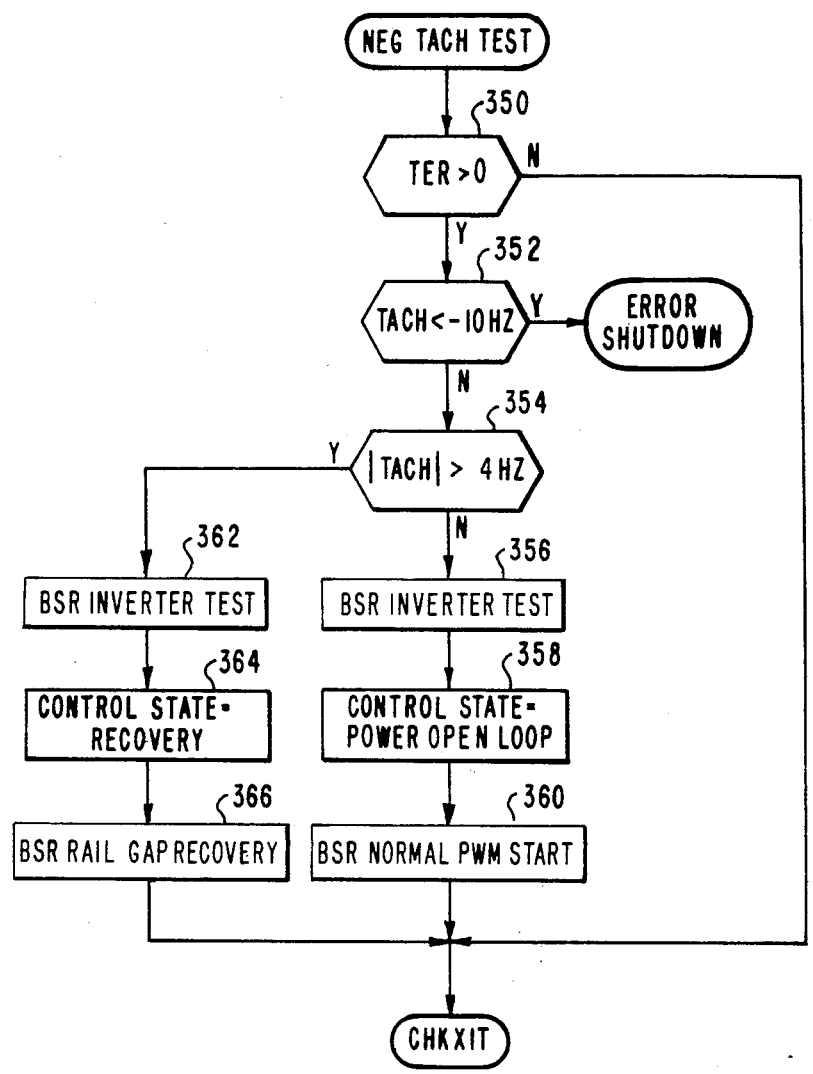
FIG. 14 shows a flow chart of the negative tach test routine called by FIG. 13.
Figure 19:
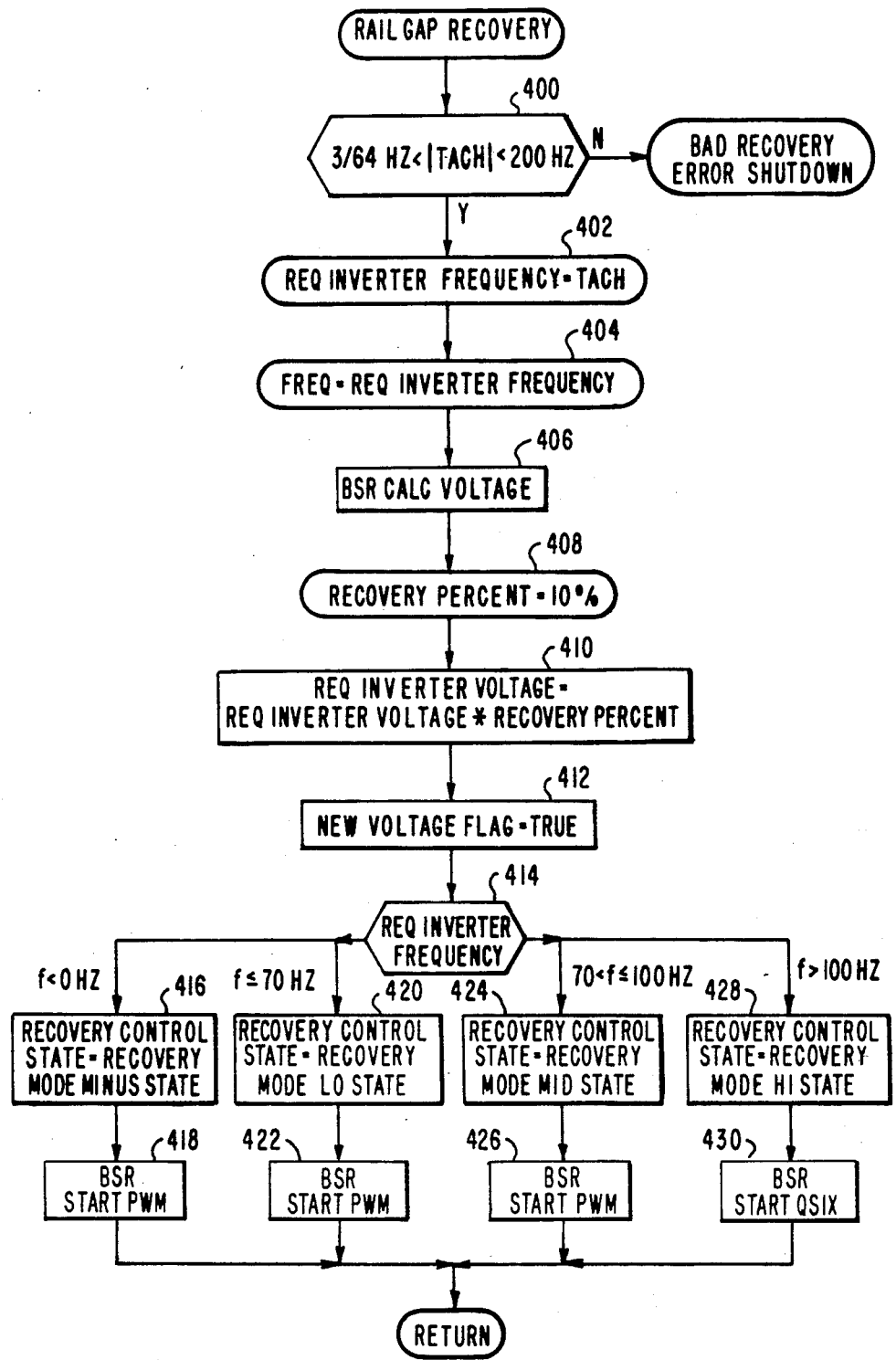
FIG. 19 shows a flow chart of the rail gap recovery routine called by FIGS. 14 and 15.

The rail gap recovery routine shown in FIG. 19 is called from block 366 of FIG. 14. This subroutine starts the inverter if the motor is rotating at a speed greater than the equivalent of 4 Hz which is 120 rpm. It initiates the use of a special recovery procedure which consists of increasing the motor voltage slow enough so that large transient currents do not occur which would immediately result in the inverter shutting back down again due to an overcurrent condition. In block 400, a check is made to see if the absolute value of the tach frequency is between 3/64 Hz and 200 Hz, and if not, a start up of the inverter is not desired and a bad recovery error shutdown is performed by FIG. 63. If those tests pass, at block 402, the requested inverter frequency is set equal to the tach frequency to provide zero slip. In block 404, the frequency is set equal to the requested inverter frequency. At block 406, the calc voltage subroutine is called and this routine takes that frequency that FREQ variable is set to in block 404, and calculates what voltage is desired to keep a constant volts per hertz motor operation, and provides a requested inverter voltage. Since this is a recovery operation, that whole voltage is not applied across the motor. At block 408 a percentage of 10% is selected. At block 410 the requested inverter voltage is set equal to the requested inverter voltage times the recovery percent to determine the volts that are desired. At block 412, the new voltage flag is set equal to true because a new voltage has been determined, so the synthesis operation has to calculate a few extra steps. At block 414 a check is made of the requested inverter frequency. If the requested inverter frequency is less than zero hertz, at block 416 the recovery control state is set equal to the recovery mode minus state since there is a negative frequency and at block 418 a branch is made to the START PWM subroutine for starting the inverter using PWM synthesis. If the frequency is between zero and 70 Hz, at block 420 the recovery control state is set equal to the recovery mode low state, and at block 422 a branch is made to the START PWM subroutine for a start-up using PWM synthesis. If the frequency is between 70 and 100 Hz, at block 424 the recovery control state is set equal to the recovery mode mid state, and a branch is made to the subroutine START PWM at block 426. If the frequency is greater than 100 Hz, at block 428 the recovery control state is set equal to recovery mode high state. In block 430 a branch is made to the START QSIX subroutine to start the inverter using Quasi six-step synthesis.

Figure 20:
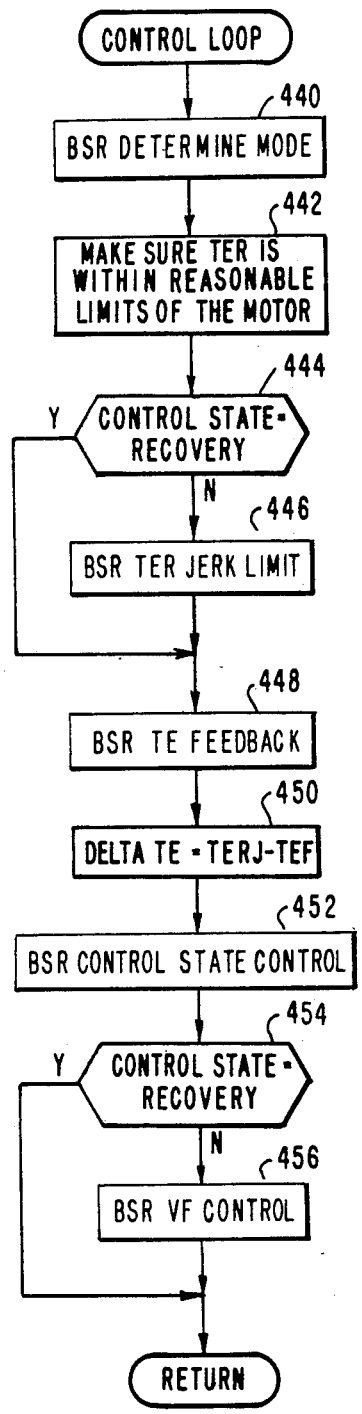
FIG. 20 shows a flow chart of the control loop routine called by FIG. 12B.
Figure 21:
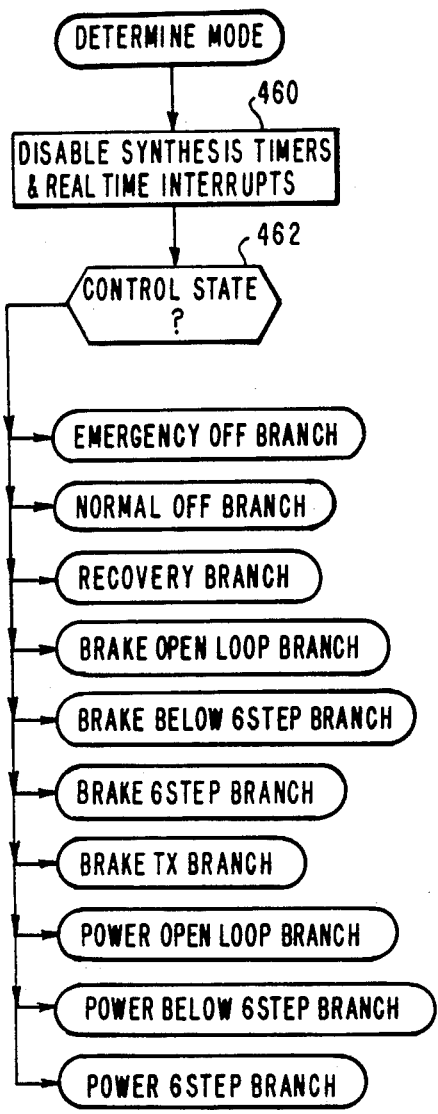
FIG. 21 shows a flow chart of the determine mode routine called by FIG. 20.

Another subroutine called by the main real time interrupt routine shown in FIG. 12B is the control loop routine shown in FIG. 20, which is the basic control loop program. In block 440 a subroutine called Determine Mode is called as shown in FIG. 21. There are only two places where control state changes are permitted, with one being in this determine mode subroutine, and the other being in the synthesis operation for controlling changes between Quasi six-step and six-step.

The control loop subroutine performs all other control state changes. In block 442 the TER or torque effort request coming from the car control is checked to be within reasonable limits of the motor, and it is clamped if not within reasonable limits. At block 444 a check is made to see if the control state equals recovery and if it does not equal recovery at block 446 a branch is made to the TER jerk limit subroutine, which calculates the jerk limited torque effort request to provide a comfortable change in acceleration. If the control state does equal recovery, it is desired to hold the torque effort request at zero because the motor is held at zero slip until the voltage is brought up. Then TERJ will increase from the zero value set in the recovery state. At block 448, a branch is made to the TE feedback routine, disclosed in the above cross referenced patent application Ser. No. 696,832 concurrently filed and the disclosure of which is incorporated by reference, to calculate the feedback torque of the motor. In block 450, delta TE is set equal to TERJ—TEF, which is the difference between the desired jerk limited torque effort and the calculated feedback torque effort. Delta TE is an error signal for the motor controller. In block 452 a branch is made to the control state control subroutine, and this establishes the PI controller for the slip and the integral controller for the transformer voltage. At block 454 a check is made to see if the control state equals recovery, and if it does not at block 456, a branch is made to the V/F control subroutine that checks to see if the inverter frequency is within desired limits and calculates the voltage that corresponds with the inverter frequency. If the control state is equal to recovery, it is not desired to calculate the inverter voltage at this time because for the recovery case the inverter voltage is calculated in the control state control subroutine called by block 452.

In FIG. 21, there is shown the flow chart for the determine mode subroutine which determines if a control state change is desirable. If so, the control state is changed to the new desired state. FIGS. 9 and 10 show all of the allowable control states and all of the allowable control state change paths. The Quasi six-step to six-step transitions are not included since they are controlled by the synthesis routine and not controlled by the determine mode routine. In block 460, the synthesis timers and the real time interrupts are disabled. Since a change of the control state is provided, it is not desired to be in the middle of changing the control state and then get a synthesis interrupt which can also change the control state. During the control state change, it is desired to disable those interrupts. In block 462 a check is made to see what is the present control state and this determines the branch made to a desired routine, such as Emergency Off, Normal Off, Recovery, Brake Open Loop, Brake Below Six-Step, Brake Six-Step, Brake TX, Power Open Loop, Power Below Six-Step and Power Six-Step as shown in FIG. 9.

Figure 22:
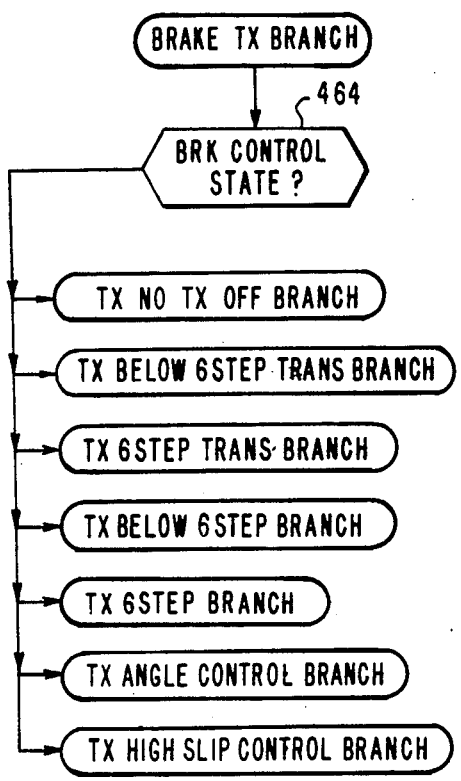
FIG. 22 shows a flow chart of the brake TX routine called by FIG. 21.

In FIG. 22, there is shown the flow chart for the Brake TX branch routine. In block 464, a check is made to see what is the current brake control state. The brake TX state is operative when the braking transformer circuit is included in the circuit to provide additional braking voltage to the motor. There are seven possible branches within the brake TX branch. They are TX No TX branch which is provided when leaving brake TX, TX Below Six-Step Transition, TX Six-Step Transition, TX Below Six-Step, TX Six-Step, TX Angle Control and TX High Slip Control as shown in FIG. 10.

Figure 23:
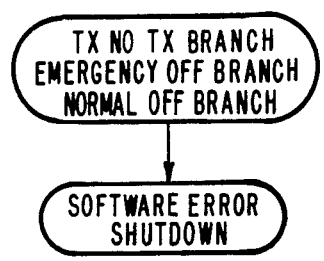
FIG. 23 shows a flow chart of the TX no TX routine called by FIG. 22 of the emergency off routine called by FIG. 21 and of the normal off routine called by FIG. 21.

In FIG. 23, there is shown the flow chart for any of the TX No TX branch, Emergency Off branch or the Normal Off branch. Such control states are not possible at this part of the program and should not occur. If they do, a software error exists and the inverter will be shut down by the shutdown procedure in FIG. 63.

Figure 24:
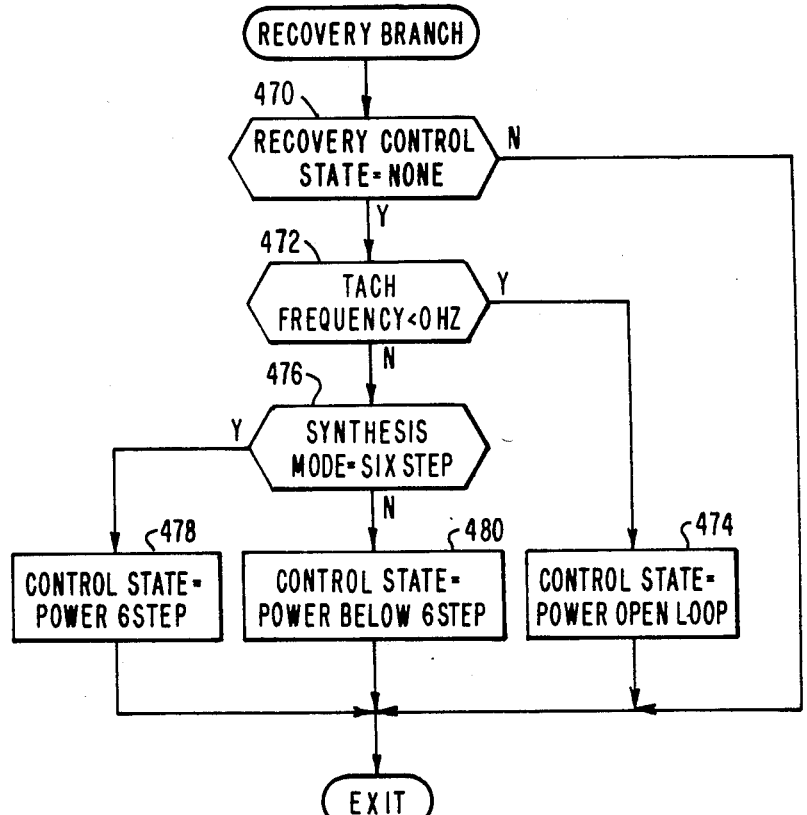
FIG. 24 shows a flow chart of the recovery routine called by FIG. 21.

In FIG. 24, there is shown a flow chart for the recovery branch. When the control state is equal to recovery, this branch is taken. The recovery state consists of substates defined by the recovery control state variable. Recovery control state is equal to one of five values: none, minus, low, mid, and high. Recovery control state is set equal to one of these last four states by the railgap recovery subroutine shown in FIG. 19 when the recovery procedure is initialized. Upon completion of the recovery procedure, the recovery control state is set equal to none which indicates that the control state can be switched from Recovery to another more desirable state. If the recovery control state is not equal to none at block 470, a jump is made to exit and the operation will remain in recovery. If the recovery state is equal to none, that means the voltage has been ramped up and the control operation is ready to do some torque control again. If it is none, then at block 472 a check is made to see if the tach frequency is less than zero hertz. If it is less than zero hertz, at block 474 the control state is set to power open loop, because when the tach frequency is less than zero hertz, the control has to do open loop power control. If the tach frequency is not below zero hertz, at block 476 a check is made to see if the synthesis mode after recovery is equal to six-step. If it is equal to six-step, then at block 478 the control state is set equal to power six-step. If it is not equal to six-step at block 476, then at block 480 the control state is set equal to power below six-step.

Figure 25:
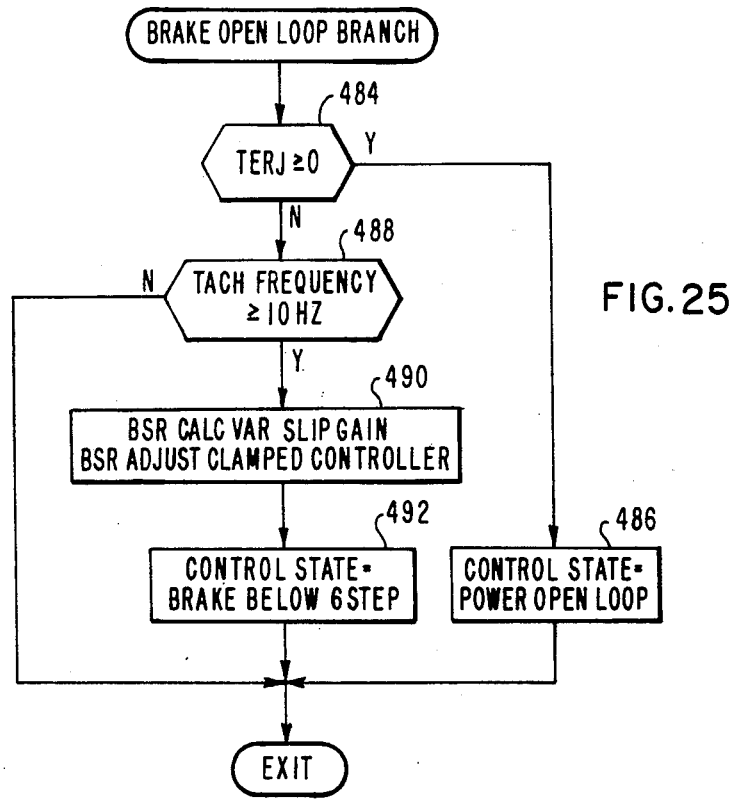
FIG. 25 shows a flow chart of the brake open loop routine called by FIG. 21.

In FIG. 25, there is shown the flow chart for the brake open loop branch. At block 484, a check is made to see if the jerk limited torque effort request or TERJ is greater than or equal to zero for selecting between power or brake. If the controller is asking for a positive torque effort request, then the control should be in power, if it is negative, then the operation should be in brake. If the control state is in brake the TERJ becomes greater than or equal to zero, at block 486 the control state is set equal to power open loop. If the TERJ is not greater than or equal to zero, then the operation remains in brake. At block 488 a check is made to see if the tach frequency is greater than or equal to 10 Hz. Since the torque feedback calculation, as described in the above cross-referenced patent application, is not considered satisfactory below 10 Hz, which is a motor speed of 300 rpm, closed loop torque control cannnot be performed. If motor braking is desired at such low operating speeds, open loop toruqe control must be used. With open loop torque control a slip frequency proportional to TERJ is used to achieve the approximate desired motor torque. No feedback torque value is used when open loop control is being performed. Normally in transit applications, motor braking is not attempted at such low operating speeds. Instead, friction brakes are called upon to bring the transit vehicle to a complete stop. At block 488, if the tach frequency is less than 10 Hz, the control state remains in brake open loop and if it is greater than or equal to 10 Hz, then a change is made to closed loop control. At block 490, a branch is made to the subroutine to calculate variable slip gain. The slip PI controller has a variable gain associated with it that compensates for variations in the gain of the system being controlled. For instance if the AC motor is being operated below base speed where rated air gap flux is maintained in the motor a certain slip frequency will result in a certain amount of motor torque. However, if the motor is being operated at high speed where rated air gap flux cannot be maintained, a much lower motor torque will result from that same slip frequency. The system is said to have a lower gain at the high speed than it does at below base speed. To compensate for this drop in gain, the controller's gain is raised at high speeds. After the variable slip gain is calculated, a branch is made to the subroutine adjust clamped controller, which sets up the PI controller to be at the right initial conditions to make a smooth transition from open loop to closed loop control. At block 492 the control state is set equal to brake below six-step and an exit is made. This completes the brake open loop case.

Figure 26:
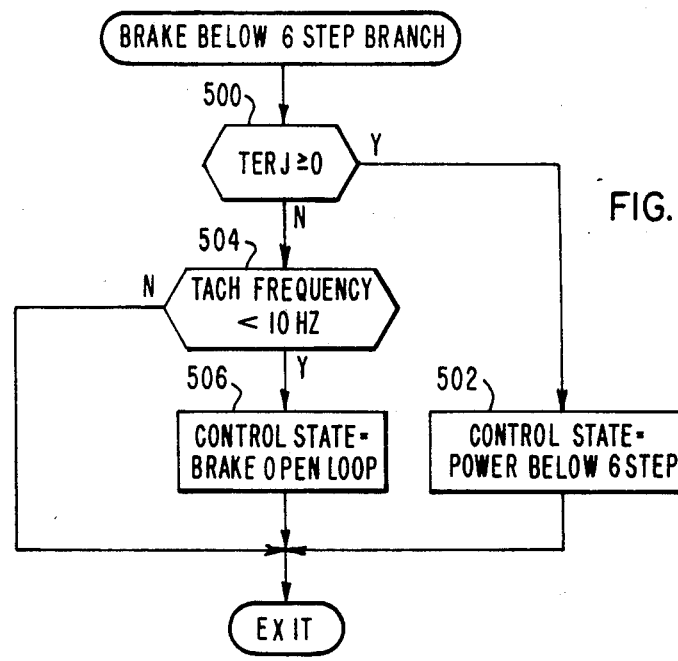
FIG. 26 shows a flow chart of the brake below six-step routine called by FIG. 21.

In FIG. 26, there is shown the flow chart for the brake below six-step branch. At block 500 a check is made to see if the TERJ is greater than or equal to zero. If it is, at block 502 a change is made to the corresponding power below six-step state. If not, at block 504, a check is made to see if the tach frequency is less than 10 Hz, and if the tach frequency has fallen below 10 Hz, then at block 506 the control state is set to brake open loop. If the tach frequency is not below 10 Hz, the controller remains in the brake below six-step control state.

Figure 27:
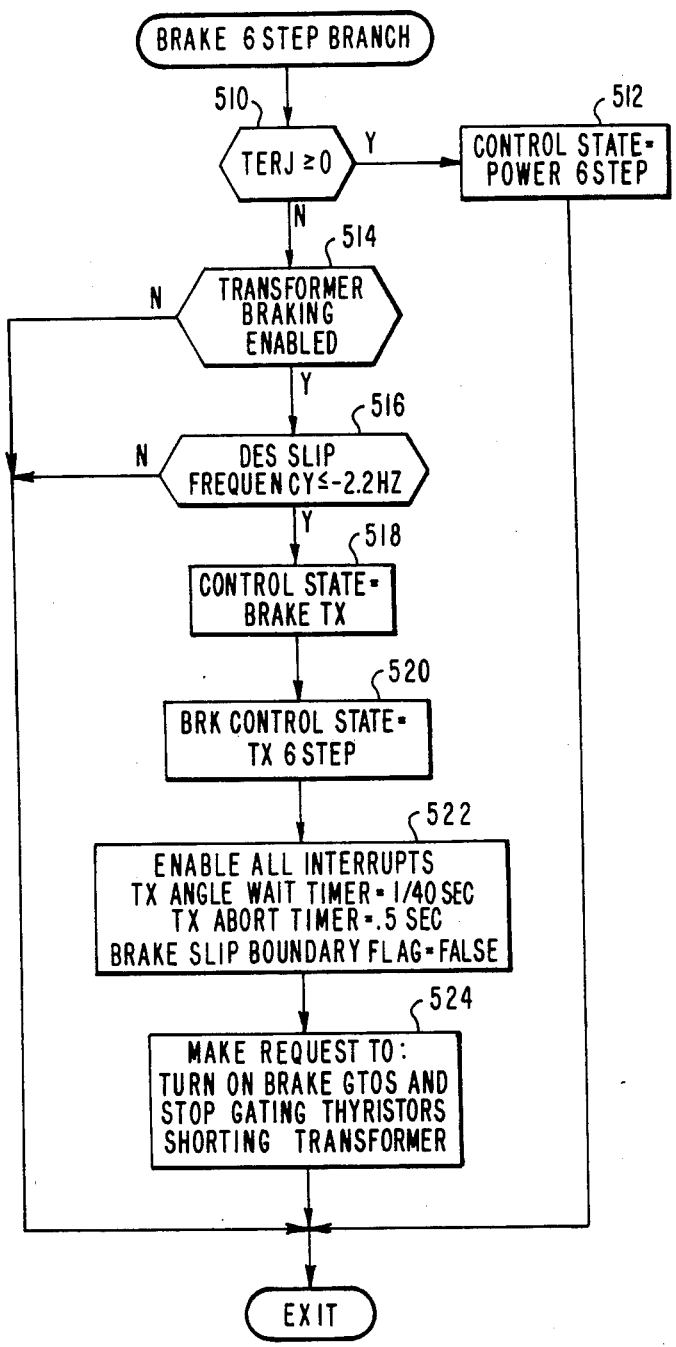
FIG. 27 shows a flow chart of the brake six-step routine called by FIG. 21.

In FIG. 27 there is shown the flow chart for the brake six-step branch. The brake transformer circuit can only provide brake voltage in six-step, so this routine has to consider that event. At block 510, a check is made of the TERJ to see ifwe're greater than or equal to zero to establish if we should go to power, and if it is greater than or equal to zero, then at block 512 the control state is set to power six-step and an exit is made. If not, at block 514 a check is made to see if transformer braking is enabled to determine that there is no problem with the use of the braking transformer. If the transformer braking is not enabled, an exit is made. A change of state to below six-step cannot be made here, since this has to be done by the synthesis program. At block 516 if transformer braking it is enabled, a check is made to see if the desired slip frequency is less than or equal to minus 2.2 Hz. A minus 2.3 Hz would be less than minus 2.2 Hz. So, if not, then transformer braking will not be done. If it is, then additional braking voltage is desired, and the operation can go to transformer braking. At block 518, the control state is set equal to Brake TX. At block 520, the brake control state is set equal to TX six-step, where TX stands for transformer. At block 522 all interrupts are enabled because the control state change is finished and the interrupts that were disabled in block 460 of FIG. 21 should be re-enabled as soon as possible. The TX angle wait timer is set equal to 1/40 of a second, since the change of braking control from brake six-step requires remaining in TX six-step control state for a certain amount of time to allow for all of the thyristors to turn off. The TX abort timer is set equal to 0.5 seconds, which timer is used to take the transformer out.

The normal transformer brake operation is for a period of about 15 secons. The TX six-step state brings the transformer into the circuit, but does not start modulating the GTOs even though they are turned ON. To prevent staying in that state too long, the half-second abort timer operates if after half a second some angle control is not started, the transformer is removed since it is not needed. The brake slip boundary flag is set equal to false, which flag is used by the TX six-step to proceed onto the next state, so that flag is initialized. At block 524, a request is made to turn on the brake GTOs and to stop gating the thyristors which are shorting the transformer to bring the transformer into the circuit. The GTOs in the braking circuit are turned on because there is no need for angle control yet.

Figure 28:
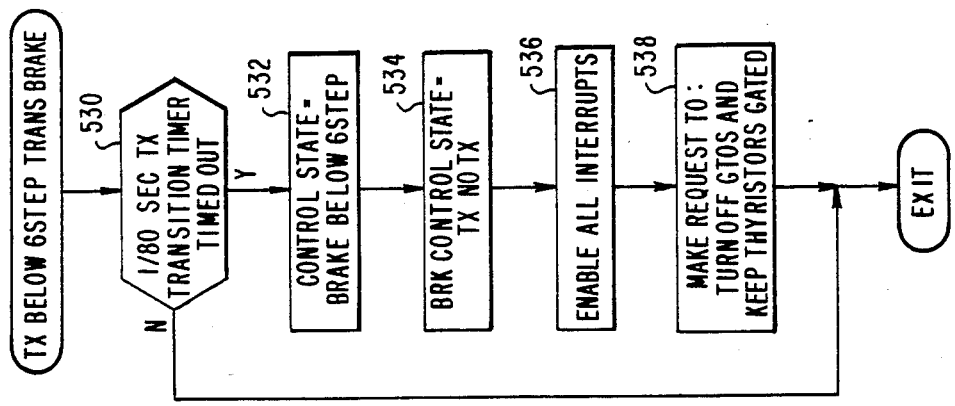
FIG. 28 shows a flow chart of the TX below six-step transition routine called by FIG. 22.

In FIG. 28, there is shown the flow chart for the TX below six-step transition branch. While the braking transformer is in the motor circuit, it is possible for the DC line voltage to increase rapidly to a much higher voltage (for example from 500 volts to 700 volts). Such a rise in DC line voltage would result in an equally rapid rise in motor voltage unless the voltage from the braking circuit is reduced. Rapid rises in motor voltage cause large transient motor currents and should be avoided. The DC line voltage rise may come at a time when the transformer braking circuit is providing only a small amount of the motor voltage. In such a case, the transformer voltage would have to be reduced to zero by turning on the braking GTO's 100% of the time. Also, the inverter output voltage might have to be decreased to a value below the six-step output in order to maintain the same motor voltage. However, the braking transformer cannot be removed immediately from the motor circuit; therefore, it is necessary to allow quasi six-step inverter synthesis when the transformer is in the motor circuit but providing no voltage to the motor. However, as mentioned earlier, it is not desirable to remain in transformer braking without providing motor voltage for long periods of time. If such a condition lasts for more than 0.5 seconds the transformer will be removed from the motor circuit. At the time that it is removed, the inverter could be in either six-step or quasi six-step synthesis; therefore, TX braking exit paths must be provided for both cases. In order to exit transformer braking, the thyristors must be allowed to turn on so as to short out the transformer windings. The thyristors should be on for a short period, such as approximately 1/80 second, before the braking GTOs can be turned off, thus completing the transition to no transformer braking. The temporary states used for this transition are TX below six-step trans if the synthesis mode is quasi six-step and TX six-step trans if the synthesis mode is six-step at the time of the transition.

At block 530, if the 1/80 second transition timer is not timed out then the control remains in the TX Below Six-Step transition state a little bit longer to allow things to stabilize and to allow the thyristors to be turned on long enough before the GTOs can be turned off. In block 530, if the timer does time out, then at block 532 the control state is set equal to Brake Below Six-Step. At block 534 the brake control state is set equal to TX NO TX. In block 536, all of the interrupts are enabled because the control state change is completed. In block 538, a request is made to turn off the GTOs and keep the thyristors gated, and that will finalize the transition out of Brake TX Below Six-Step. When the control state goes to TX Below Six-Step Transition, the thyristors are turned on and the GTOs are kept on too. At block 538 the GTOs are turned off.

Figure 29:
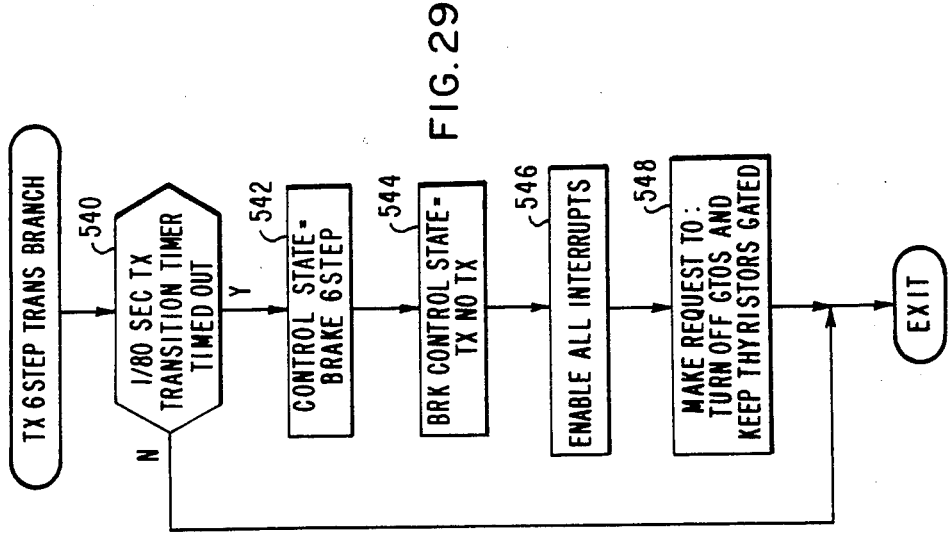
FIG. 29 shows a flow chart of the TX six-step transition routine called by FIG. 22.

In FIG. 29, there is shown the flow chart for the TX Six-Step Transition branch. At block 540 a check is made to see if the transition has timed out. If so, at block 542, the control state is set equal to Brake Six-Step. At block 544, the brake control state is set to TX NO TX. At block 546, all interrupts are enabled and at block 548, a request is made to turn off the GTOs and keep the thyristors gated.

Figure 30:
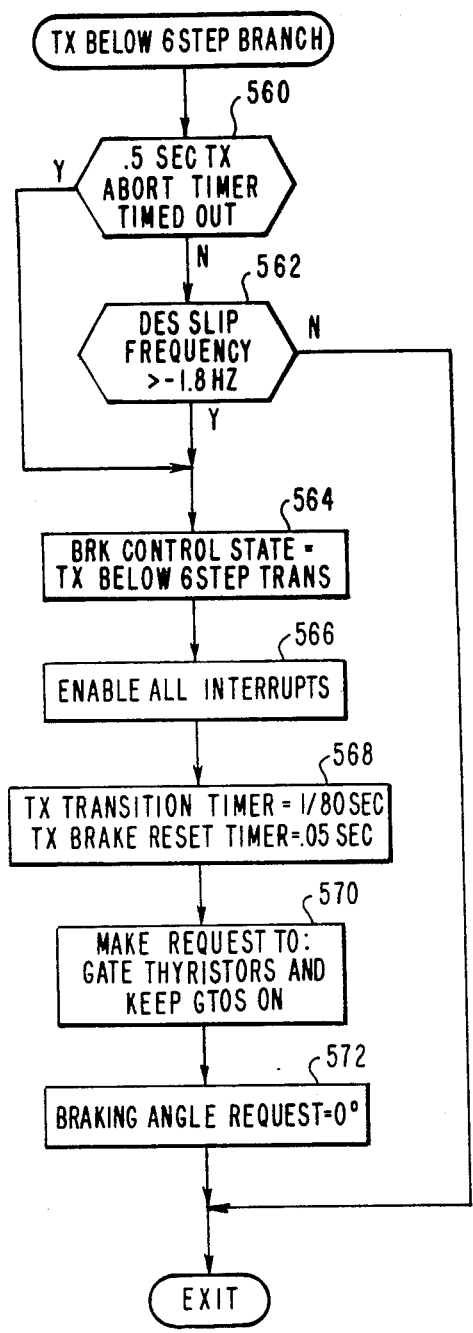
FIG. 30 shows a flow chart of the TX below six-step routine called by FIG. 22.

In FIG. 30, there is shown the flow chart for the TX Below Six-Step branch. At block 560, a check is made to see if the 0.5 second TX abort timer is timed out. If it is, that indicates the transformer will be removed from the brake circuit. Assume it is not timed out, and at block 562 a check is made to see if the desired slip frequency is greater than minus 1.8 Hz. If either the TX abort timer is timed out or thee slip frequency is greater than minus 1.8 Hz, which is less negative than minus 1.8 Hz, the braking transformer will be removed from the motor circuit and the brake control state will be changed to TX below six-step trans. This set of events begins with block 564. If neither of these conditions is met, the controller remains in the TX below six-step state. At block 564, the brake control state is set equal to the TX Below Six-Step Transition state. At block 566, all interrupts are enabled. At block 568, the TX transition timer is set equal to an eightieth of a second and the TX break reset timer is set equal to 0.05 seconds. The TX transition timer determines how long the operation has to stay in the TX Below Six-Step Transition routine before the brake GTOs can be turned off. In block 570, a request is made to gate the thyristors to turn them on and keep the GTOs on, so both the secondary and the primary of the transformer are shorted for this short period of time. At block 572 the braking angle request is reset to zero degrees.

Figure 31:
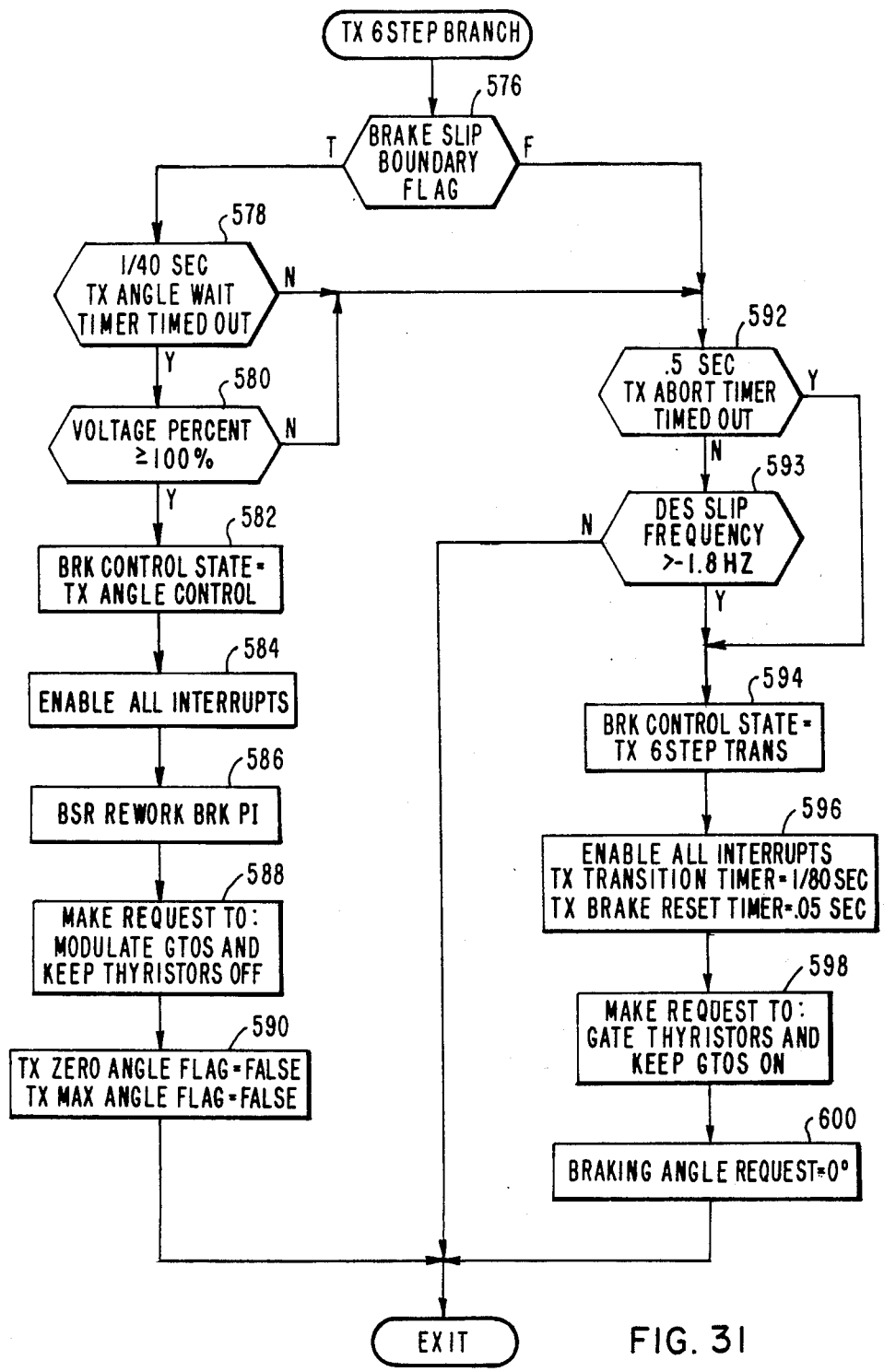
FIG. 31 shows a flow chart for the TX six-step routine called by FIG. 22.

In FIG. 31, there is shown the flow chart for the TX Six-Step branch. At block 576 a check is made of the brake slip boundary flag, which is set by the slip controller when doing slip control. When the slip becomes less than or equal to minus 2.4 Hz, less than would be more negative, this flag will get set to true and that will mean that it is okay to change to the TX angle control. If it is true, at block 578 a check is made to see if the fortieth of a second TX angle wait timer is timed out. This is a timer that requires being in TX six-step for at least a fortieth of a second to allow the thyristors to totally turn off. If yes, then at block 580 a check is made to see if the voltage percent is greater than or equal to 100%. For a voltage percent of 100%, the inverter should be in six-step, and the synthess has not yet made the change to quasi-six-step. If not 100%, the control is going to remain in this state unless there are conditions to drop out of the transformer braking. If the voltage percent is greater than or equal to 100%, and the TX angle wait timer is timed out, at block 582 the brake control state is set equal to TX angle control to start modulating the brake GTOs. At block 584 all interrupts are enabled, and at block 586 a branch is made to the subroutine Rework Brake PI, which could be a proportional plus integral brake controller, but at present is just an integral controller, to initialize all of the intermediate values of the PI controller for a smooth transition. It calculates backwards for the PI and comes up with all of the correct intermediate values for a smooth transition. At block 588 a request is made to allow the GTOs to be modulated based on what the brake angle request is and to keep the thyristors off. At block 590, a couple of flags are set initialized to false, which flags are used by the TX angle control routine. If the brake slip boundary flag at block 576 is not set to true, that means it is not desired to go to TX angle control. At block 592 a check is made to see if the 0.5 second TX abort timer is timed out and at block 592 a check is made to see if the desired slip frequency is greater than minus 1.8 Hz, and if yes to either check, then the program is going to take the transformer out. If not, a jump is made to exit to stay in this state. If yes, at block 594 the brake control state is set equal to TX Six-Step Transition because the transformer is to be taken out. At block 596 all the interrupts are enabled, the TX transition timer is set equal to an eightieth of a second to determine how long the program will remain in the transition state and the TX brake reset timer is set equal the 0.05 seconds in case there is a shut down in the near future. At block 598, a request is made to gate the thyristors on and keep the GTOs on to short both sides of the transformer. At block 600, the braking angle request is reset to zero and then an exit is made.

Figure 32:
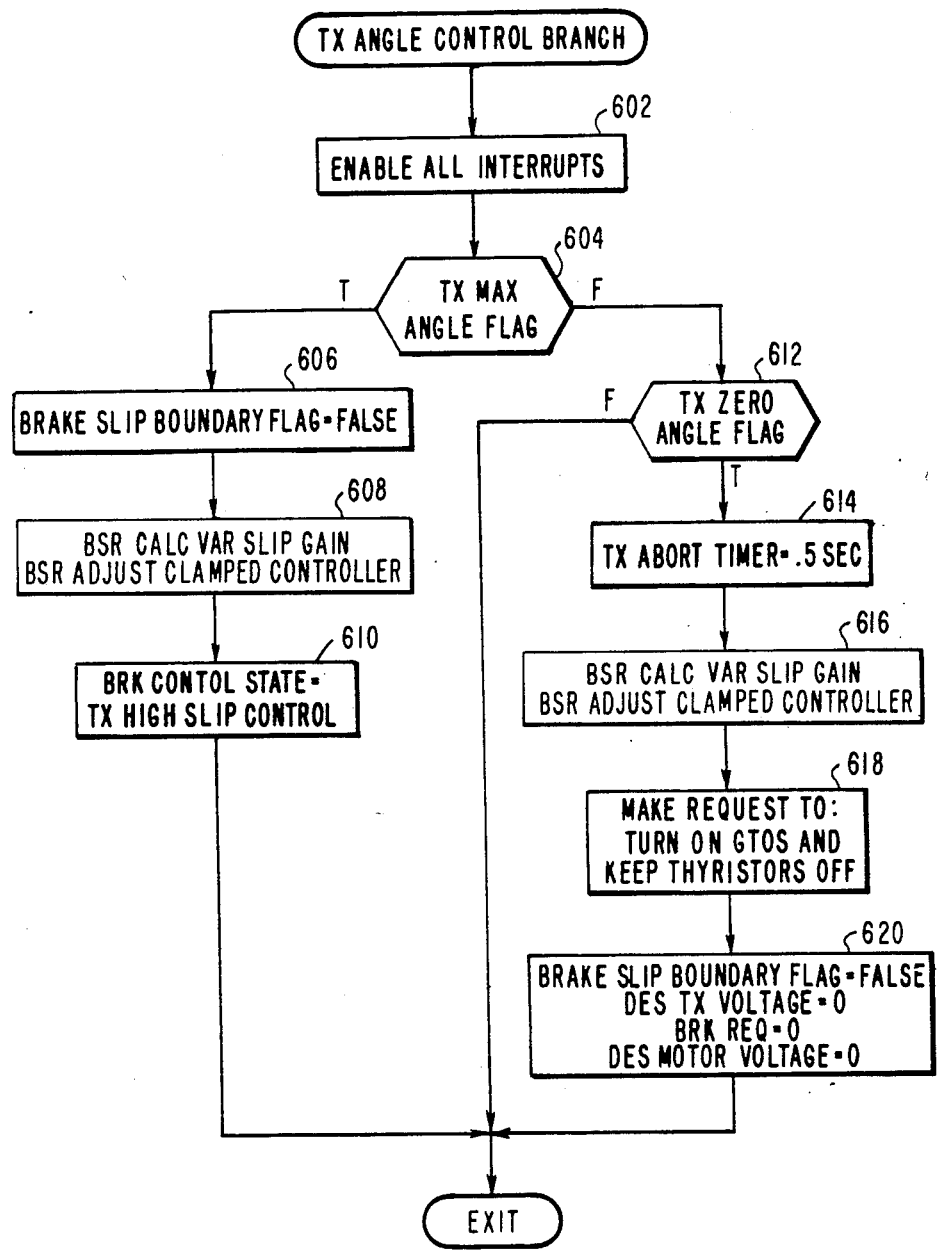
FIG. 32 shows a flow chart for the TX angle control routine called by FIG. 22.

In FIG. 32, there is shown a flow chart for the TX Angle Control substate branch. While in the TX angle control state, the controller holds the slip frequency constant and controls the brake GTO firing angle, thus controlling the transformer voltage, to maintain the desired motor torque. As shown in FIG. 10, the synthesis cannot change stae to quasi six-step while in this control state, so at block 602 the interrupts can be immediately enabled. At block 604, a check is made of the TX max-angle flag, which flag is set again by the control and if set true means that the control is at 80° and the controller should go to TX High slip control. If it is true, at block 606, the brake slip boundary flag is initialized to false. This flag is used in the TX High Slip control to indicate when it is time to switch back to TX angle control. At block 608, a branch is made to the calculate Variable Slip Gain subroutine and the Adjust Clamped Controllers subroutine. The slip controller is readjusted to bring that back into play. At block 610, the brake control state is set equal to TX High Slip Control and this is the maximum brake control state as shown in FIG. 10. If the TX max-angle flag was not set to true at block 604, then there is no need to go any higher ain the braking operation, and at block 612, a check is made to see if the TX zero angle flag is set to true. This is another flag set to true by the controller when the angle of the brake GTOs is zero degrees which means the transformer braking is no longer needed. If it is false, then a jump is made to exit. If it is true, then the control is going to proceed to TX Six-Step as shown in FIG. 10. At block 614, the TX abort timer is set to 0.5 second. It is not desired to stay with the shorted GTOs for more than half a second. At block 616, a branch is made to the calculate variable slip gain subroutine and the adjust clamped controller subroutine to set up the slip controller for the correct intermediate conditions and then at block 618 a request is made to turn on the GTOs and keep the thyristors off. In the TX angle control substate the GTOs are modulated so block 618 now turns them on all the time and keeps the thyristors off. Then in block 620 the brake slip boundary flag, which is used in the TX Six-Step Control to get back to the TX angle control, is initialized to false. In addition, the desired TX voltage, which is the output of the brake controller, is reset to zero, the brake request and the desired motor voltage, which are outputs of the brake voltage controller, are also reset to zero.

Figure 33:
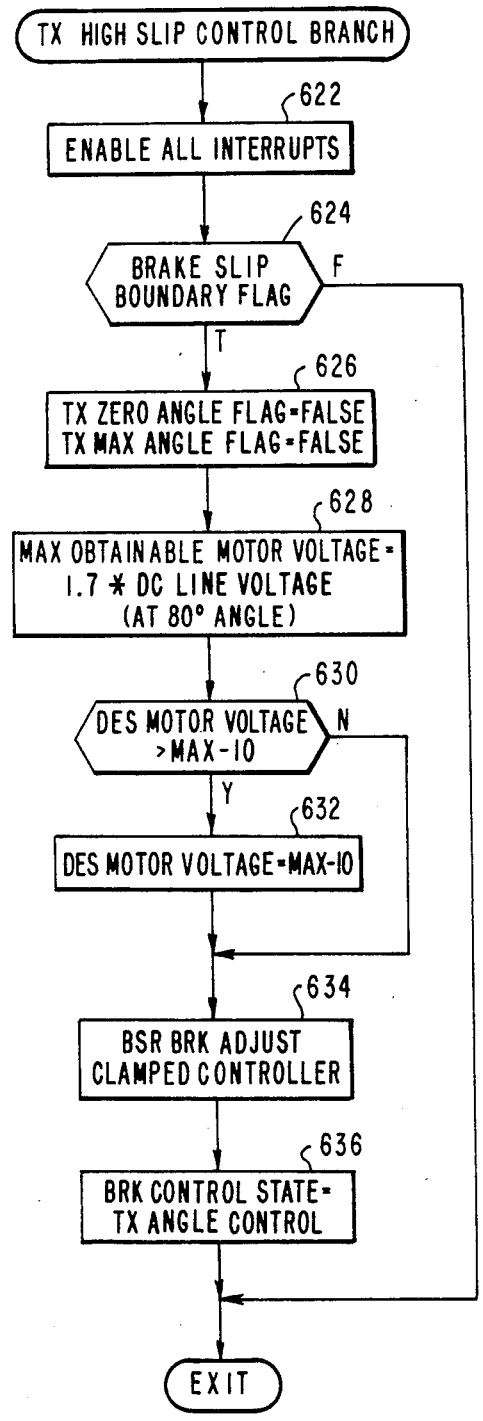
FIG. 33 shows a flow chart for the TX high slip control routine called by FIG. 22.

In FIG. 33, there is shown the flow chart for the TX High Slip Control substrate branch. This is the maximum brake control state. During this control state the transformer braking circuit output voltage is held at its maximum value and the slip controller is operated to provide a small amount of additional braking torque from the motor. At block 622, all interrupts are immediately enabled because the synthesis cannot make a change in this control state. At block 624 a check is made to see if the brake slip boundary flag is equal to true. The brake slip boundary flag is equal to true if the motor slip has fallen, less negative than minus 2.3 Hz slip, in which case it is necessary to start adjusting the transformer output voltage again. If it is false, a jump is made to exit to remain in the TX high slip control state until the slip reaches minus 2.3 Hz slip. If it is true, then block 626 initializes two flags used by the TX angle control, the TX zero angle flag and the TX max angle flag. In block 628 a variable called max obtainable motor voltage is calculated, which is the maximum motor voltage that can be obtained from the DC line voltage wit 80° on the braking GTOs, and it is determined as 1.7 times the DC link voltage. This is the line to line motor voltage across the motor.

At block 630, a check is made to see if the desired motor voltage, which is the motor voltage presently across the motor, is greater than the maximum obtainable voltage minus 10 volts for hysteresis. If it is, then block 632 sets the desired motor voltage equal to this maximum value minus 10. At block 634, a branch is made to the brake adjust clamped controller subroutine. At block 636 the brake control state is set equal to TX angle control and this completes the transition.

Figure 34:
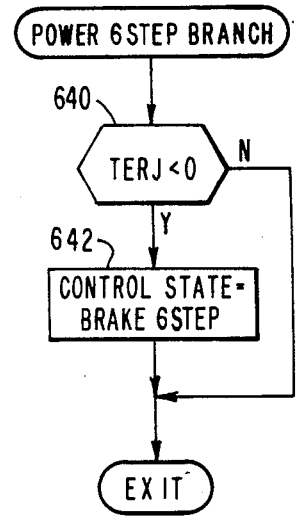
FIG. 34 shows a flow chart for the power six-step routine called by FIG. 21.

In FIG. 34 there is shown a flow chart for the Power Six-Step state branch. At block 640 a check is made to see if TERJ is less than zero. If it is less than zero, at block 642 the control state is set equal to Brake Six-Step. Otherwise, the control state stays at Power Six-Step.

In FIG. 35 there is shown a flow chart for the Power Open Loop Control state branch. At block 646 a check is made to see if TERJ is less than zero. If it is less than zero, at block 648 the control state is set equal to Brake Open Loop and an exit is made. If it is not, at block 650 a check is made to see if the tach frequency is greater than or equal to zero hertz. If it is not greater than or equal to zero hertz, then the control state remains in power open loop and an exit is made. If yes, then at block 652 a branch is made to the subroutine to calculate the variable slip gain and also to adjust the clamped controller for setting up the PI controller correctly. At block 654 the control state is set equal to Power Below Six-Step and the operation is in closed loop control. If the tach frequency is negative, the vehicle is rolling backwards from the desired direction of travel. Until the vehicle has been brought to zero speed, the torque control must be performed open loop. Then closed loop control can be used to accelerate the vehicle in the desired direction.

In FIG. 36 there is shown a flow chart for the Power Below Six-Step control state branch. At block 656, a check is made to see if TERJ is less than zero. If it is, at block 658 the control state is set to Brake Below Six-Step. If the TERJ is greater than or equal to zero, at block 660 a check is made to see if the tach frequency is less than zero hertz. If it is less than zero hertz, at block 662 the control state is set equal to Power Open Loop because it is necessary to do open loop control and an exit is made. If not, at block 660 the control state stays in the same Power Open Loop branch and a jump is made to exit. This exit is for all of the control branches shown in FIGS. 24 to 36 that will eventually jump here. At block 664 all interrupts are disabled because there will be a change in the brake configuration. At block 668 a new brake configuration request is output to the hardware, and at block 670 all interrupts are enabled and then a return is made.

Figure 37:
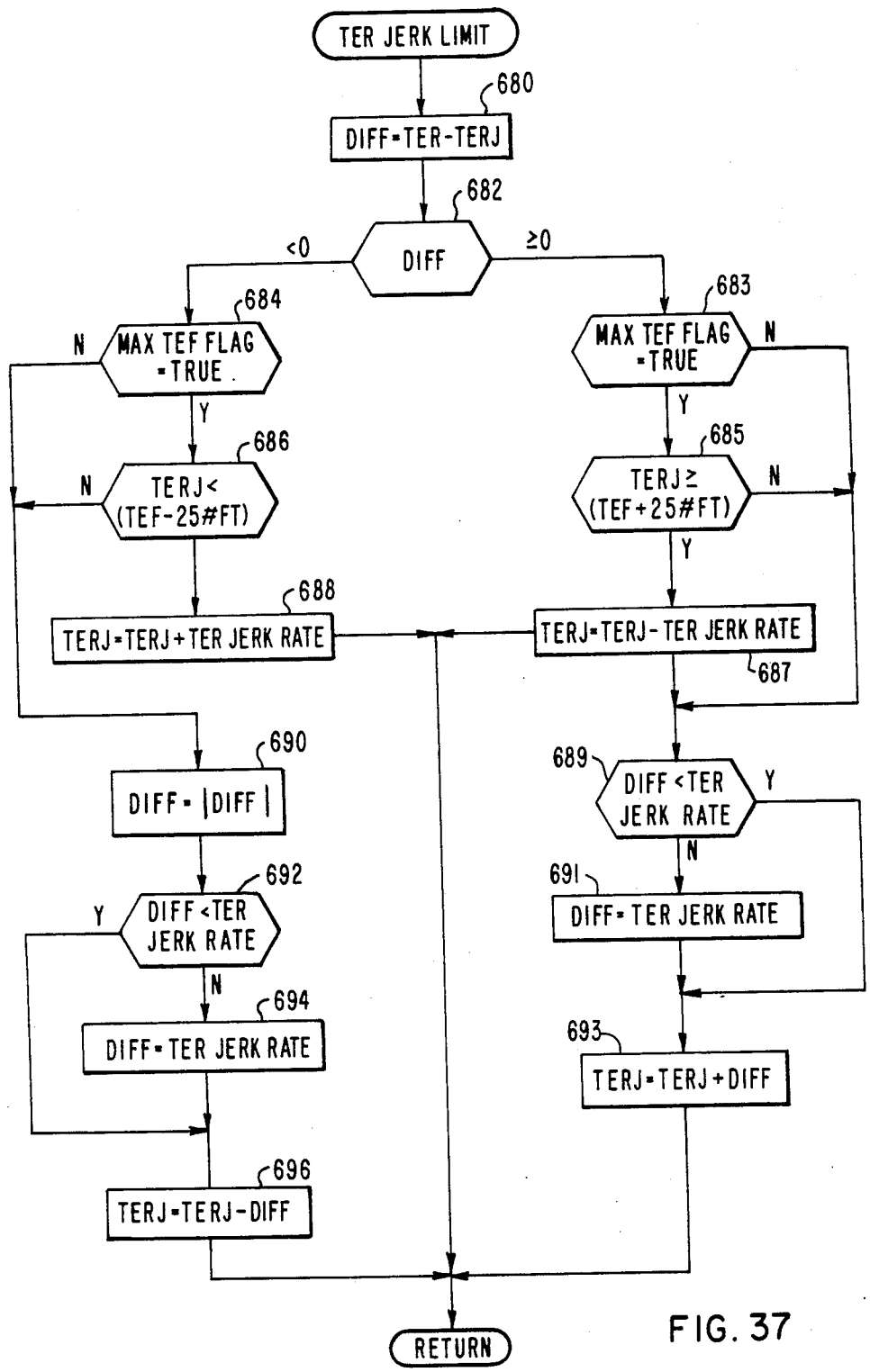
FIG. 37 shows a flow chart for the TER jerk limit routine called by FIG. 20.

In FIG. 37 there is shown the flow chart for the torque request jerk limit routine, which is called by the main control at block 446 of FIG. 20 to jerk limit the torque request. The torque request is jerk limited to provide a smooth ride to the car passengers. The jerk limit routine prevents rapid acceleration changes, which would cause the ride to be jerky, by limiting how fast the motor torque request caan be varied. At block 680 a variable DIFF is set equal to the torque effort request TER minus the current jerk limited torque effort request TERJ. In block 682 a check is made to see whether DIFF is greater than or equal to zero or is less than zero. If it is less than zero this TERJ is greater than TER and it is desired to ramp down the TERJ to meet TER. For a maximum slip condition the max TEF flag is set equal to true by the slip controller to indicate that the maximum torque possible is being provided by the motor. This maximum torque is either less than or equal to the desired jerk limited torque request but it is the most that can be obtained. The reason for this maximum torque being less than the desired torque may be due to a lower DC line voltage. If the DC line voltage is to suddenly rise significantly, the torque output of the motor would suddenly rise significantly, too. Normally, the controller would do anything to halt this sudden rise in torque until the motor torque exceeded the torque request. At this point the controller would finally attempt to slow the torque rise. Such a sudden rise in torque would cause the transit car to jerk which is not desirable. Therefore, to prevent this sudden jerk, the jerk limited torque request (TERJ) is not allowed to exceed the actual motor feedback torque (TEF) by moe than ±25 lb-ft when the motor is producing its maximum possible torque. Using this approach, if the voltage were to rise rapidly, the controller would respond almost immediately, as soon as the 25 lb-ft margin is reached, by limiting the torque increase. The jerk limit routine would then ramp the TERJ up at an acceptable rate until the TER value is reached.

At block 684 a check is made to see if the max TEF flag is set equal to true. If yes, TERJ must be kept within 25 lb-ft of TEF. AT block 686, a check is made to see if TERJ is less than TEF minus 25. If yes, then TERJ is more than 25 lb-ft less than TEF and must be increased. In block 688, TERJ is increased by an amount of torque, TER jerk rate, which is small enough to remain within the jerk limits required. If either max TEF flag is false or TERJ is not more than 25 lb-ft less than TEF, TERJ will be adjusted so as to approach the torque request TER. At block 690 DIFF is set equal to the absolute value of DIFF, which will make it positive. If DIFF is less than TER jerk rate, the maximum allowed change in TERJ in one cycle's calculation, then TERJ is set to TERJ minus DIFF by block 696 which results in TERJ being equal to TER. If DIFF is not less than TER jerk rae, then block 694 will limit DIFF to the TER jerk rate value and after block 696 modifies TERJ, TERJ will be closer to TER but not equal to TER. If TER changes abruptly, the TER jerk rate will limit how fast TERJ is allowed to change in an effort to meet TER.

If at block 682, DIFF is greater than or equal to zero, TERJ is less than or equal to TER. AT block 683 max TEF flag is tested to see if the motor is in a maximum torque condition. If yes, block 685 tests to see if TERJ is greater than or equal to TEF plus 25 lb-ft. If yes, then TERJ is more than 25 lb-ft greater than TEF and must be decreased. In block 687, TERJ is decreased by the TER jerk rate. If either max TEF flag is false or TERJ is not more than 25 lb-ft greater than TEF, TERJ will be adjusted so as to approach the torque request TER. AT block 689 DIFF is compared against TER jerk rate. If DIFF is not less than TER jerk rate, DIFF is limited by being set equal to TER jerk rate. At block 693, TERJ is modified by adding DIFF to the previous TERJ value. Block 693 will result in TERJ becoming closer to the torque request TER.

In FIG. 38 there is shown the flow chart for the control state control subroutine. At block 700 the max TEF flag is set equal to false and then if the operation goes to a condition where the slip is limited to its maximum extremes, thereby getting the most torque available, this flag is set equal to true. At block 702 a check is made to see what is the current control state and a branch is made to a routine corresponding to that control state. Each branch will perform the type of control necessary for that control state. FIG. 9 shows all of the possible control states.

In FIG. 39 there is shown the flow chart for the CSC brake TX control substate branch. At block 703 a check is made to see what the current brake control substate is, and a branch is made to a routine corresponding to that brake control state. FIG. 10 shows all of the possible brake control substates. The CSC branches referred to in FIGS. 38 and 39 are found in FIGS. 39 through 48. The CSC initials are used to abbreviate control state control.

Figure 40:
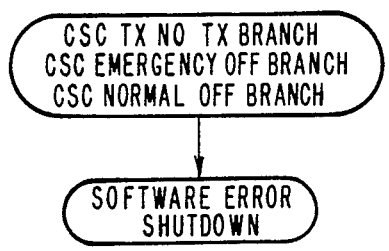
FIG. 40 shows a flow chart for the CSC TX no TX routine called by FIG. 39 and the CSC emergency off routine and CSC normal off routine called by FIG. 38.

In FIG. 40 there is shown the flow chart for any one of the CSC TX no TX branch, the CSC emergency off branch or the CSC normal off branch. If any one of these branches did occur, it would involve an error in the software, so a software error shutdown would result.

Figure 41:
FIG. 41 shows a flow chart for the CSC TX below six-step transition routine, the CSC TX six-step transition routine and the CSC TX below six-step routine called by FIG. 39.

In FIG. 41 there is shown a flow chart for the CSC TX Below Six-Step Transition, the CSC TX Six-Step Transition and the CSC TX Below Six-Step control substate branches. In any one of the TX Below Six-Step Transition, TX Six-Step Transition or TX Below Six-Step states occurs, a control operation is provided for controlling slip. These are brake control substates with the transformer in the brake circuit but providing no voltage to the motor. At block 704, the variable slip gain is calculated. At block 706 a branch is made to the slip PI control routine and then the controller will come up with a desired slip frequency as an output. At block 708 a check is made to see if this desired slip frequency is more negative than minus 2.4 Hz. If it is, at block 710 the desired slip frequency is clamped at minus 2.4 Hz. At block 712 the clamped controller is adjusted to set up all the intermediate values so that minus 2.4 Hz is reflected throughout all the intermediate values of the controller. A branch is made at block 714 to the calculate inverter frequency routine.

Figure 42:
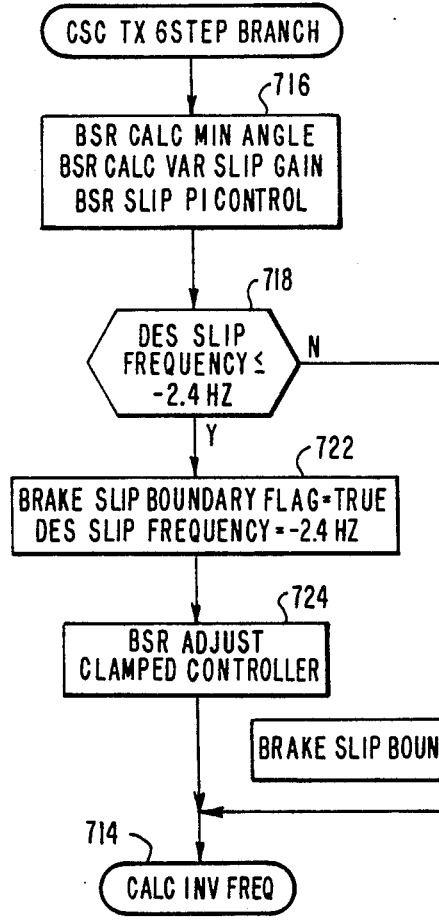
FIG. 42 shows a flow chart for the CSC TX six-step routine called by FIG. 39.

In FIG. 42 there is shown the flow chart for the CSC TX Six-Step control routine, which is similar to the control routine shown in FIG. 41. In the TX six-step control state, the braking transformer is in the motor circuit but is providing no voltage to the motor. Slip control using the slip PI controller is active and is used to maintain the desired torque TERJ from the motor. At block 716 a branch is made to calculate the min-angle routine. It is necessary to start the brake hardware timers, and this requires outputting to the counters the minimum braking angle because of the synthesis operation. The braking timers start although the GTOs are not modulated, but the timers will be working. A branch is made to the calculate variable slip gain subroutine to calculate the variable slip gain for the slip PI control. A branch is made to the slip PI control subroutine to provide the desired slip frequency. In block 718 a check is made to see if the desired slip frequency is less than or equal to minus 2.4 Hz. If no, block 720 sets the brake slip boundary flag equal to false which means it is not desired to go into TX angle control because there is not enough brake slip. If if is more negative than minus 2.4 Hz, at block 722 the brake slip boundary flag is set equal to true. At block 722 the desired slip frequency is set equal to minus 2.4 Hz. Block 724 adjusts the clamped controller.

Figure 43:
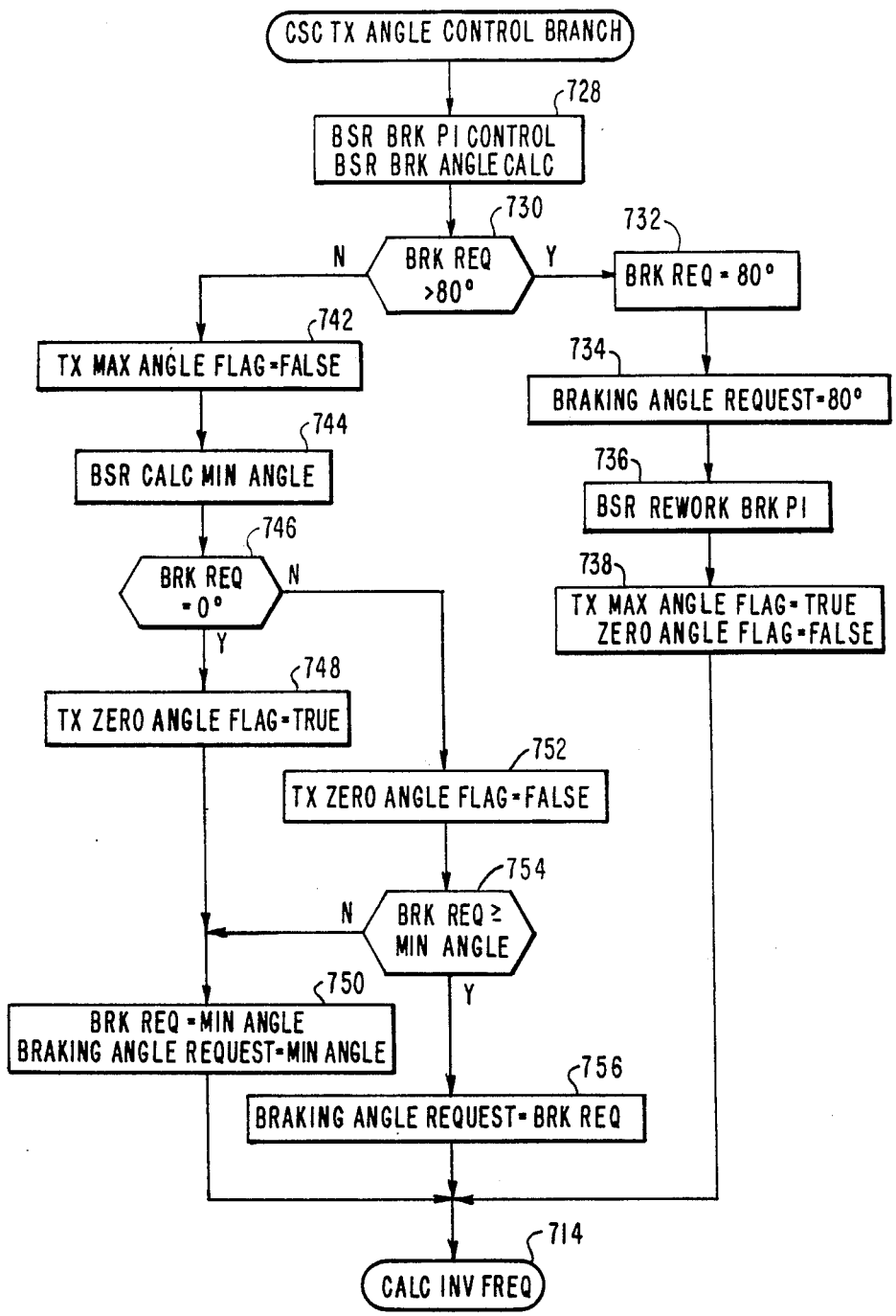
FIG. 43 shows a flow chart for the CSC TX angle control routine called by FIG. 39.

In FIG. 43 there is shown the flow chart for the CSC TX Angle Control substate branch, which has the transformer in the brake circuit and is actually modulating the brake GTO switches. While modulating the brake GTOs, this control state holds the slip at minus 2.4 Hz. At block 728 a branch is made to the Brake PI Control subroutine to get the desired transformer voltage. Then a branch is made to the Brake Angle Calculate subroutine to change that desired transformer voltage into an angle. At block 730 a check is made to see if the angle called Brake Request is greater than 80°. If it is greater than 80°, at block 732 it is clamped equal to 80° because it should not go higher. At block 734 the Braking Angle Request is set equal to 80°, which is the actual angle that the synthesis looks at to calculate the actual times for the braking timers. In block 736 a branch is made to Rework Brake PI routine to clamp the controller and all the desired intermediate values. In block 738, two flags are set; one is the TX max angle flag set equal to true because the control operation is at maximum angle and this will tell the Determine Mode subroutine to change to the TX High Slip control and the second is the zero angle flag set equal to false because it is not desired to go back to the TX Six-Step substate. Then a jump is made to calculate inverter frequency at block 740. If the Braking Request at block 730 is not greater than 80°, at block 742 the TX max angle flag is set equal to false because the operation is not at the maximum angle. In block 744 a branch is made to calculate minimum angle subroutine to establish the minimum angle to fire the GTOs, which below around 100 Hz is an angle of 2½° and above 100 Hz is an angle of 5°. The reason for the higher angle at a higher frequency is that 5° at 200 Hz is substantially the same time duration as 2½° at 100 Hz, and one angle is not enough to cover the entire range. At block 746 a check is made to see if the Brake Request is equal to zero degrees. The brake PI controller will set it equal to zero, if it goes below zero. If it is equal to zero degrees, in block 748 the zero angle flag is set equal to true to tell the determine mode subroutine to change back to the TX Six-Step substate. In block 750 the Brake Request is set equal to the minimum angle calculated in block 744 and the Braking Angle Request is also set equal to the minimum angle. Then at block 714 a jump is made to calculate inverter frequency routine. In block 746, if the Brake Request does not equal zero, then block 752 sets the TX zero angle flag equal to false. In block 754 a check is made to see if the Brake Request is greater than or equal to minimum angle. If it is greater than the minimum angle, then block 756 will set the Braking Angle Request equal to Brake Request. If not, block 750 sets the Brake Request equal to minimum angle and also sets the Braking Angle Request equal to the minimum angle.

Figure 44A:
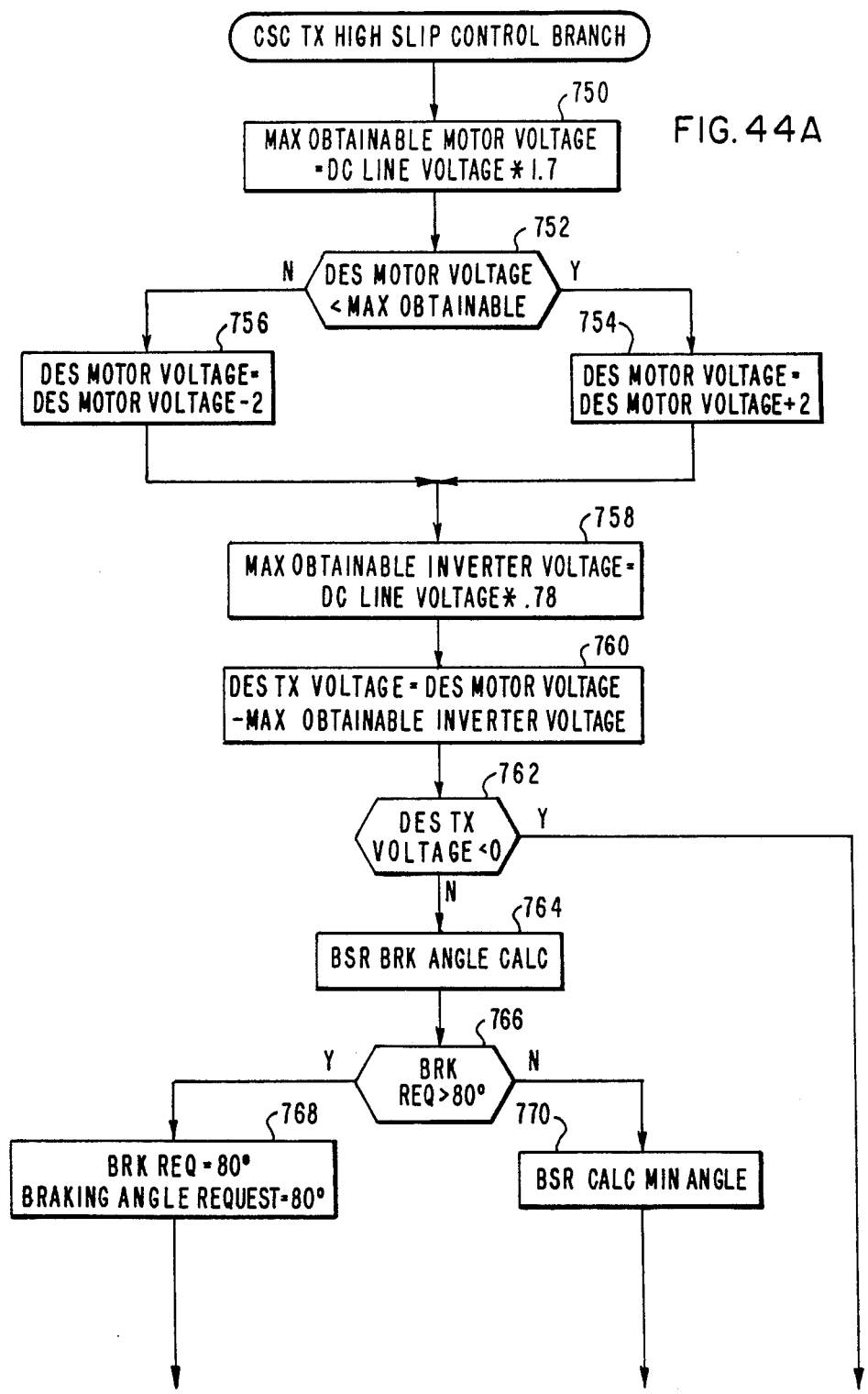
FIGS. 44A and 44B show a flow chart for the CSC TX high slip control routine called by FIG. 39.
Figure 44B:
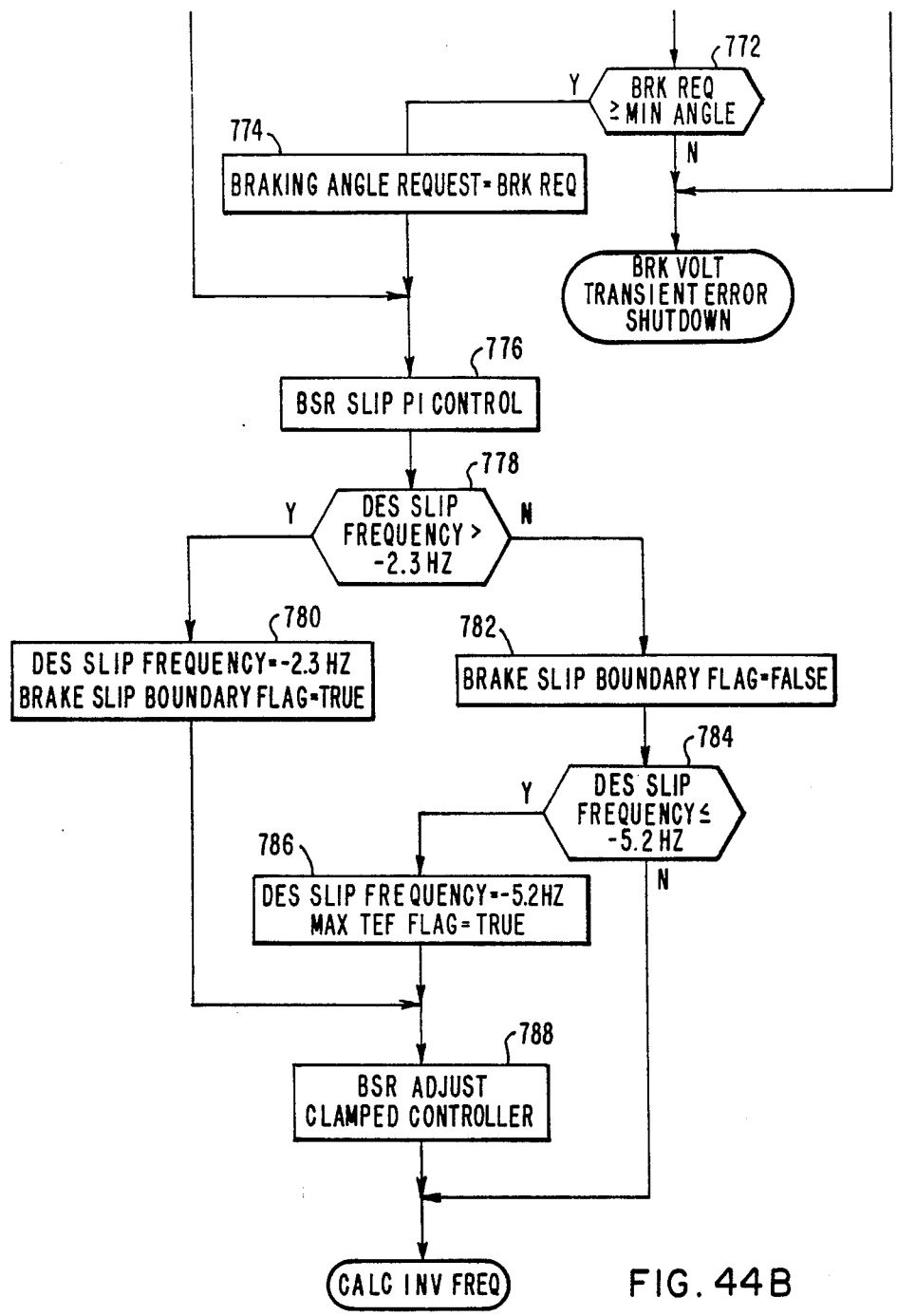

In FIG. 44 there is shown the flow chart for the CSC TX High Slip Control substate branch. The TX high slip control state maintains the braking angle at 80°, unless the DC line voltage experiences a sudden increase, and controls the slip frequency of the motor to control the motor torque. If the DC line voltage experiences a sudden increase in voltage, this contro state will decrease the braking angle to hold the motor voltage constant. Then the motor voltage will be allowed to increase at a fixed, controllable rate up until the braking angle again reaches 80°. During this voltage control, the slip of the motor is still controlled to control the motor torque. At block 750 a calculation is made of the maximum obtainable motor voltage, which is equal to the DC line voltage times 1.7. This is done using the 80° brake angle request. At block 752 a check is made to see if the desired motor voltage is less than the maximum obtainable. If it is, that means a line voltage transient has occurred and a drop in the brake angle is performed in an effort to keep the same motor voltage. Then it is desired to ramp the brake angle back up to 80°, and this is done slow enough so the slip controller, which is slower than the voltage controller, has time to respond. In effect a jerk limit of 480 volts per second is provided to raise the motor voltage. If the desired motor voltage is less than maximum obtainable at block 752, it is raised up to the maximum obtainable at the 240 Hz rate that this routine is executed. This is done by adding at block 754 two volts to the desired motor voltage every time through the program to provide essentially a 480 volt per second rise. If not less than the maximum obtainable at block 752, then at block 756 each time through the program subtracts 2 volts. This operation results in hovering around the maximum obtainable voltage. At block 758, the maximum obtainable inverter voltage, which is the inverter voltage in six-step operation, is calculated as equal to the DC line voltage times 0.78. At block 760 the desired TX transformer voltage is calculated as the desired motor voltage minus the maximum obtainable inverter voltage. At block 762 a check is made to see if the desired TX voltage is less than zero. If it is, then an extremely large line voltage transient has been received, since the brake angle was at 80° and a transient must have brought the angle down to below zero degrees. Such a condition is extremely rare and is not compensated for; however, if it does occur, a shutdown of the inverter and braking circuit would result. If the desired TX voltage at block 762 is not less than zero, at block 764 the corresponding brake request is calculated in relation to the desired TX voltage. At block 766 a check is made to see if the calculated brake request is greater than 80°. If it is, at block 768 the brake request is set equal to 80° and the braking angle request is set equal to 80°. If not greater than at block 766 then at block 770 a branch is made to the subroutine to calculate the minimum brake GTO angle. At block 772 a check is made to be sure the brake request is not below the minimum angle and it probably will not be unless there was an extremely large line voltage transient and then a brake voltage transient error shutdown is provided. If the brake request is greater than or equal to minimum angle, at block 774 the braking angle request is set equal to the brake request. At block 776 a branch is made to the slip PI control subroutine, because this operation is controlling slip, and open loop voltage control is trying to maintain constant or slower changing voltage. In block 778 a check is made of the desired slip frequency to see if it is greater than minus 2.3 Hz. If it is, then at block 780 desired slip frequency is clamped at minus 2.3 Hz and the brake slip boundary flag is set true to tell the determine mode subroutine to go back to TX angle control. If not greater than minus 2.3 Hz at block 778, that means it is still more negative than minus 2.3 Hz, the operation can stay in the same control state. The brake slip boundary flag is set equal to false at block 782. In block 784 a check is made to see if the desired slip frequency is less than or equal to minus 5.2 Hz, which is the most slip allowed for the motor in the braking transformer operation. If it is less than minus 5.2 Hz, at block 786 it is clamped at that value, and the max TEF flag is set equal to true since addition torque cannot be obtained from the motor. At block 788 a branch is made to the adjust clamped controller routine to adjust the clamped slip controller. Then a jump is made to the calculate inverter frequency routine.

Figure 45:
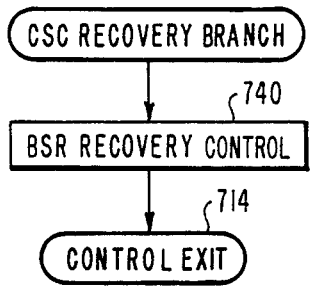
FIG. 45 shows a flow chart for the CSC recovery routine called by FIG. 38.
Figure 65:
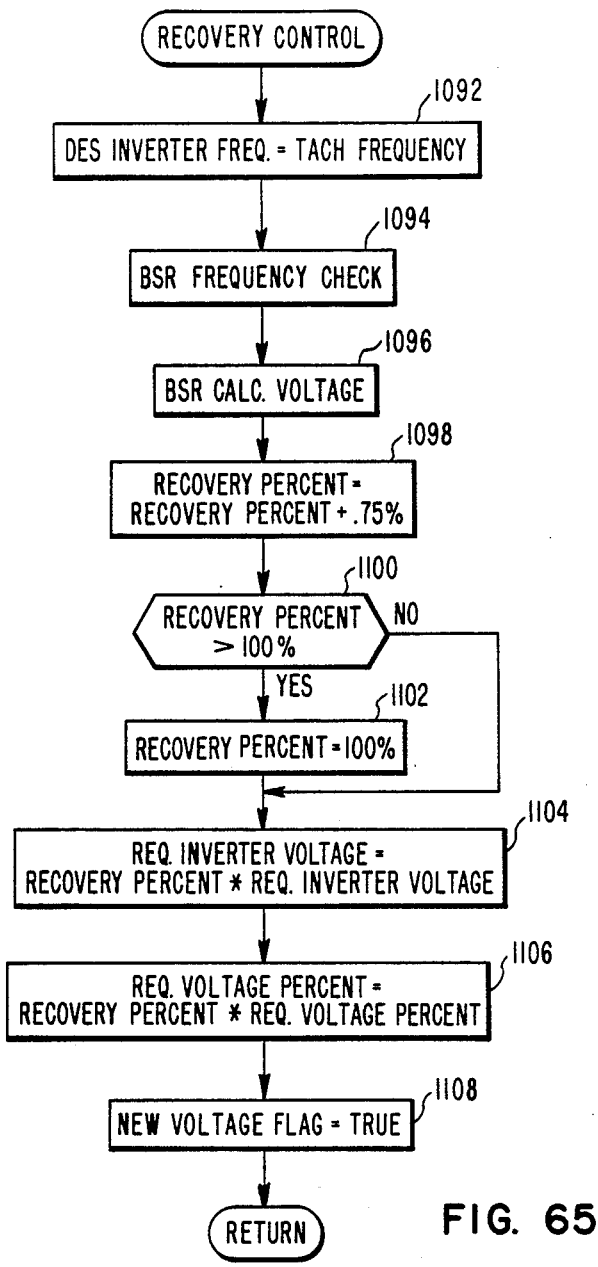
FIG. 65 shows a flow chart for the recovery control routine called by FIG. 45.

In FIG. 45 there is shown the flow chart for the CSC recovery branch, which makes a branch at block 790 to the recovery control subroutine shown in FIG. 65. While in the recovery control state, the slip frequency is held at zero Hz and neither the slip PI controller or braking transformer voltage PI controller is active. The function of this recovery control state is to ramp up the motor voltage slow enough such that large transient currents do not occur that would shut the inverter down again. The recovery control is used to restart an inverter following a shutdown where the motor is rotating faster than 120 rpm or 4 Hz.

Figure 46:
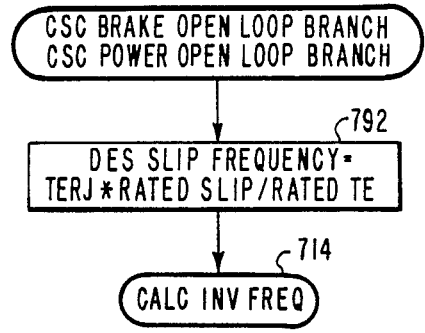
FIG. 46 shows a flow chart for the CSC brake open loop routine and the CSC power open loop routine called by FIG. 38.

In FIG. 46 there is shown the flow chart for the CSC brake open loop and CSC power open loop control state branches. These control states perform open loop torque control by declaring a slip frequency that is proportional to the jerk limited torque effect request TERJ. These two control states are used at very low motor operating speeds where the calculated torque feedback signal is too unreliable to use thus necessitating the use of open loop control. In block 792 the desired slip frequency is set equal to the TERJ times the rate of slip over the rated torque effort. If the TERJ is equal to the rated torque effort of the motor, then rated slip is applied to the motor. A jump is then made to calculate inverter frequency.

Figure 47:
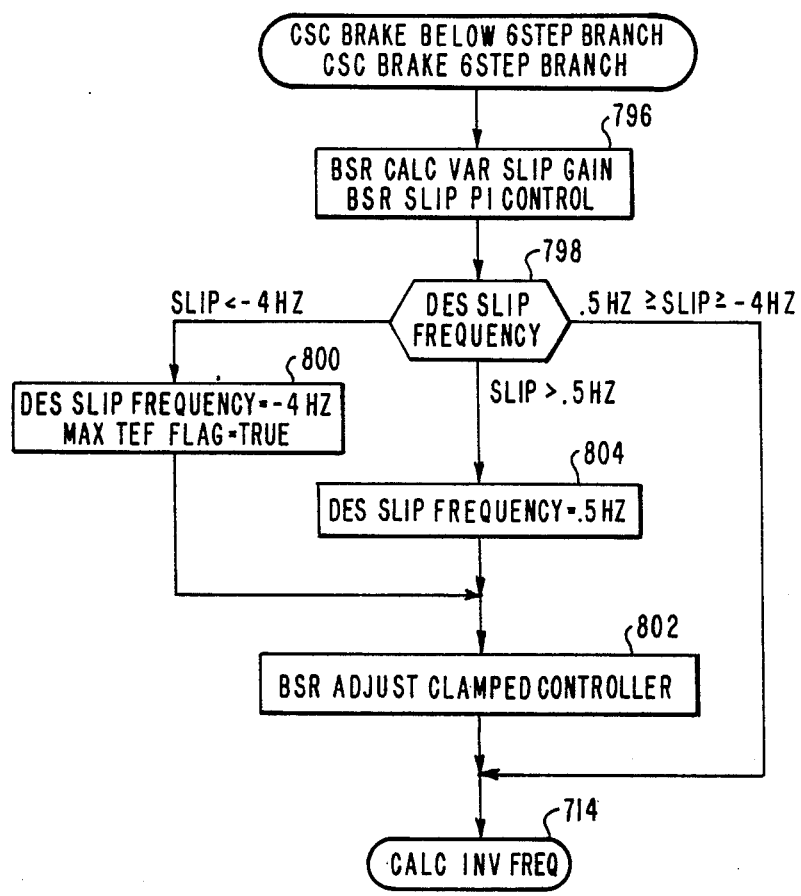
FIG. 47 shows a flow chart for the CSC brake below six-step routine and the CSC brake six-step routine called by FIG. 38.

In FIG. 47 there is shown the flow chart for the CSC brake below six-step and CSC brake six-step control state branches. Under these two control states, closed loop slip control is used and the braking transformer is out of the motor circuit. At block 796 a branch is made to the calculate variable slip gain subroutine and to the slip PI control subroutine. At block 798 a check is made of the desired slip frequency. If the desired slip frequency is more negative than minus 4 Hz, at block 800 it is clamped at minus 4 Hz and the max TEF flag is set equal to true. At block 802 a branch is made to the adjust clamped controller routine to clamp the slip controller. If the desired slip frequency is greater than 0.5 Hz at block 798, at block 804 the desired slip frequency is clamped to 0.5 Hz, since in brake it is not desired to have positive slip. If the slip is within the two limits of 0.5 Hz and minus 4 Hz, the slip is accepted and a jump is made to the calculate inverter frequency routine.

Figure 48:
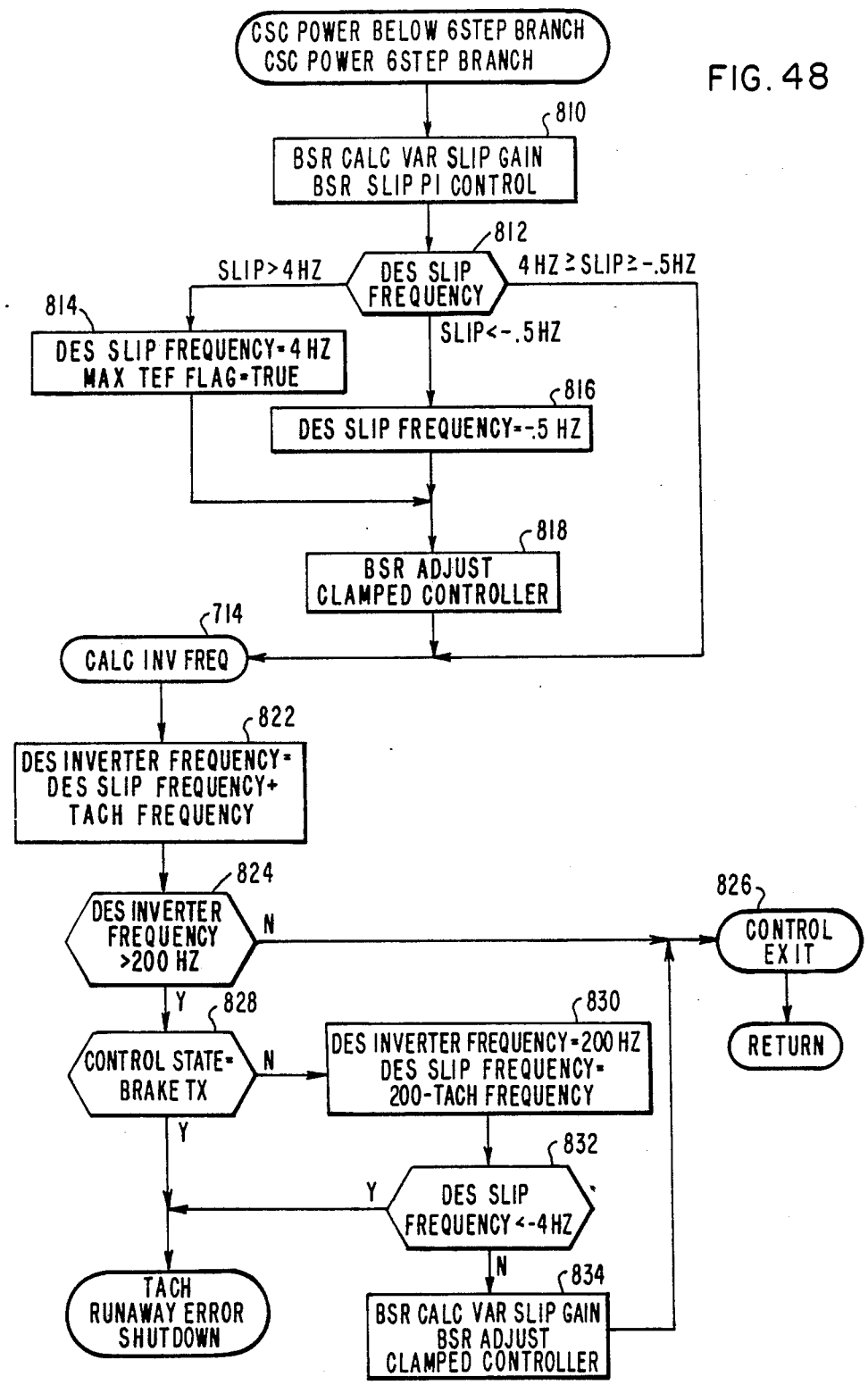
FIG. 48 shows a flow chart for the CSC power below six-step routine and the CSC power six-step routine called by FIG. 38.

In FIG. 48 there is shown the flow chart for the CSC power below six-step and the CSC power six-step control state branches. Under these two control states, closed loop slip control is used and the braking transformer is out of the motor circuit. In block 810 a branch is made to the variable slip gain calculation and to the slip PI control routine. In block 812 a check is made of the desired slip frequency, and similar to the brake operation there is a limit on the maximum slip. It is not desired to go above 4 Hz and to go less than minus 0.5 Hz, and in either one of those cases it is clamped to those values. In the case of the slip greater than 4 Hz, at block 814 it is clamped to 4 Hz and the MAX TEF flag is set to true. In block 816 it is clamped to minus 0.5 Hz. In block 818 a subroutine branch is made to adjust the clamped controller. If the slip is within limits, then a jump is made around blocks 816 and 818. At label 714 is the beginning of the calculate inverter frequency routine. This is the same label 714 to which the routines shown in FIGS. 41 to 47 go. In block 822 the desired inverter frequency is set equal to the desired slip frequency plus the tach frequency. In block 824 a check is made to see if the desired inverter frequency is greater than 200 Hz, which is the maximum for the motor operation. If not greater than 200 Hz at block 824, then the routine goes to the control exit label 826. It if is greater at block 824, at block 828 a check is made to see if the control state is brake TX when the motor is above 200 Hz. It is highly unlikely that the motor could be at 200 Hz while the controller is braking the motor, but if such a condition did occur, the inverter and brake circuit would be shut down. If that is not the case, at block 830 the desired inverter frequency is set equal to 200 Hz and the desired slip frequency is set equal to 200 minus the tach frequency. At block 832, a check is made to see if the desired slip frequency is less than minus 4 Hz, and if it is, this would result in a shutdown. If not, at block 834 a branch is made to the variable slip gain calculation and a branch is made to the adjust clamped controller subroutine to clamp the slip controller at the clamped slip amount. At block 826 a branch is made to the control exit routine which makes a return.

The variable PI gain subroutine is provided to effectively increase the gain of the slip controller at the higher frequencies of motor operation. When the motor is operating in the rated volts per hertz range below base speed, a condition of 1.5 Hz slip might provide an output torque of 740 lb-ft at a given motor temperature. Once the motor frequency increases and the motor is no longer in the constant volts per hertz range but is in the reduced flux range such as with motor operation at 200 Hz, a slip of 1.5 Hz might result in an output torque of only 40 lb-ft.

The slip controller with constant gain to be fast enough, would have to have enough gain to provide reasonable response for 200 Hz. However, such a high gain would be too high for below base speed operation. This very high gain would result in a below base speed operation which would be too fast and would, therefore, be susceptible to uncontrollable oscillations resulting in instability. The solution is to use a variable gain in the controller so that at high speeds the variable gain is increased and during below base speed operation the variable gain is decreased. The controller would then have the same response speed over the entire operating range. In other words, the overall system bandwidth is constant for all motor speeds.

Figure 49:
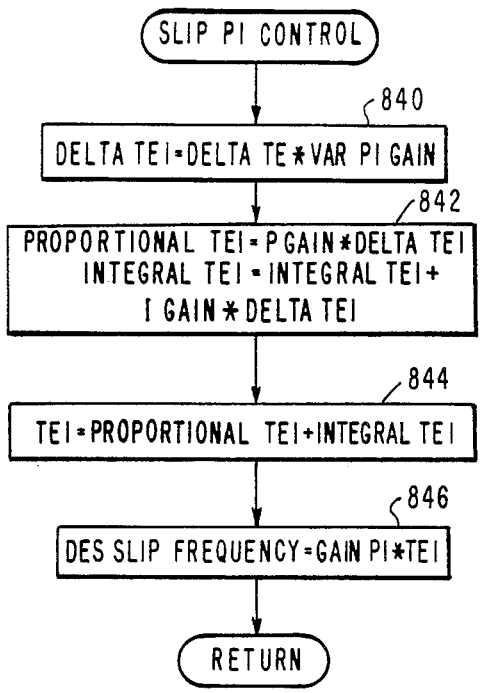
FIG. 49 shows a flow chart for the slip PI control routine called by FIG. 41.

In FIG. 49 there is shown the flow chart for the slip PI control subroutine. In block 840 the variable delta TE1 is calculated as delta TE, which is the difference between the jerk limited torque effort request TERJ and the feedback torque, times the variable PI gain. The variable PI gain is set up in the calculate variable slip gain routine shown in FIG. 50. Delta TE1 provides the desired gain increase for high speed operation such as 200 Hz. A PI controller has a proportional part and integral part. In block 842, the proportional TE1 is equal to P gain, which is set for the individual controller, times delta TE1. The integral TE1 is equal to a previous integral value plus a gain constant times delta TE1. At block 844, the output TE1 of the controller is equal to the proportional TE1 plus the integral TE1. At block 846 the desired slip frequency is set equal to the overall design gain of the controller, which does not change, times this output TE1 and then a return is made.

Figure 50:
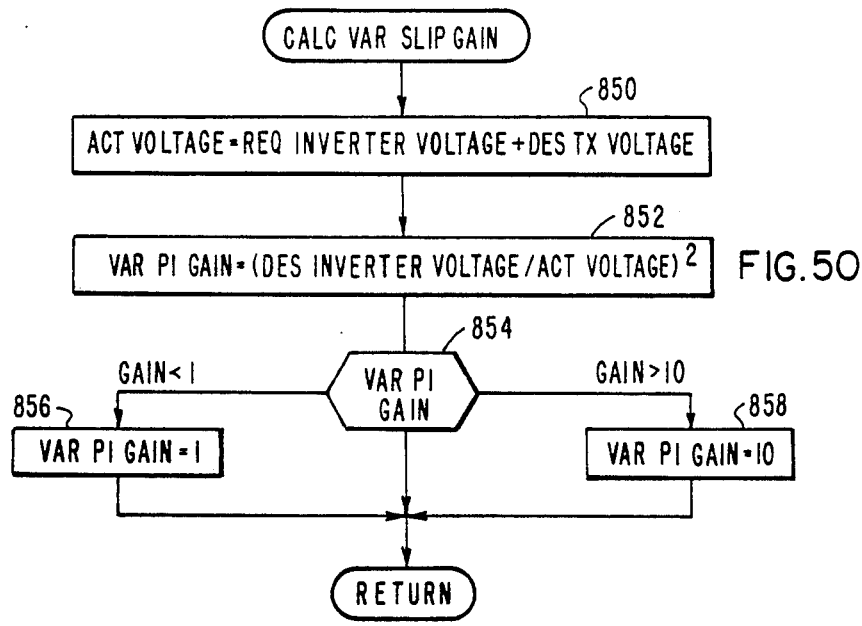
FIG. 50 shows a flow chart for the calculate variable slip gain routine called by FIGS. 32, 35, 41, 47 and 48.

In FIG. 50 there is shown a flow chart for the calculate variable slip gain subroutine, which is performed prior to the slip PI control routine shown in FIG. 49. At block 850 the actual voltage across the motor is calculated as equal to the requested inverter voltage plus the desired transformer voltage, that is, the actual line-to-line voltage across the motor. At block 852 the variable PI gain is set equal to the ratio of the desired inverter voltage, which is what constant volts per hertz would provide, divided by the actual voltage, with that ratio squared. For example, in power at 50 Hz, the actual voltage may be 468 volts and the desired inverter voltage may be 468 volts, then the variable PI gain will be equal to one, and anywhere below 50 Hz they approximate each other. However, in power at 200 Hz, the desired inverter voltage would be four times the value at 50 Hz or 468×4, which is roughly 1800 volts, while the actual voltage is equal to the inverter output in power or 468 volts. Therefore, this variable PI gain would be the ratio of 4 times to 1 squared or 16. This results in an increase in power. In brake there can be some extra actual voltage due to the voltage supplied by the transformer braking circuit. At block 854 a check is made to see if the variable PI gain is less than one or greater than ten. If it is less than one at block 856, it is set equal to one and a return is made. If it is greater than ten, at block 858 it is limited to ten.

Figure 51:
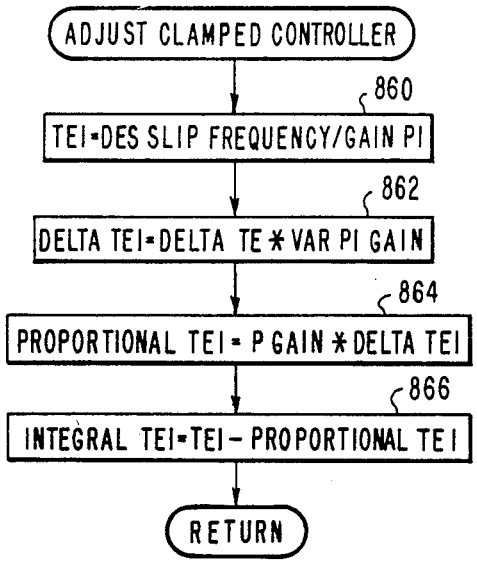
FIG. 51 shows a flow chart for the adjust clamped controlled routine called by FIGS. 32, 35, 41, 42, 44, 47 and 48.

In FIG. 51 there is shown the flow chart for the adjust clamped controller routine, for clamping the integral portion of the slip controller when the output is clamped. At block 860 the variable TE1 is calculated as equal to the desired slip frequency divided by the gain PI. To figure out what the integral TE1 is, in block 862 delta TE1 is set equal to delta TE times the variable PI gain. To figure out what the proportional amount is, the proportional TE1 in block 864 is set equal to the P gain times delta TE1. In block 866 the integral TE1 is determined by subtracting the proportional TE1 from the TE1. By clamping the integral portion, a smooth transition is provided when coming back to use of the unclamped controller.

Figure 52:
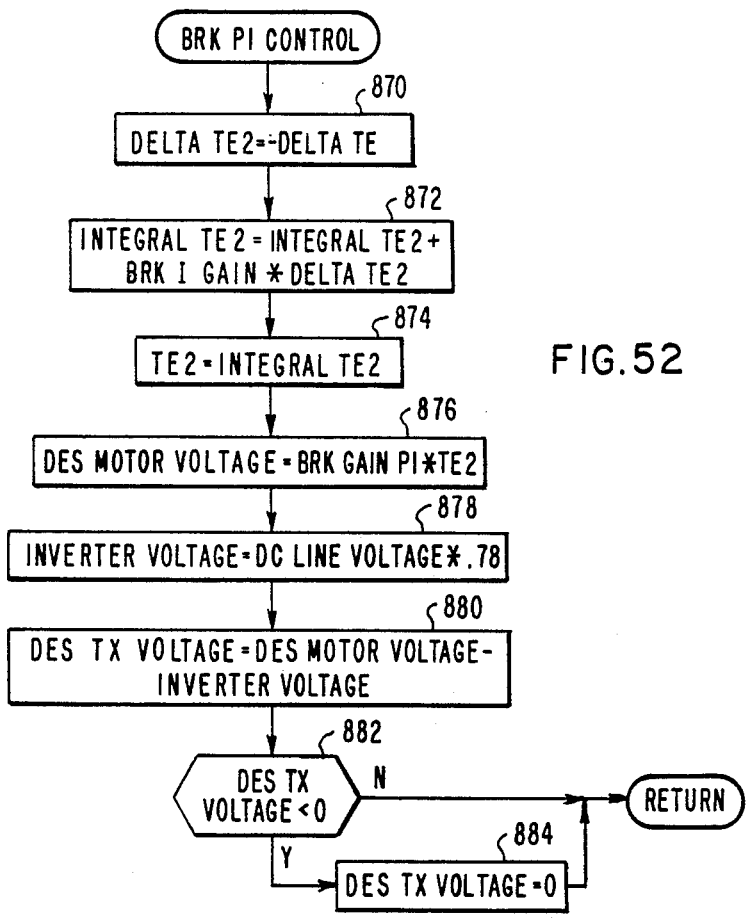
FIG. 52 shows a flow chart for the brake PI control routine called by FIG. 43.

In FIG. 52 there is shown the flow chart for the brake PI control routine, which is basically in integral controller. At block 870 a variable delta TE2 is set equal to minus delta TE. In the slip controller routine shown in FIG. 49, the delta TE1 was multiplied by a variable PI gain, but in this program delta TE1 is multiplied by negative one since there is no variable PI gain. The multiplier is a negative one, since for increased braking torque more negative torque is needed, and to get more negative torque requires a more positive braking angle. At block 872 the integral TE2 part is set equal to integral TE2 plus the brake integral gain times delta TE2. In block 874, TE2 is equal to integral TE2. In block 876 the desired motor voltage is set equal to the brake gain PI times TE2. In block 878 the inverter voltage is set equal to the DC line voltage times 0.78. In block 880 the desired TX voltage is determined by subtracting the inverter voltage from the desired motor voltage from block 876. In block 882 a check is made to see if the desired TX voltage is less than zero, and if it is, at block 884 it is clamped to zero. If not, that clamp is bypassed.

Figure 53:
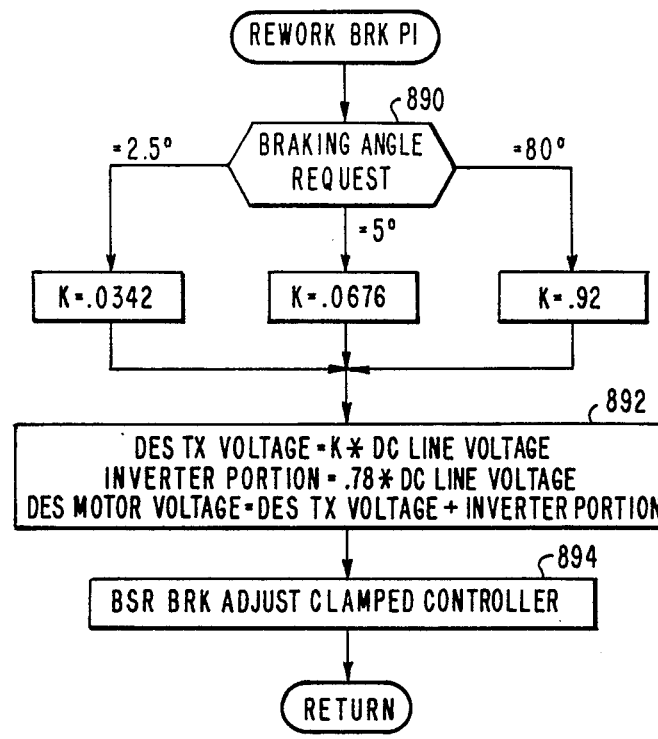
FIG. 53 shows a flow chart for the rework brake PI routine called by FIGS. 31 and 43.

In FIG. 53 there is shown a flow chart for the rework brake PI subroutine, which is used when it is desired to clamp the braking angle out of the brake PI; and this routine sets up the integral portion correctly. At block 890 a check is made of the braking angle request, which is only clamped to one of 2.5°, 5° or 80° angles. Depending on what it is equal to, a multiplier is here provided to determine how many volts is obtainable in transformer brake operation in relation to the line voltages available. For example, for a 500-volt link voltage and a brake angle request of 80°, there will result 0.92×500 volts line-to-line RMS across the motor out of the braking circuit. For a braking angle request of 2.5° this multiplier is 0.0342, and for a braking angle request of 5° this multiplier is 0.0676. At block 892 the desired TX voltage is determined as the multiplier constant K times the DC line voltage. The inverter portion is set equal to 0.78 times the DC line voltage, and the desired motor voltage is set equal to the desired TX voltage plus the inverter portion. The controller is clamped at this desired motor voltage. At block 894 a branch is made to the brake adjust clamped controller subroutine which will take that desired motor voltage and come up with the correct intermediate controller results.

Figure 54:
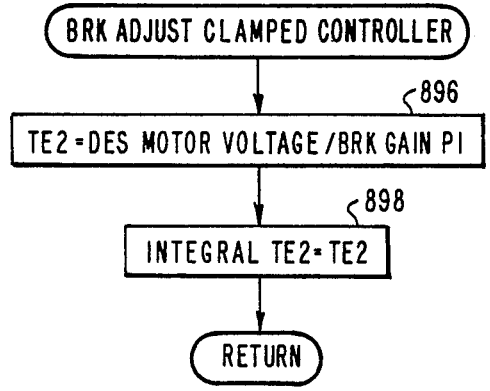
FIG. 54 shows a flow chart for the brake adjust clamped controller routine called by FIGS. 33 and 53.

In FIG. 54 there is shown the flow chart for the brake adjust clamped controller subroutine. At block 896 TE2 is set equal to the desired motor voltage divided by the gain of the brake PI. In block 898 the integral TE2 is set equal to TE2.

Figure 55:
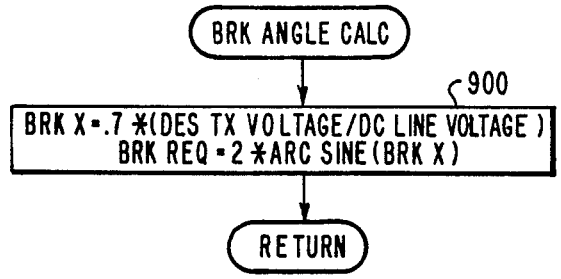
FIG. 55 shows a flow chart for the brake angle calculation routine called by FIGS. 43 and 44.

In FIG. 55 there is shown the flow chart for the brake angle calculation subroutine, which operates after a desired TX voltage is determined, to calculate what the brake angle corresponding to that TX voltage is. In block 900 brake X is set equal to 0.7 times the ratio of the desired TX voltage divided by the DC link voltage. The brake request is set equal to 2 times the arc sine of the brake X, so the brake request is the output brake angle.

Figure 56:
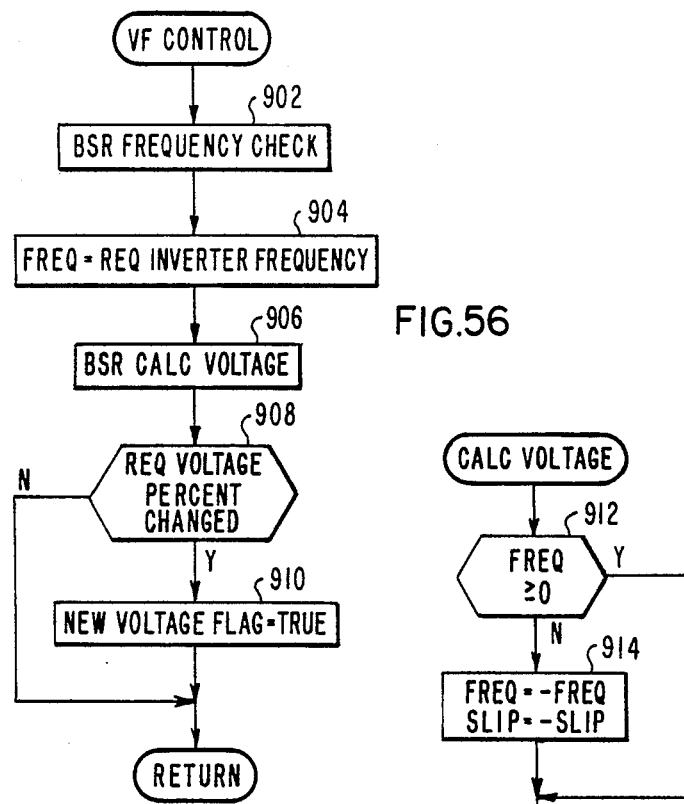
FIG. 56 shows a flow chart for the voltage and frequency control routine called by FIG. 20.

In FIG. 56 there is shown the flow chart for the V/F control subroutine, which operates after the desired inverter frequency is calculated to make sure it is within correct operational limits, and also calculates a voltage that corresponds to that inverter frequency. In block 902 a branch is made to the frequency check subroutine. In next block 904 the frequency is set equal to the requested inverter frequency which is returned by the frequency check subroutine. At block 906 the calculate voltage subroutine is called to take that frequency and calculate a corresponding voltage. In block 908 a check is made to see if the requested voltage percent has changed since the last time it was calculated. If it has changed, at block 910 the new voltage flag is set equal to true to indicate to the synthesis that a few extra calculations are necessary. If not, the block 910 is bypassed. This flag is set back to false by the synthesis once it is acknowledged.

Figure 57:
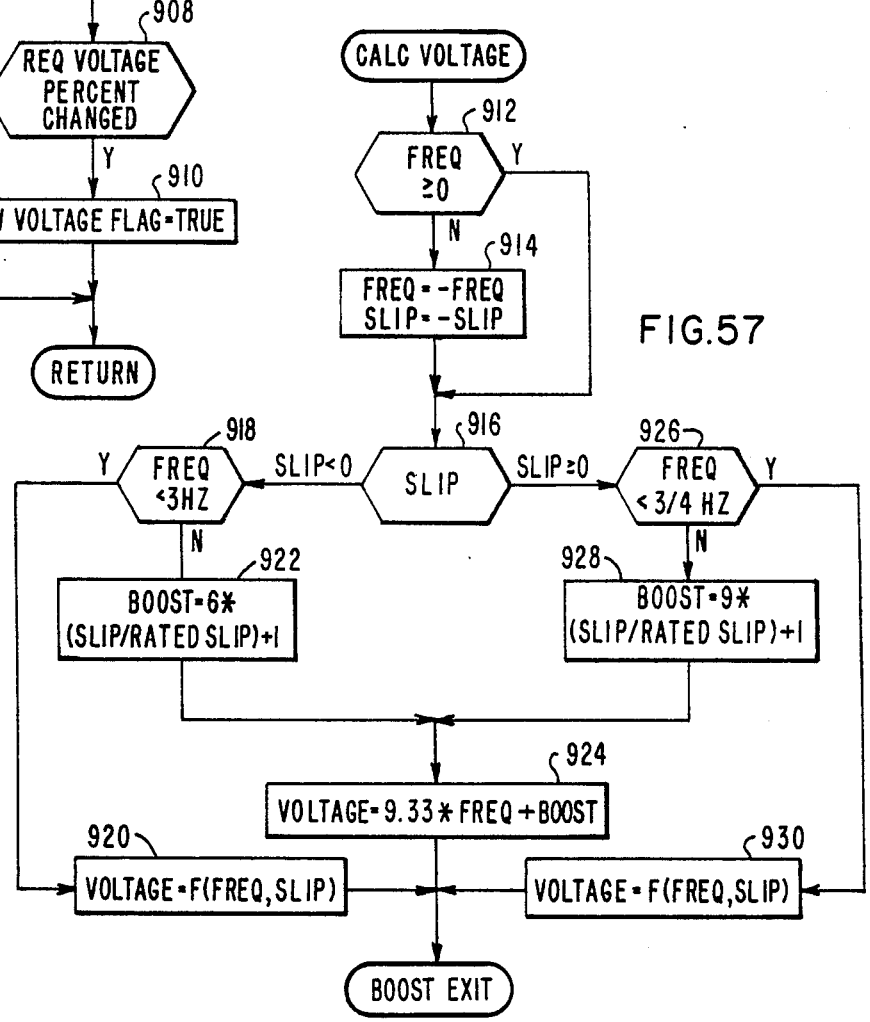
FIG. 57 shows a flow chart for the calculate voltage routine called by FIGS. 19 and 56.

In FIG. 57 there is shown a flow chart for the calculate voltage subroutine. In block 912 a check is made to see if the inverter frequency is greater than or equal to zero to determine if the vehicle is rolling back. If the frequency is negative, the vehicle is rolling backwards.

To stop a rollback, the actual technique used here is to first slow the car to a stop and then accelerate it in the proper direction. Motor voltage waveforms having the following equations are applied to the motor whenever the inverter is operating:

Phase $A = V^* \sin(2\pi ft)$

Phase $B = V^* \sin(2\pi ft + 120°)$

Phase $C = V^* \sin(2\pi ft + 240°)$ where V is the peak amplitude of the line to neutral motor voltages, t is time, and f is the frequency of the applied inverter waveforms. When the vehicle is rolling backwards it may be necessary for f to be negative but not as negative as the tachometer frequency if it is desired to slow down the vehicle. Once the vehicle reaches approximately zero speed, f will become positive and will act to accelerate the vehicle in the proper direction. During the portion of the run where f is negative the control state is power open loop even though the motor is actually braking at this time. The reason for declaring a power state is tha the slip frequency appears to be positive since it is equal to the inverter frequency minus the tach frequency and the inverter frequency is the less negative of the two. Actually negative frequencies do not exist and the motor's mechanical tach frequency and the inverter frequency are positive but rotating in the reverse direction. This means that the slip frequency is actually negative during such operation. It is, however, much easier to treat the frequencies rotating in the reverse direction as negative frequencies as far as the control is concerned. However, when calculating the voltage needed to maintain constant rated air gap flux, positive frequencies rotating in the reverse direction are preferred to negative frequencies.

In block 914, if the frequency value is negative, we convert it to a positive value. The slip frequency must also be negated to obtain the actual slip frequency. At block 916 a check is made to see if the slip is less than zero, meaning that the motor is braking, or is greater than or equal to zero, meaning that the motor is in power. If the slip is less than zero, at block 918 a check is made to see if the frequency is less than 3 Hz. If the frequency is less than 3 Hz in the brake operation, a lookup table is used to figure out the voltage needed to maintain the desired constant volts per hertz and to account for IR losses so as to maintain rated air gap flux in the motor especially down at the low end where these losses become nonlinear. At block 920 a lookup table, which is a function of frequency and slip, is used to determine the voltage. If the frequency is not less than 3 Hz at block 928, at block 922 an approximate boost value is calculated as six times the ratio of slip over rated slip plus one. Then at block 924 the voltage is set equal to 9.33 times the frequency plus the boost value just calculated to determine the voltage wanted across the motor. If the slip is greater than or equal to zero at block 916, this is power operation and a check is made at block 926 to see if the frequency is less than ¾ Hz. If the frequency is greater than ¾ Hz at block 926, then at block 928 boost is set equal to 9 times the ratio of slip over rated slip plus 1, and then at block 924 the voltage is calculated as equal to 9.33 times frequency plus boost. If frequency is less than ¾ Hz at block 926, a jump is made to block 930 where a different lookup table is used to determine the voltage wanted across the motor, as a function of frequency and slip for the power mode.

Figure 58:
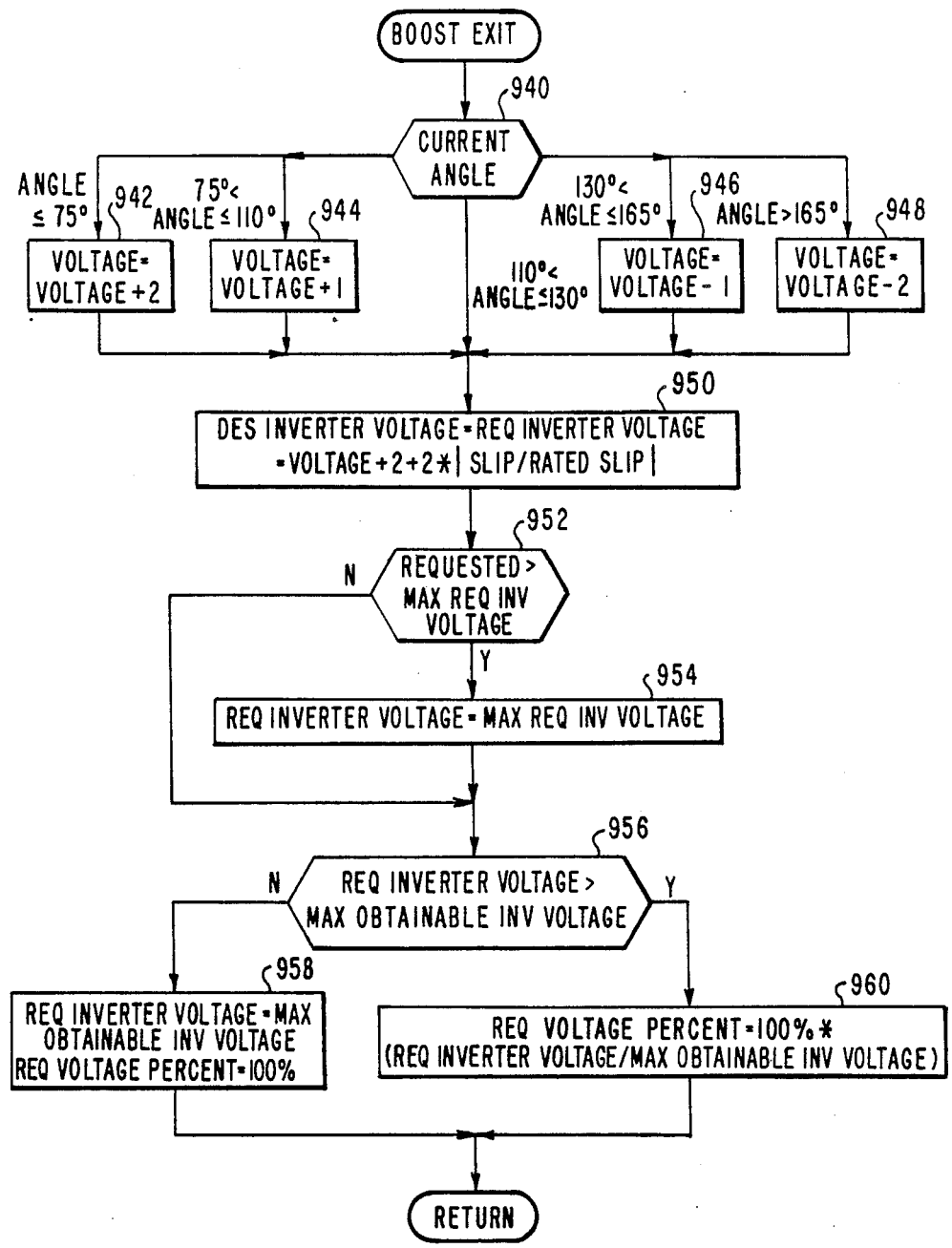
FIG. 58 shows a flow chart for the boost exit routine jumped to from FIG. 57.

In FIG. 58 there is shown a flow chart for the boost exit branched to from the end of the calculate voltage subroutine shown in FIG. 57 and which determines the desired voltage across the motor. During operation without transformer braking, there are thyristors shorting out the transformer and the thyristors have voltage drops associated with them. These voltage drops are only one or two volts, but one or two volts is a good percentage of the total output voltage at very low operating frequencies so it must be considered. How these voltage drops affect the motor voltage depends on the angle by which the motor current lags the motor voltage. This angle is checked at block 940. If the current angle is less than or equal to 75°, then at block 942 two volts are added to the voltage. This current angle is calculated as disclosed in concurrently filed patent application Serial No. 699,814. If the current angle is between 75° and 110°, then at block 944 there is added to the voltage one volt. If this angle is between 110° and 130° no volts are added. If the angle is between 130° and 165°, at block 946 one volt is subtracted from the voltage. If the angle is greater than 165° then at block 948 two volts are subtracted from the voltage. At block 950 the desired inverter voltage is set equal to the requested inverter voltage which is equal to the calculated voltage plus 2 plus 2 times the absolute value of the ratio of slip over rated slip. The 2 plus 2 times the absolute value of the ratio of slip over rated slip is a fudge factor found experimentally to correct for random losses. At block 952 a check is made to see if the requested voltage is greater than the maximum requested inverter voltage. The maximum requested inverter voltage is a jerk limited value of the maximum obtainable inverter output voltage using six-step synthesis. It is used to limit how fast the motor voltage may rise if operating the motor above base speed in the region of reduced air gap flux. For instance, if the motor is operating at 100 Hz, less voltage is being applied to the motor than is needed to maintain rated air gap flux. If the DC line voltage is 600 volts, 468 volts RMS line-to-line would be being applied to the motor with six-step synthesis. If the DC line voltage were to suddenly increase to 700 volts and no attempts were made to leave six-step synthesis, the motor voltage would suddenly increase to about 546 volts. A rapid increase of voltage will result in large transient currents and a rapid increase in motor torque both of which are undesirable.

The value called maximum requested inverter voltage hovers just above the current maximum obtainable inverter voltage. If a sudden change should occur in the DC line voltage, this maximum voltage would follow the new DC line voltage but at a more reasonable, controllable rate of about 480 volts/second. The requested inverter voltage is never allowed to exceed this maximum voltage. Therefore, in the previous example there the DC line voltage went from 600 to 700 volts, the maximum requested inverter frequency would slowly, such as at 480 volts per second, rise from just 468 volts to just over 546 volts. The requested inverter voltage will be limited to a voltage no greater than this maximum. This will result in an inverter voltage initially being requested which is less than the 546 volts that six-step would produce. The synthesis would then switch to quasi six-step and the motor voltage would slowly rise at a rate of 480 volts/second from 468 volts to 532 volts where six-step synthesis would again be employed. The voltage rise is slow enough, however, to avoid large transient motor currents and rapid increases in torque output.

If the requested voltage is greater than the maximum requested inverter voltage, at block 954 of FIG. 58 the requested inverter voltage is clamped to the maximum requested inverter voltage to provide a jerk limited jump in the requested inverter voltage. If not, the same requested inverter voltage is used. At block 956 a check is made to see if the requested inverter voltage is greater than the maximum obtainable inverter voltage. If yes, that is not desired so at block 958 the requested inverter voltage is clamped to be equal to the maximum obtainable inverter voltage. The requested voltage percent that is wanted is 100% since that is what is provided in six-step and a jump is made to return. If the requested inverter voltage is not greater than the maximum obtainable inverter voltage at block 956, at block 960 the requested voltage percent is calculated as equal to 100% times the ratio of the requested inverter voltage over the maximum obtainable inverter voltage. This requested voltage percent is used by the synthesis to get the right inverter output voltage.

Figure 59:
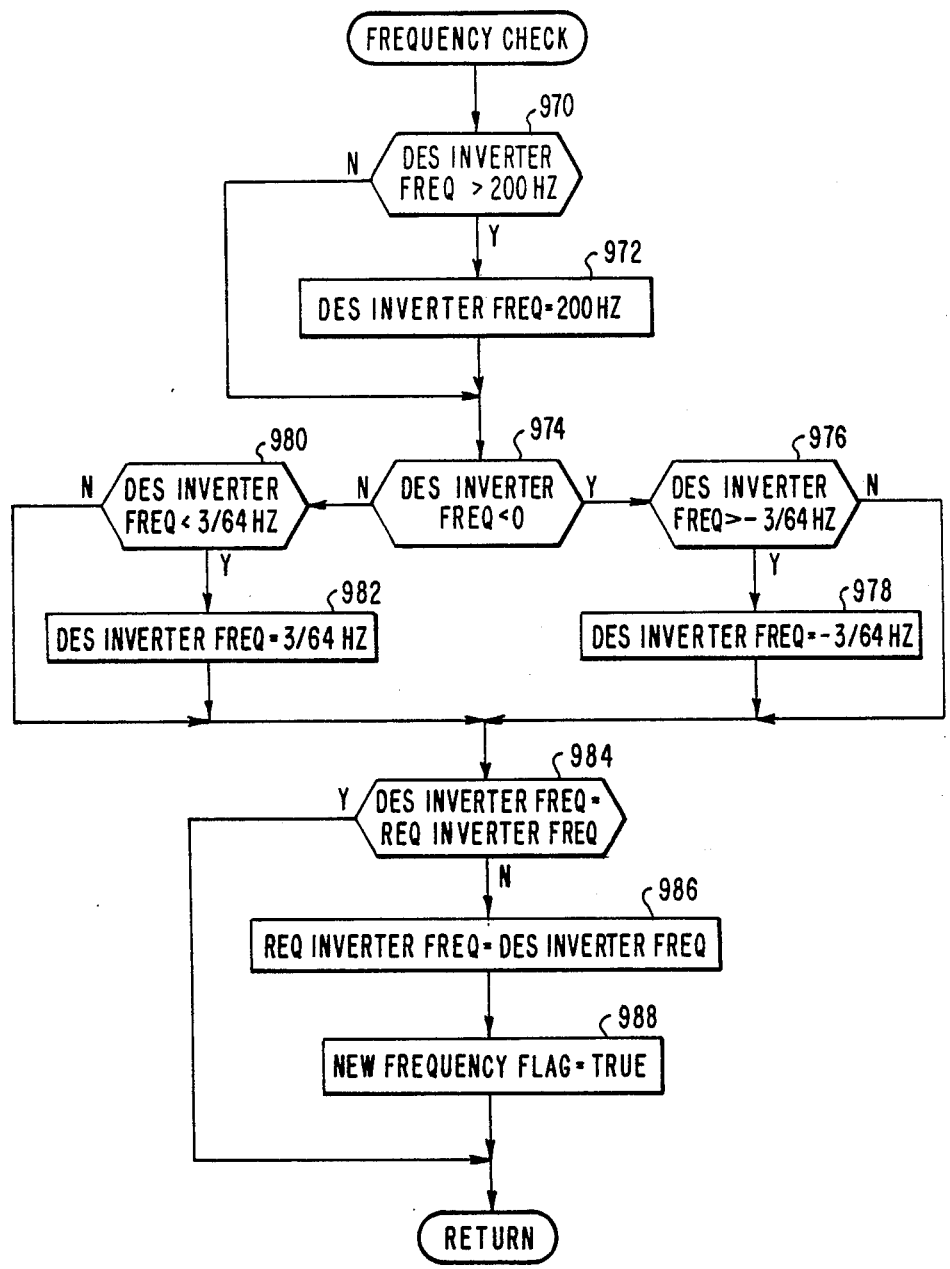
FIG. 59 shows a flow chart for the frequency check routine called by FIG. 58.

In FIG. 59 there is shown a flow chart for the frequency check subroutine, which checks to see if a reasonable inverter frequency is requested. At block 970 a check is made to see if the desired inverter frequency, which is output from the controller, is greater than 200 Hz. If yes, at block 972 the desired inverter frequency is clamped to a maximum operational frequency of 200 Hz. At block 974 a check is made to see if the desired inverter frequency is less than zero. The problem here is that only frequencies above 3/64 Hz and below minus 3/64 Hz can be produced by the synthesis. Frequencies between minus 3/64 Hz and plus 3/64 Hz cannot be produced; therefore, if a frequency in this narrow range is requested a frequency of either 3/64 Hz or minus 3/64 Hz will be generated instead. The vehicle is moving and may be recovering from a rollback condition and the known unstable operation is between minus 3/64 Hz and positive 3/64 Hz. At block 974 if the desired inverter frequency is less than zero then at block 976 a check is made to see if it is greater than minus 3/64 Hz. If it is greater than minus 3/64 Hz, at block 978 the desired inverter frequency is clamped to minus 3/64 Hz. If the desired inverter frequency is not less than zero at block 974 then at block 980 a check is made to see if the desired inverter frequency is less than 3/64 Hz, and if yes, then at block 982 it is clamped to 3/64 Hz. In block 984 a check is made to see if the desired inverter frequency is equal to the requested inverter frequency. If they are equal, a jump is made to return. If they are not equal, at block 986 the requested inverter frequency is set equal to the desired inverter frequency. In block 988 the new frequency flag is set to true to tell the synthesis that there is a new frequency and it has to do a few extra calculations. The requested inverter frequency and the requested voltage percent is what the synthesis then uses to output the right inverter voltage.

Figure 60:
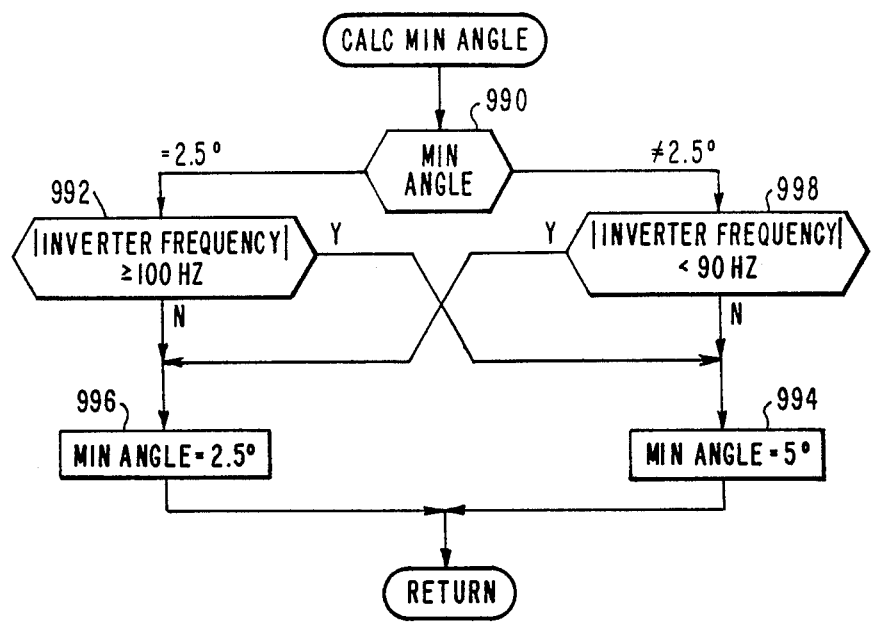
FIG. 60 shows a flow chart for the calculate minimum angle routine called by FIGS. 42, 43 and 44.

In FIG. 60 there is shown a flow chart for the calculate minimum angle subroutine, which is calculating the minimum braking angle that can be output to the braking timers. In block 990 a check is made of the current minimum angle to see if it is equal to 2.5° or is not equal to 2.5°. This minimum brake angle is usually going to be 2.5° to 5°, but upon power-up it could be zero degrees. If this angle is equal to 2.5°, at block 992 a check is made to see if the absolute value of the inverter frequency is greater than or equal to 100 Hz. If it is, then at block 994 the minimum angle is set equal to 5°, and if not, at block 996 the minimum angle is set equal to 2.5°. If the minimum angle is not equal to 2.5° at block 990, then at block 998 a check is made to see if the inverter frequency is less than 90 Hz. If it is less than 90 Hz, at block 996 the minimum angle is set equal to 2.5°. If it is not less than 90 Hz at block 994, the minimum angle is set equal to 5°. The 90 Hz and 100 Hz values are selected to provide some hysteresis to keep the control operation from unstable back and forth changes. A jump is made to return.

Figure 61:
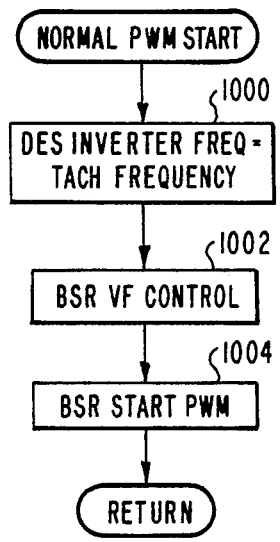
FIG. 61 shows a flow chart for the normal PWM start routine called by FIGS. 13 and 14.

In FIG. 61 there is shown the flow chart for the normal PWM start routine, which is called by the interrupt routine shown in FIG. 12 when it is desired to start up the inverter using PWM synthesis operation. In block 1000, the desired inverter frequency is set equal to the tach frequency, since it is desired to start with zero slip. A branch is made in block 1002 to the subroutine V/F control shown in FIG. 56 to set up the right frequency and voltage. For example, if the frequency is zero here, it is not desired to start with a zero frequency, so the frequency is set to 3/64th of a hertz and the right voltage signal is set to go along with that frequency to provide the constant volts per hertz control. In block 1004, a branch is made to the start PWM routine which is disclosed in above-referenced patent application Ser. No. 696,819 of the synthesis case, and this will start the synthesis timers.

Figure 62:
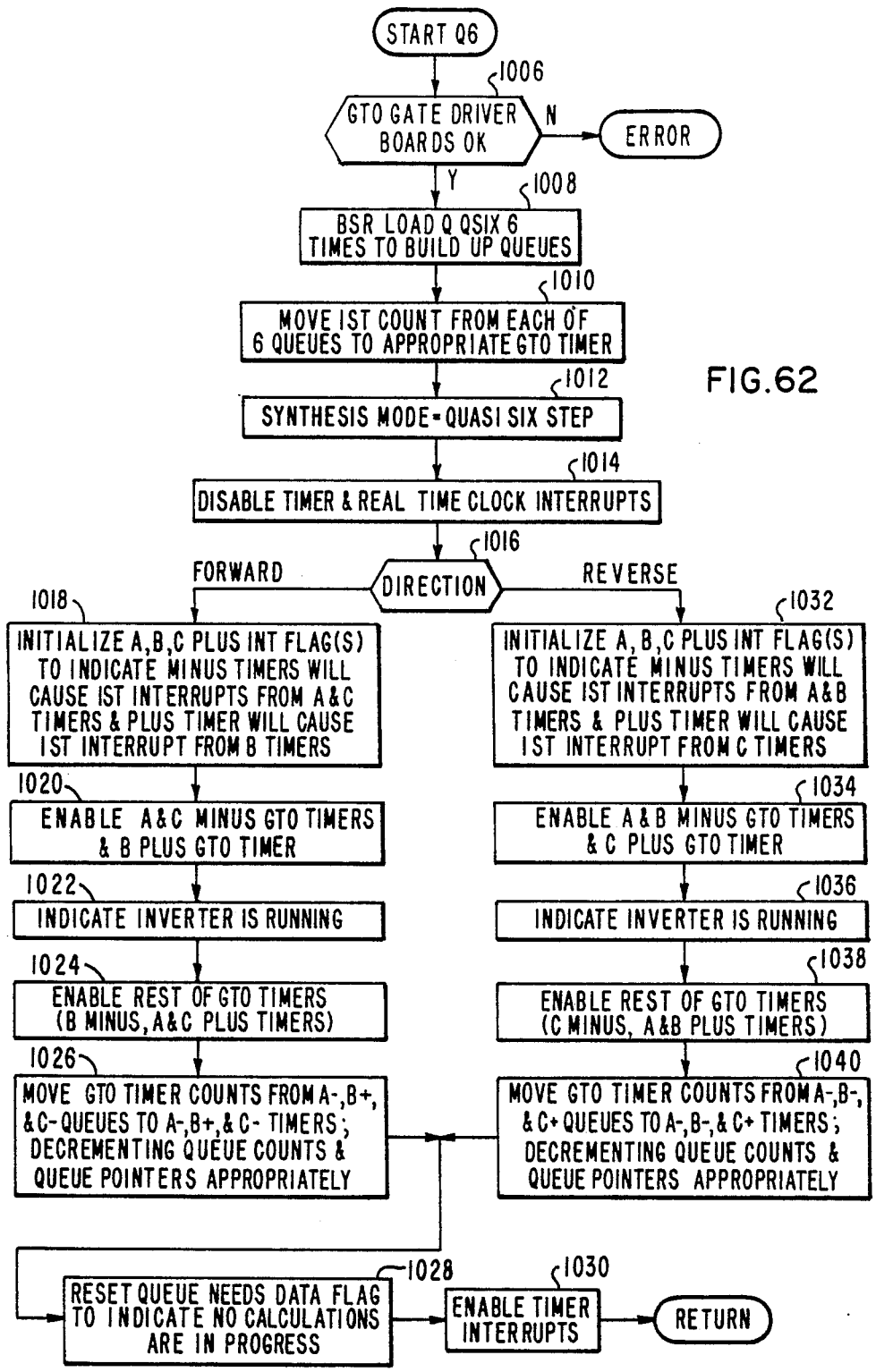
FIG. 62 shows a flow chart for the start quasi six-step routine called by FIG. 19.

In FIG. 62 there is shown the flow chart for the start Q six routine, which is used whenever starting up the motor when already going at a higher frequency, so that the start should be with the quasi six-step synthesis since the inverter frequency is too high for PWM synthesis operation. At block 1006, a check is made to see if the GTO gate driver boards are okay. If they are not okay, this is an error and a shutdown will result. If they are okay, then at block 1008 a branch is made to the subroutine load Q Qsix six times. This subroutine calculates quasi six-step GTO firing times corresponding to one sixty degree section of quasi six-step, which is disclose in above-referenced patent application Ser. No. 696,814. Since this subroutine is called six times, 360° worth of quasi six-step GTO firing times will end up being calculated and placed in their respective timer queues in memory. At block 1010 the first count is moved from each of the six timer queues to the appropriate GTO timer. In block 1012, the synthesis mode is declared as being quasi six-step. In block 1014, the timer and the real time clock interrupts are disabled while starting up the synthesis timers. In block 1016, a check is made to see what direction is desired, whether forward or reverse. The difference between forward and reverse is the switch made of the B and the C motor phases. If the direction is forward, block 1018 initializes the A, B, and C plus interrupt flags to indicate that the minus timers will cause the first interrupts for the A and the C timers and the plus timer will cause the first interrupt from the B timers. Each phase has two timers, one being plus and one being minus. At block 1020, the A−, C−, and B+ GTO timers are enabled. In block 1022, an indication is made that the inverter is running. At block 1024, the rest of the GTO timers, the B−, A+, and C+ timers are enabled. All six timers are now running, however, only the three that were started and enabled first are currently counting. In block 1026, the GTO timer counts are moved from the A−, B+ and C− queues to the Ar−, B+ and C− timers. These are the timers that were started first and are ready to get new counts into their holding buffers. Each timer has one count that is stored besides the count it is counting. In addition, decrementing is done of the queue counts and queue pointers appropriately to indicate that three more counts have been removed. Then at block 1028 the queue needs data flag is reset to indicate no calculations are in progress. The interrupt routines from the timers use this data flag to figure out whether or not they need to calculate data, so that is in the synthesis operation. The timer interrupts are enabled in block 1030 and then a return is made. By the time this return is made, the quasi six-step operation is started and the timers are running and everything is fine. If the direction is reverse in block 1016, then at block 1032 the A, B and C plus interrupt flags are initialized to indicate that the minus timers will cause the first interrupts from the A and B timers and the plus timer will cause the first interrupt from the C timers. This is similar to the forward direction operation except the B and the C phases are interchanged. At block 1034 the A−, B−, and C+ GTO timers are enabled. At block 1036, an indication is made that the inverter is running. At block 1038, the rest of the GTO timers are enabled, which are the A+, B+, and C− timers. Then in block 1040, the GTO timer counts are moved from the A−, B−, and C+ queues to the A−, B− and C+ timers. These were the three timers that were started up in block 1034, and the queue counts and queue pointers are decremented appropriately.

Figure 63:
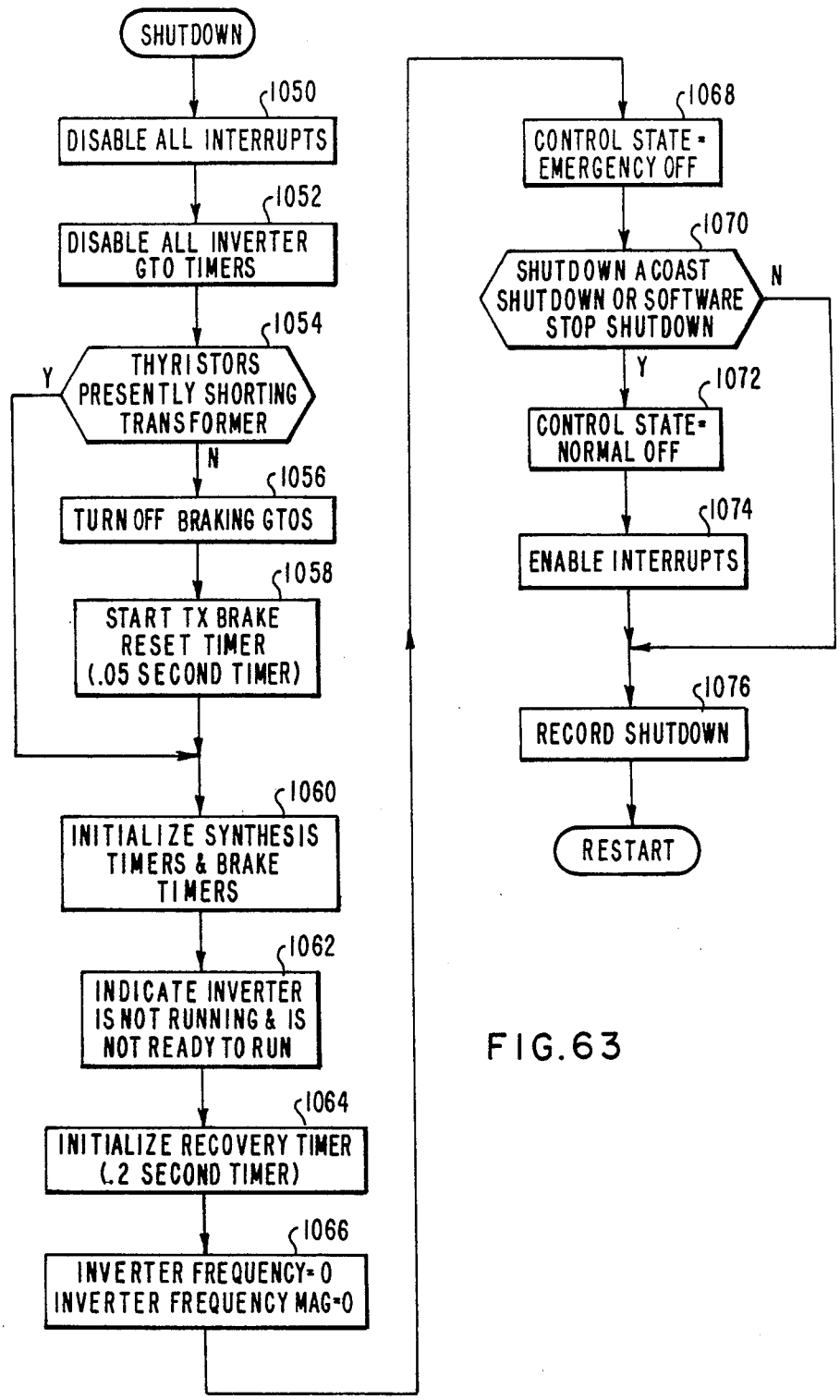
FIG. 63 shows a flow chart for the shutdown procedure routine called by FIGS. 12B, 18, 19, 23, 40 and 48.

In FIG. 63 there is shown a flow chart for the shutdown or error procedure routine. This routine is called from the flow charts shown in FIGS. 12, 14, 17, 18, 19, 23, 40, 44 and 48. At block 1050, all interrupts are disabled. In block 1052 all of the inverter GTO timers are disabled and this is going to turn off all of the GTOs in the inverter. In block 1054, a check is made to see if the thryistors are presently shorting the braking transformer. If they are not, then a couple of intermediate steps are required, since it is desired to bring back in the thyristors to start shorting the transformer but it is not done all at once. At block 1056, the braking GTOs are turned off while the thyristors are still off. The objective is to eventually turn the thyristors on and turn the braking GTOs off. At block 1058, the TX brake reset timer is started, which is a 0.05 second timer which is just a delay. Once this timer times out, there is another routine in FIG. 11 in the start-up that will turn on the thyristors and turn off the braking GTOs, to provide a normal condition for starting up in power. Block 1060 initializes the synthesis timers and the brake timers. When it is desired to start again, the timers are ready. At block 1062, the inverter is indicated as not running and is not ready to run because it is necessary to initialize the values which is done in the restart routine. Block 1064 initializes the recovery timer, which is a 0.2 second timer and this provides, after the inverter is shutdown during an emergency situation, a wait of 0.2 seconds or a certain amount of time for the currents to die out. Block 1066 sets the inverter frequency equal to zero and inverter frequency magnitude equal to zero. The inverter frequency is a signed number and the magnitude is the absolute value of it. Block 1068 sets the control state equal to emergency off. Block 1070 checks to see if the shutdown is a coast shutdown or a software stop shutdown. If it is either one of those, then block 1072 sets the control state equal to normal off and block 1074 enables the interrupts. If not, one of the shutdowns is checked at block 1070, then the control state is kept at emergency off, and block 1076 records the shutdown. Then a branch is made to the restart routine shown in FIG. 64.

Figure 64:
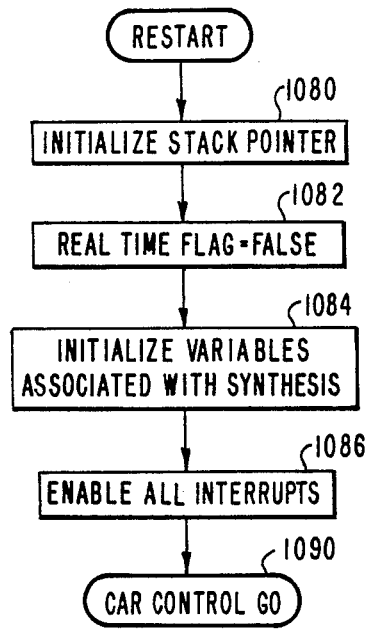
FIG. 64 shows a flow chart for the restart routine called by FIG. 63.

In FIG. 64 there is shown a flow chart for the restart routine called by the shutdown routine shown in FIG. 63. In the restart routine at block 1080 the stack pointer is initialized. At block 1082 the real time flag is set equal to false in the event there was an interrupt while doing the real time routines. At block 1084 the variables associated with the synthesis operation are initialized. At block 1086 all interrupts are enabled. At label 1090, the program goes to block 208 of the start routine shown in FIG. 11.

In FIG. 65 there is shown a flow chart for the recovery control routine called by the recovery branch routine shown in FIG. 45. At block 1092 the desired inverter frequency is set equal to the measured tachometer frequency to provide a slip frequency of zero for the motor and to result in a no torque operation of the motor. At block 1094 a branch is made to the frequency check subroutine to make sure that a reasonable inverter frequency is requested, as shown in relation to FIG. 59. At block 1096 a branch is made to the calculate voltage routine shown in FIG. 57 to calculate the inverter voltage wanted for the desired inverter frequency, and this establishes the requested inverter voltage and the requested inverter percent for the latter frequency and the desired constant V/F operational relationship. At block 1098 the recovery percent is set equal to the last recovery percent plus 0.75%, and since this done every 1/240 second, this operation will increase will increase the recovery percent that was initially set at 10% in block 408 of the rail gap recovery routine shown in FIG. 19 up to 100% and full voltage corresponding to the requested inverter voltage in about ½ second. At block 1100 a check is made to see if the recovery percent is greater than 100%, and if so at block 1102 the recovery percent is clamped to 100%. At block 1104 the requested inverter voltage is set equal to the recovery percent times the requested inverter voltage to increase the actual requested inverter voltage up to the calculated constant V/F requested inverter voltage in about ½ second. In block 1106 the requested voltage percent is set equal to the recovery percent times the calculated constant V/F requested voltage percent which is determined by the calculate voltage routine. At block 1108 the new voltage flag is set equal to true, so the synthesis operation will know there is a new requested inverter voltage that might require the calculation of the variables influenced by this voltage.

We claim:

1. In apparatus for controlling the torque of an induction motor in response to an operation request signal and operative with an inverter coupled to a DC power source having a voltage, the combination of
    first means coupled with the motor to provide a motor speed signal, said motor having a base speed,
    interactively coupled slip and brake controller means responsive to the operation request signal for providing through said slip controller means a desired slip frequency, said slip controller means also being adapted to hold the slip frequency constant at a predetermined rated slip frequency during braking in an extended speed, voltage control interim of motor operation above base speed, second means comparing the desired slip frequency with the motor speed signal for providing a requested inverter frequency signal, third means responsive to the requested inverter frequency signal and the slip frequency for providing a desired inverter voltage, and fourth means responsive to the desired inverter voltage and the power source voltage for providing a requested inverter voltage across said motor and a requested inverter voltage percent signal, with the inverter being coupled between the DC power source and the motor and responsive to the requested inverter frequency signal and the requested inverter voltage percent signal for providing a first energizing voltage across said motor which depends on the requested inverter voltage for controlling the motoring and said brake controller means providing a variable voltage for air gap flux control of braking in the extended speed, voltage control interim with the predetermined rated slip held constant by said slip controller means for braking torque of the motor and with said slip controller means having a variable gain that is thereafter increased in the speed interim above the extended voltage control interim and in proportion to the square of the ratio of desired inverter voltage to the requested inverter voltage across said motor for motor speeds above base speed so that the system torque is substantially constant for operating motor speeds.

2. The motor control apparatus of claim 1, wherein said interactively coupled slip and brake controller means provides through said brake controller means, responsive to the operation request signal, a desired brake voltage with proportional plus integral control, fifth means comparing the desired brake voltage with the DC power source voltage for providing a requested braking angle signal, and brake means coupled between the DC power source and the motor and responsive to the requested braking angle signal for providing a second energizing voltage across said motor for controlling the operation of the motor when summed with said first energizing voltage, beginning in the interim when said slip controller means holds the slip frequency constant at the predetermined rated slip and continuing to be summed in the extended interim of second energizing voltage until the motor voltage is maximized at the threshold of the speed interim thereabove and so held when speed transitioning through the square law slip control interim and beyond to maximum motor speed, and first and second energizing voltages providing an actual voltage across said motor, which enhances the magnitude of braking torque of the motor, by controlling the air gap flux therethrough, beyond that of the first energizing voltage motor braking torque.

3. The motor control apparatus of claim 2, with the slip controller means providing a slip limit signal for holding the slip frequency at a predetermined rated slip frequency when said brake means is providing the second energizing voltage to the motor.

4. The motor control apparatus of claim 2 operative with a motor having a base speed, and with the brake means being operative to provide the second energizing voltage to the motor for motor speeds above the base speed as determined by the operation request signal.

5. The motor control apparatus of claim 2, with the fifth means including means providing a brake angle limit to limit said braking angle signal in relation to at least one predetermined brake angle.

6. The motor control apparatus of claim 2, with the slip controller means including means providing a slip limit signal to limit said slip frequency in relation to a predetermined slip operation of the motor.

7. The motor control apparatus of claim 2, with slip controller means being operative to control the slip frequency for both power and brake operation of the motor, and with the brake controller means being operative to provide the braking angle signal for brake operation of the motor.

8. The motor control apparatus of claim 2, with the slip controller means controlling the slip frequency below and above the base speed of tthe motor for both power and brake operation of the motor, and with the brake controller means providing the braking angle signal above the base speed of the motor for brake operation of the motor when the operation request signal is requesting more brake operation than can be provided by the inverter.

9. The motor control apparatus of claim 2, with the magnitude of the brake angle signal being determined by the power source voltage up to a predetermined brake angle limit established by the motor operation in response to the first energizing voltage.

10. The method of controlling an induction motor in response to an operation request signal and operative with a DC power source having a voltage, the steps of energizing the motor with an inverter coupled with the DC power source, determining a motor speed signal in accordance with the speed of the motor, providing a desired slip frequency signal from an interactive slip and brake controller operating in response to the operation request signal, said slip controller portion holding the slip frequency at a predetermined rated slip frequency during braking in an extended speed, voltage control interim of motor operation above base speed, providing a requested inverter frequency signal in response to the slip frequency signal and the motor speed signal, providing a requested inverter voltage percent signal in response to the desired slip frequency signal and the power source voltage, controlling the energization of the motor by the inverter in response to the requested inverter frequency signal and the requested inverter voltage percent signal, and controlling the gain of the interactive controller so as to increase it non-linearly in the speed interim above the extended speed, voltage control interim from a motor base speed gain of unity, for increasing motor speeds when the operating speed of the motor is above base speed so that the composite control gain of said motor and interactive controller is substantially constant in order to maximize the speed torque range for a broad range of operating speeds.

11. The motor control method of claim 10, including
energizing the motor with a brake apparatus coupled with the DC power source,
providing a desired braking signal in response to the operation request signal and the power source voltage, and
controlling the energization of the motor by the brake pressure in response to the desired braking angle signal.

12. The motor control method of claim 11,
with the braking angle signal being limited in relation to at least one predetermined braking angle in response to the operation of the motor.

13. The motor control method of claim 11,
with the desired slip frequency signal controlling the energization of the motor by the inverter for both below base speed and above base speed operation of the motor, and
with the desired braking angle signal controlling the energization of the motor for above base speed operation as determined by the operation request signal.

14. In apparatus for controlling the torque of an induction motor in a transit vehicle in response to an operation request signal and operative with an inverter coupled to a DC power source having a voltage, the combination of
means coupled with the motor to provide a motor speed signal, and motor having a base speed,
slip controller means responsive to the operation request signal for providing a desired slip frequency, said slip controller means having a non-linear gain characteristic for motor speeds above base speed and being clamped below base speed to a gain of unity,
means comparing the desired slip frequency with the motor speed signal for providing a requested inverter frequency signal,
means responsive to the requested inverter frequency signal and the slip frequency for providing a desired inverter voltage, and
means responsive to the desired inverter voltage and the power source voltage for providing a requested inverter voltage across said motor, said requested inverter voltage below base speed equals said desired inverter voltage and above base speed is voltage limited by the power source,
means responsive to the requested inverter voltage and the power source voltage for providing a requested inverter voltage percent signal, said requested inverter voltage percent signal below base speed is within the range of zero to one hundred percent and above base speed is clamped at one hundred percent,
said non-linear gain characteristic of said slip controller means being proportional to the square of the ratio determined by desired inverter voltage divided by the requested inverter voltage across said motor,
said inverter being coupled between the DC power source and the motor and responsive to the requested inverter frequency signal and the requested inverter voltage percent signal for providing a first energizing voltage across said motor which depends on the requested inverter voltage for controlling the motoring and braking torque of the motor, so that the available composite torque gain for controlling said motor is substantially constant for a useful range of operating speeds.

15. The method of controlling an induction motor for a transit vehicle in response to an operation request signal and operative with a DC power source having a voltage, the steps of,
energizing the motor with an inverter coupled with the DC power source,
determining a motor speed signal in accordance with the speed of the motor,
providing a desired slip frequency signal from a slip controller operating in response to the operation request signal, clamping a predetermined slip frequency signal for the motor when operating above base speed during an extended speed, variable voltage braking torque interim of operation,
providing a requested inverter frequency signal in response to the slip frequency signal and the motor speed signal,
providing a requested inverter voltage across said motor in response to the desired slip frequency signal and the power source voltage,
providing a requested inverter voltage percent signal in response to the requested inverter voltage and the power source voltage,
controlling the energization of the motor by the inverter in response to the requested inverter frequency signal and the requested inverter voltage percent signal, and
increasing the gain of the slip controller nonlinearly, from a motor base speed gain of unity, for increasing motor speed according to a voltage ratio relationship with the inverse squared of requested inverter voltage when the operating speed of the motor is above base speed and above the extended speed, variable voltage braking torque interim so that the available composite torque gain for controlling said motor is maximized for a useful range of operating speeds.

* * * * *